(12) United States Patent
Barrett

(10) Patent No.: US 11,165,340 B1
(45) Date of Patent: Nov. 2, 2021

(54) METHOD AND APPARATUS FOR DIGITAL POWER FACTOR CORRECTION OF A POLY-PHASE AC TO DC CONVERTER

(71) Applicant: Raymond Louis Barrett, Ft. Lauderdale, FL (US)

(72) Inventor: Raymond Louis Barrett, Ft. Lauderdale, FL (US)

( * ) Notice: Subject to any disclaimer, the term of this patent is extended or adjusted under 35 U.S.C. 154(b) by 0 days.

(21) Appl. No.: 16/599,460

(22) Filed: Oct. 11, 2019

Related U.S. Application Data

(60) Provisional application No. 61/832,913, filed on Jun. 9, 2013.

(51) Int. Cl.
*H02M 1/42* (2007.01)
*H02M 7/219* (2006.01)
*H02M 1/36* (2007.01)
*H02M 1/00* (2006.01)

(52) U.S. Cl.
CPC ........... *H02M 1/4233* (2013.01); *H02M 1/36* (2013.01); *H02M 7/219* (2013.01); *H02M 1/0012* (2021.05)

(58) Field of Classification Search
CPC ...... H02M 1/4233; H02M 1/36; H02M 7/219; H02M 201/0012; H02M 1/42; H02M 1/4208; H02M 1/4216; H02M 1/4225
See application file for complete search history.

(56) References Cited

U.S. PATENT DOCUMENTS

| | | | | |
|---|---|---|---|---|
| 4,412,167 A | * | 10/1983 | Green ................... | H02P 23/26 318/729 |
| 9,787,175 B2 | * | 10/2017 | Phadke ................. | H02M 1/10 |
| 2011/0235379 A1 | * | 9/2011 | Siri ....................... | H02M 7/08 363/125 |

* cited by examiner

*Primary Examiner* — Gary L Laxton
(74) *Attorney, Agent, or Firm* — Luis Figarella

(57) ABSTRACT

The method and apparatus described herein uses modern digital logic that is used to meet the need by controlling Switch-Mode Power System (SMPS) components to produce efficient conversion of the AC input source to a DC output load, maintain a near-unity Power Factor Control (PFC), require relatively small components for energy storage and filtering, as well as support a form of soft-start load application to a Poly-Phase AC source.

4 Claims, 60 Drawing Sheets

```
 1    `timescale 1ms/1us
 2    module ZC_TB;
 3    reg Pos,Neg;
 4    reg [15:0] Counter;
 5
 6
 7
 8    initial
 9        begin
10              Counter  =    0;
11              Pos      =   'b0;
12        #0.02 Pos      =   'b1;
13              Neg      =   'b0;
14        end
15
16   always #0.001  Counter = Counter + 1;
17
18   always @ (posedge Pos) #8.3 Pos <= 'b0;
19   always @ (negedge Pos) #0.011 Neg <= 'b1;
20   always @ (posedge Neg) #8.3 Neg <= 'b0;
21   always @ (negedge Neg) #0.011 Pos <= 'b1;
22
23   endmodule
24
```
Figure 26
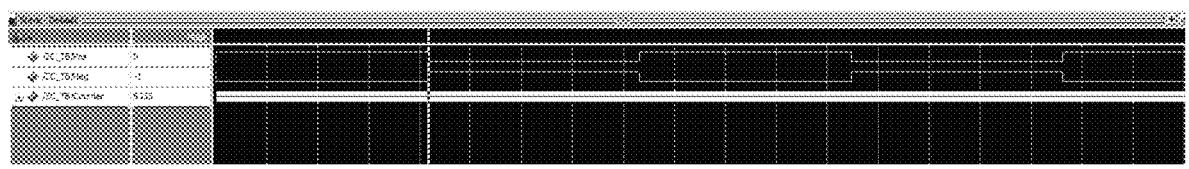
Figure 27
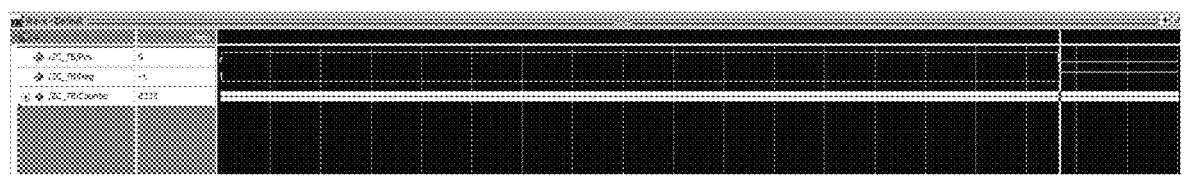
Figure 28

```
`timescale 1ms/100ns
module ZC_TB;
reg Pos,Neg;
reg [15:0] Counter;
reg Timer, Timer2;

initial
    begin
            Counter =    0;
            Pos     =    'b0;
    #0.02   Pos     =    'b1;
            Neg     =    'b0;
    end always #0.001  Counter = Counter + 1;

always @ (posedge Pos) #8.3 Pos <= 'b0;
always @ (negedge Pos) #0.011 Neg <= 'b1;
always @ (posedge Neg) #8.3 Neg <= 'b0;
always @ (negedge Neg) #0.011 Pos <= 'b1;

always @ (Counter) Timer = Pos ^ Neg;
always @ (Counter) Timer2 = !Pos ^ !Neg;

endmodule
```

```
`timescale 1ns/100ns
module ZC_TB;
reg Pos,Neg;
reg [15:0] Counter, Period, Time_End, Time_Begin, Progress;
reg Timer, Timer2;
reg [8:0] Delta, Per_Cent;

initial
    begin
            Counter =      0;
            Period =       0;
            Time_End =     0;
            Time_Begin =   0;
            Progress =     0;
            Delta =        0;
            Per_Cent =     0;
            Timer =        'b0;
            Timer2 =       'b0;
            Pos =          'b0;
    #0.02   Pos =          'b1;
            Neg =          'b0;
    end always #0.001   Counter = Counter + 1;

always @ (posedge Pos) #8.3 Pos <= 'b0;
always @ (negedge Pos) #0.011 Neg <= 'b1;
always @ (posedge Neg) #8.3 Neg <= 'b0;
always @ (negedge Neg) #0.011 Pos <= 'b1;

always @ (Counter) Timer = Pos ^ Neg;
always @ (Counter) Timer2 = !Pos ^ !Neg;

// Show Period Calculation always @ (negedge Timer) Time_End <= Counter;

always @ (posedge Timer)
    begin
            Time_Begin = Counter;
            Delta = Time_Begin - Time_End;
            Period = Time_Begin - Delta/2;
            Counter = 0;
    end always @ (Counter)
    begin
            Progress <= Counter + Delta/2;
            Per_Cent <= (100*Progress)/Period;
    end endmodule
```

Figure 33

```
 C:\MFPGA_hw17.0\Master_Osc\Master_Osc0_Default
Ln#
  1    `timescale 10ns/10ps
  2    module Master_Osc(
  3        InClk,
  4        Arst,
  5        C0,
  6        Locked
  7    );
  8
  9    output    InClk, Arst, C0, Locked;
 10    reg       InClk, Arst, C0, Locked;
 11
 12    initial
 13        begin
 14            Locked  =   'b0;
 15            Arst    =   'b1;
 16            InClk   =   'b0;
 17            C0      =   'b0;
 18    #0.12   Locked  =   'b1;
 19        end
 20
 21    always #0.0122 C0    =   !C0;
 22    always #0.3904 InClk =   !InClk;
 23
 24    endmodule
 25
```
Figure 50
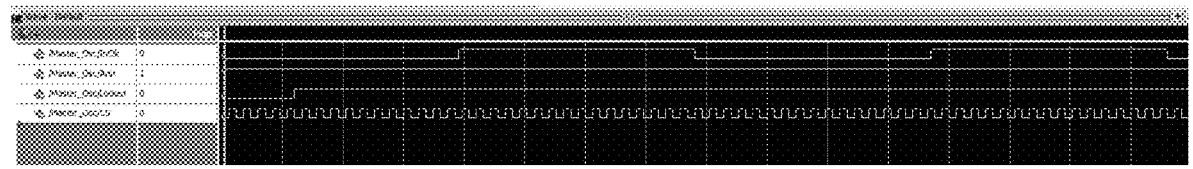
Figure 51
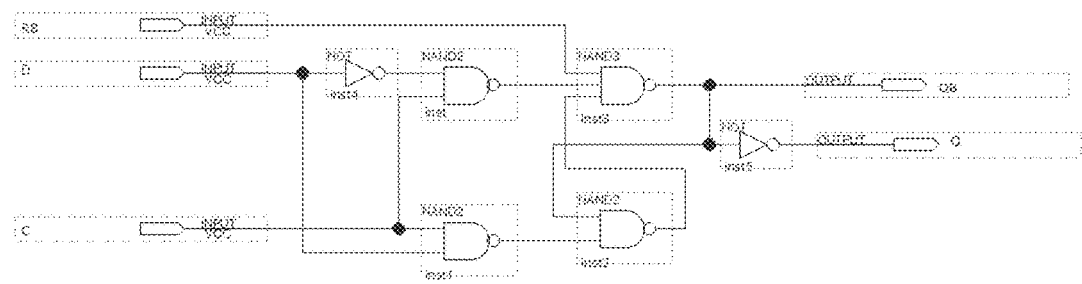
Figure 52

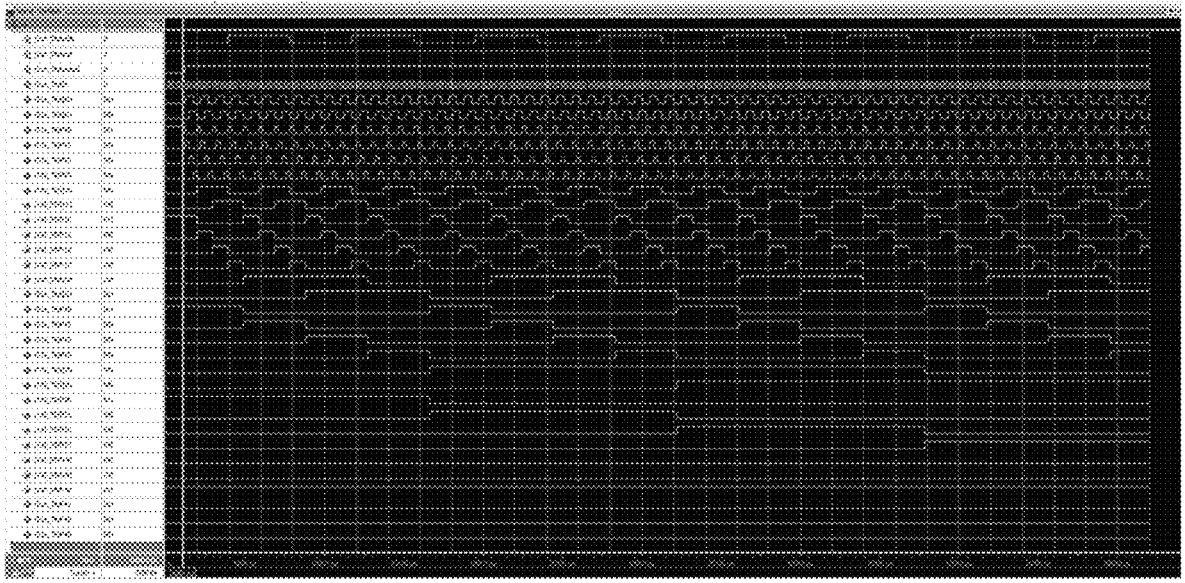
Figure 66
Figure 67
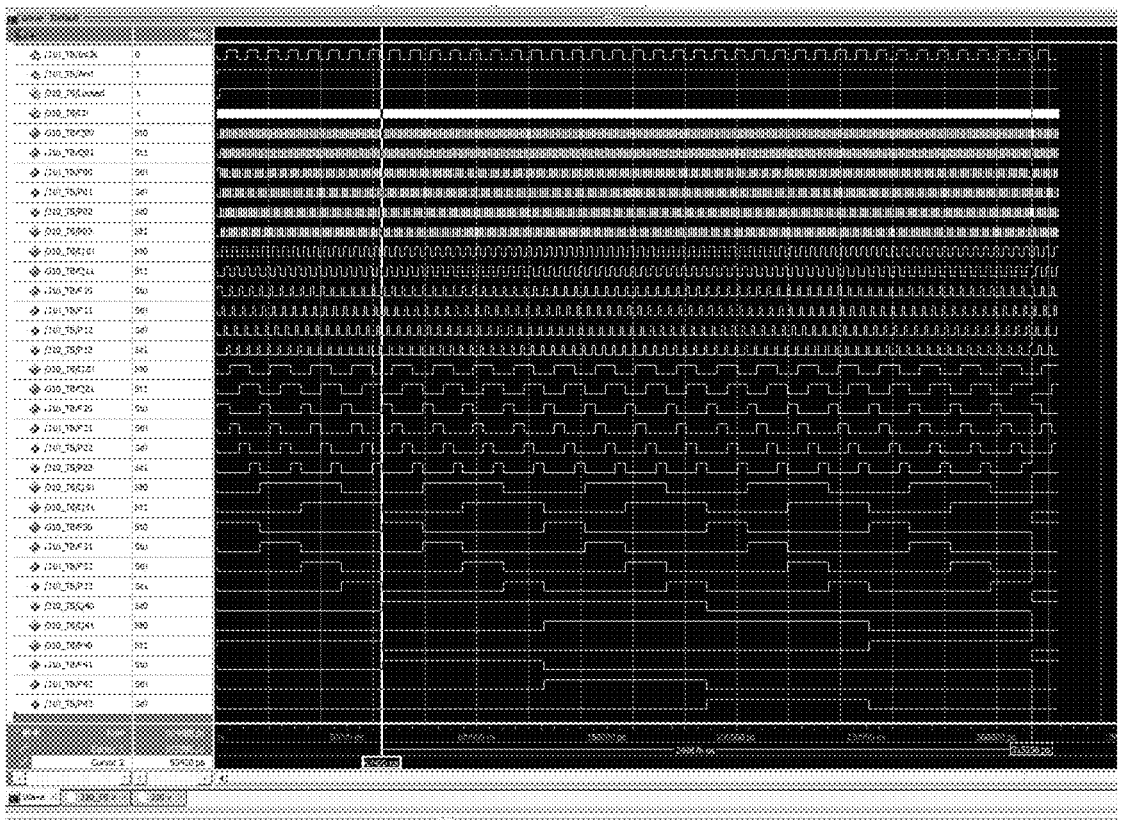

METHOD AND APPARATUS FOR DIGITAL POWER FACTOR CORRECTION OF A POLY-PHASE AC TO DC CONVERTER

CROSS-REFERENCE TO RELATED APPLICATIONS

This application claims priority to U.S. Provisional patent application Ser. No. 61/832,913 titled "Method and Apparatus for Digital Power Factor Correction of a Poly-Phase AC to DC Converter", filed on Oct. 13, 2018 the disclosure of which is herein incorporated by reference in its entirety.

PATENTS CITED

The following documents and references are incorporated by reference in their entirety, Green et al (U.S. Pat. No. 10,312,798), Skinner et al (U.S. Pat. No. 8,358,098).

FIELD OF THE INVENTION

The present invention relates generally to the digital implementation of a power factor corrector, and specifically to the correction of the power factor on a multiple phase AC to DC converter.

DESCRIPTION OF THE RELATED ART

Primary power distribution is available from single-phase and poly-phase alternating-current (AC) generation facilities. Equipment connected to those sources are usually required to support multiple users in a mutually, non-interfering manner. The power source has a number of relevant parameters and control ranges for voltage, supportable load current, and "purity" of the source. Users of the source may be required to avoid generation of signals impressed on mutually used power lines, as well as avoid altering the phase angle between the supported current load and the voltage supplied.

A purely resistive load current is single-frequency sinusoidal, in-phase with the source voltage, and with little waveform distortion. Many common "Rectifier" circuits produce load currents that are severely distorted, produce high-frequency components of current load, and require large components. There is a need for a method and apparatus, especially at higher power levels, that can efficiently convert an available AC power source voltage to a useable DC voltage.

SUMMARY OF THE INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

In one aspect the invention is about a digital power factor correction (DPFC) controller for controlling a poly-phase AC to DC rectifier power converter, said DPFC controller comprising one or more digital circuit assemblies, one of each said circuit assemblies dedicated to each phase, wherein one of each said phase assemblies capable of AC to DC conversion, one or more pulse width modulator (PWM) multipliers per phase, a full wave rectifier for each phase, which presents a half sine wave bump, which is then multiplied by replica of a sine wave and wherein the output of each phase is added. In another aspect, said one or more PWM waveshapes results in low harmonic currents from the source, DC plus second harmonic AC sums from said one or more sources results in a pure DC output, the full-wave rectifier per-phase is the PWM bridge; and reduced DC filtering is required. In yet another aspect, said DPFC is a Field Programmable Gate Array (FPGA).

In one aspect, the invention is about a method of controlling a digital power factor correction (DPFC) controller for controlling a poly-phase AC to DC rectifier power converter, said method comprising, providing one or more digital circuit assemblies, one of each said circuit assemblies dedicated to each phase, wherein one of each said phase assemblies capable of AC to DC conversion, providing one or more pulse width modulator multipliers per phase, providing a full wave rectifier for each phase, which presents a half sine wave bump, which is then multiplied by replica of a sine wave and adding the output of each phase is added. In another aspect, said one or more PWM waveshapes results in low harmonic currents from the source, DC plus second harmonic AC sums from said one or more sources results in a pure DC output, the full-wave rectifier per-phase is the PWM bridge and reduced DC filtering is required. In yet another aspect, said DPFC is a Field Programmable Gate Array (FPGA).

Other features and advantages of the present invention will become apparent upon examining the following detailed description of an embodiment thereof, taken in conjunction with the attached drawings.

BRIEF DESCRIPTION OF THE DRAWINGS

FIG. 26 shows the ZC_TB Verilog Code written to produce Pos, Neg, and Counter Signals, according to an exemplary embodiment of the invention.

FIGS. 27-29 shows various Verilog Code simulations, according to an exemplary embodiment of the invention.

FIG. 30 shows the ZCTB Verilog Code written to produce Pos, Neg, and Counter Signals, according to an exemplary embodiment of the invention.

FIG. 33 shows the ZC_TB Verilog Code written to produce Pos, Neg, and Counter Signals, according to an exemplary embodiment of the invention.

FIGS. 47-48 show various schematics, according to an exemplary embodiment of the invention.

FIGS. 49-50 show various Verilog Code simulations, according to an exemplary embodiment of the invention.

FIG. 51 shows a simulation, according to an exemplary embodiment of the invention.

FIG. 52 shows a latch RB Schematic, according to an exemplary embodiment of the invention.

FIGS. 59-61 show Verilog Code, according to an exemplary embodiment of the invention.

FIG. 62 shows a simulation, according to an exemplary embodiment of the invention.

FIGS. 64-65 show Verilog Code, according to an exemplary embodiment of the invention.

FIGS. 66-68 show a simulation, according to an exemplary embodiment of the invention.

FIGS. 70-71 show Verilog Code, according to an exemplary embodiment of the invention.

Figures 74, 75:
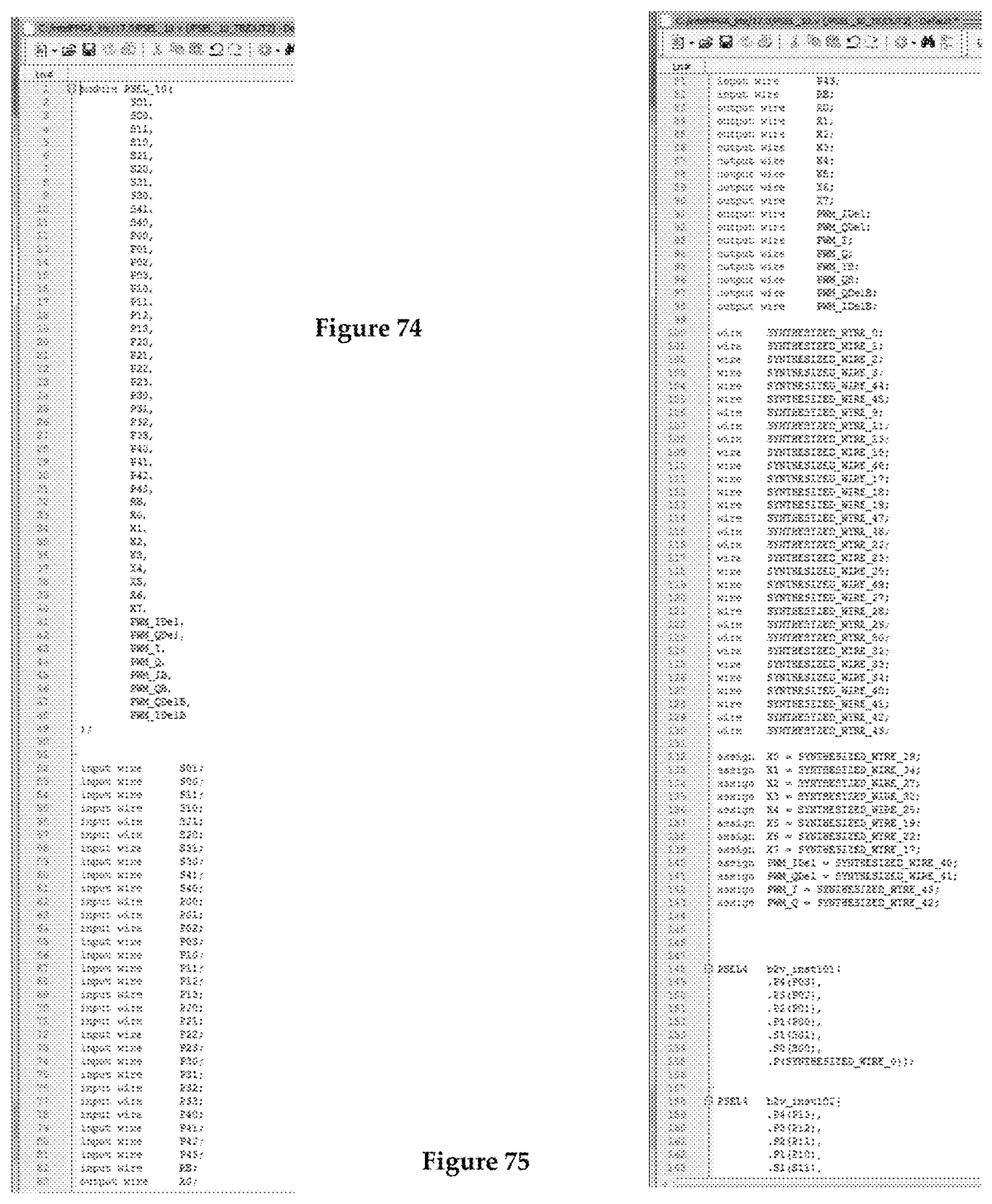
Figures 76, 77:
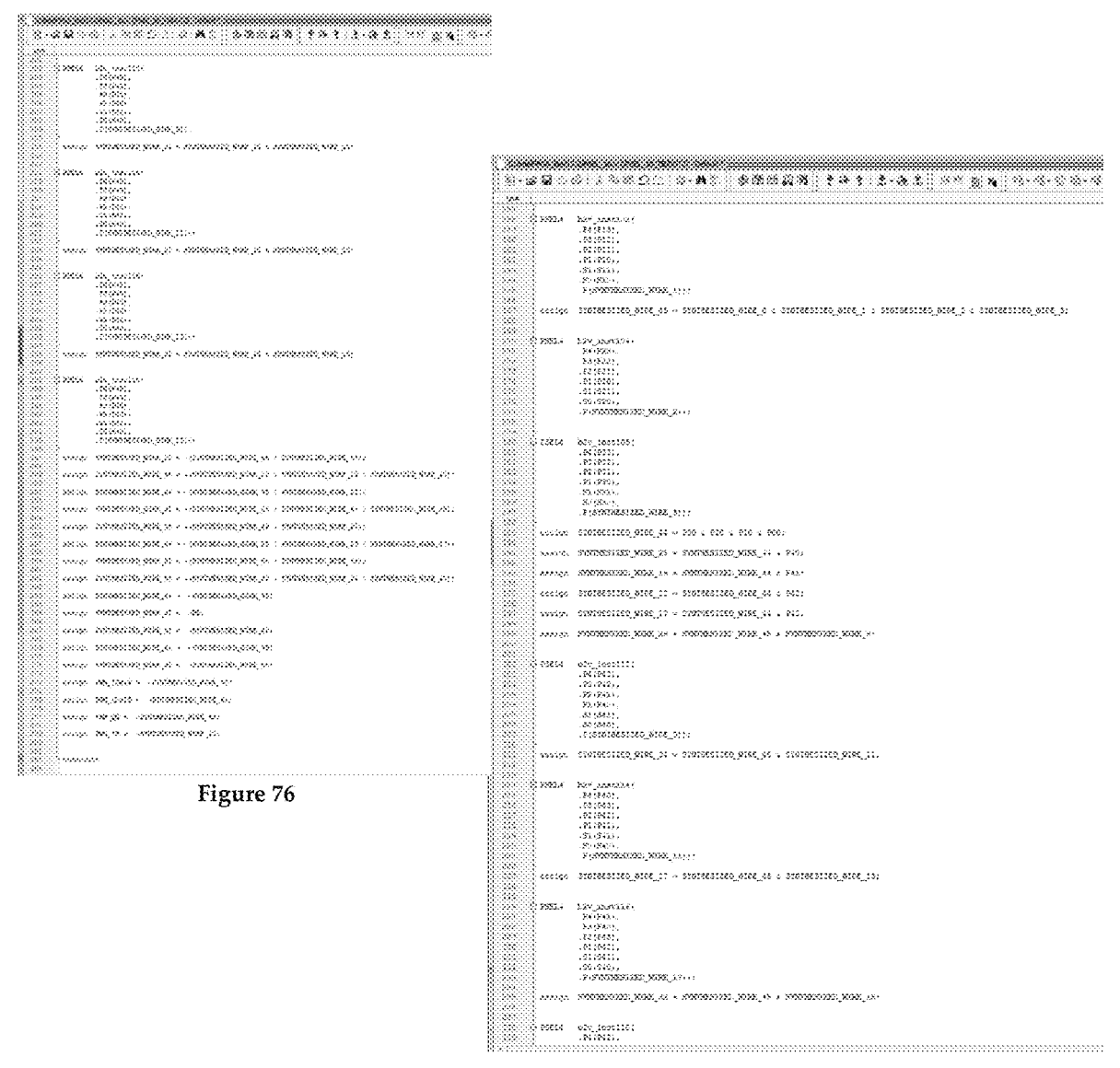

FIGS. 74-78 show Verilog Code, according to an exemplary embodiment of the invention.

FIGS. 79-81 show simulations, according to an exemplary embodiment of the invention.

Figures 83, 84:
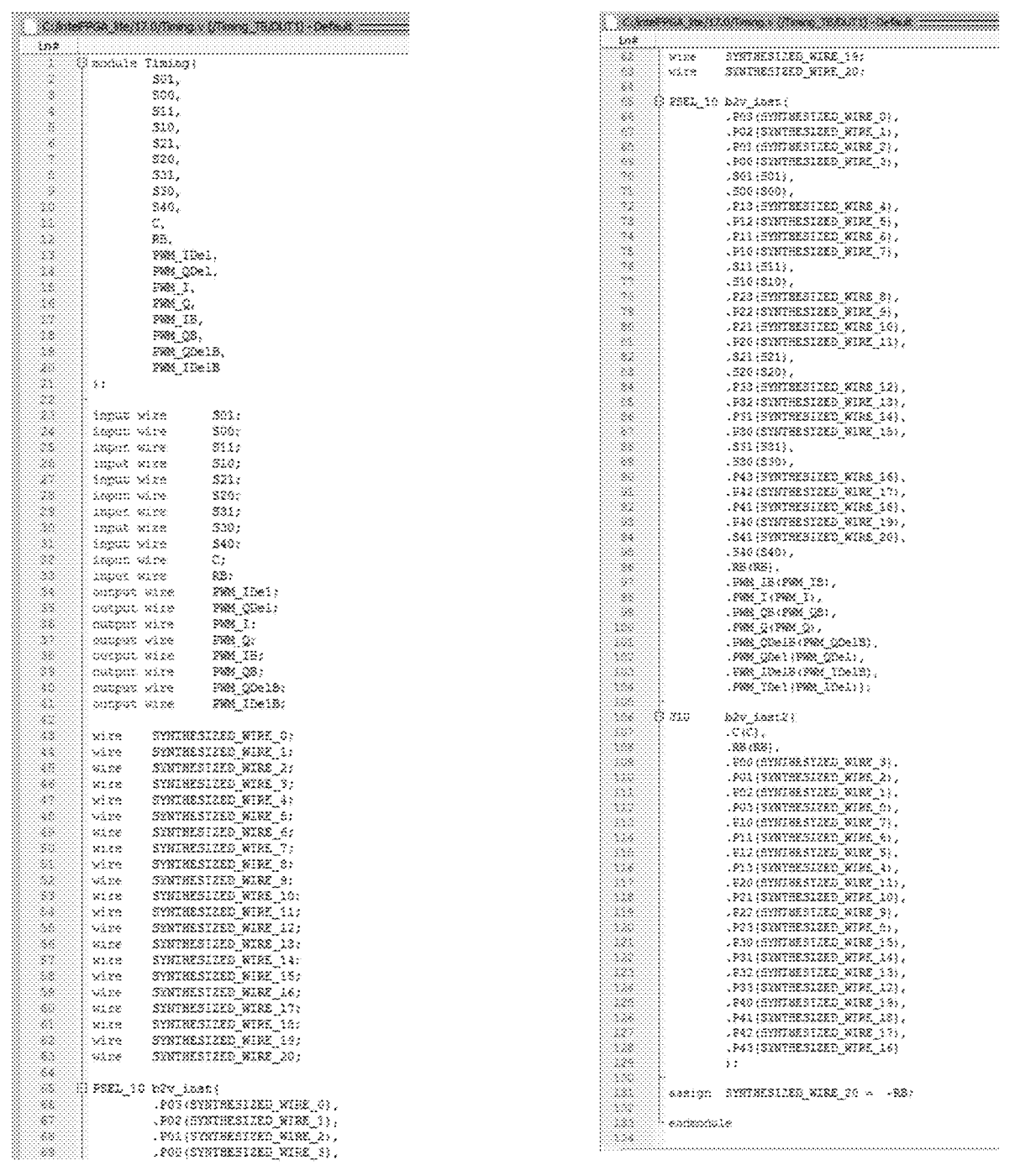

FIGS. 83-84 show simulations, according to an exemplary embodiment of the invention.

Figure 85:
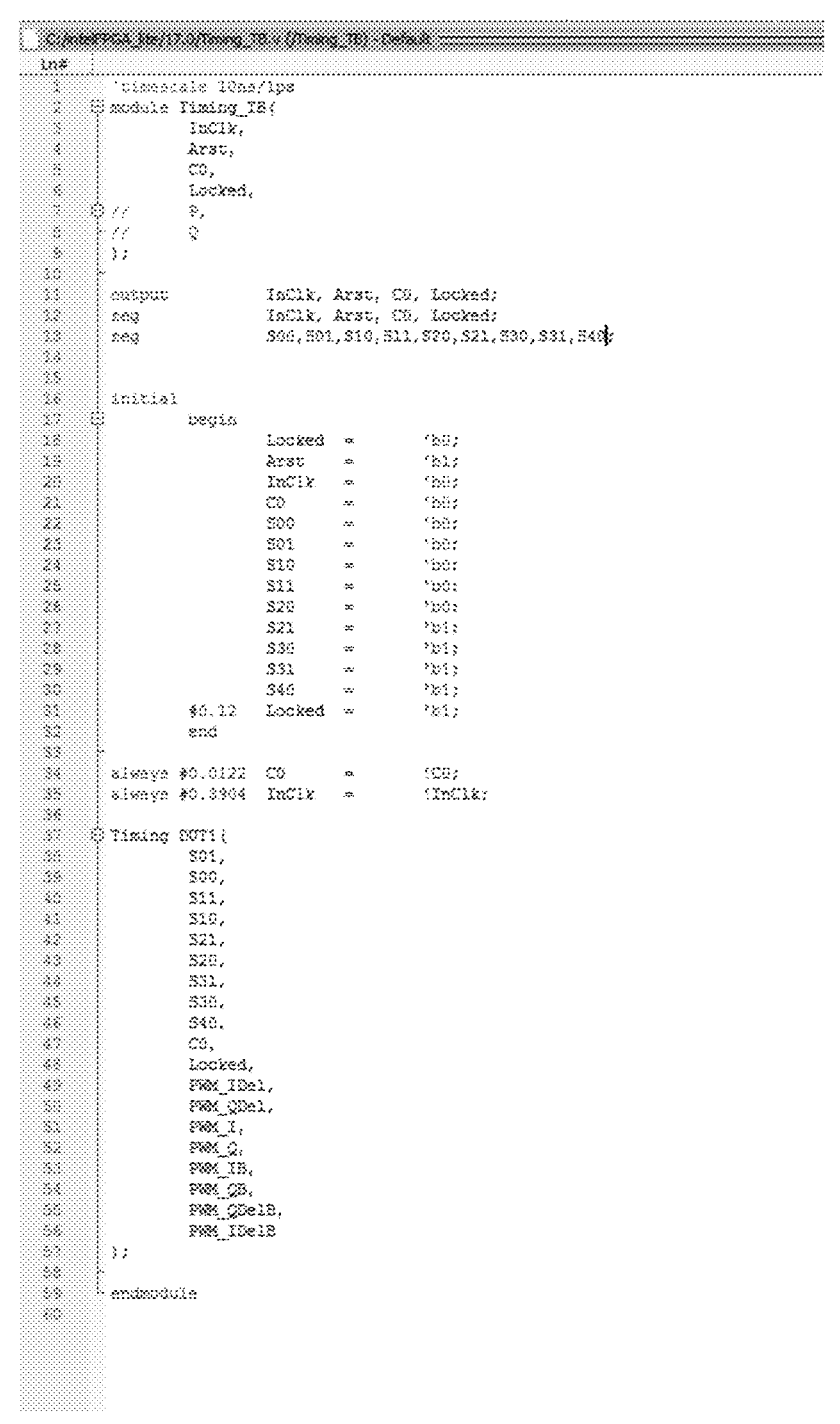

FIG. 85 shows Verilog Code, according to an exemplary embodiment of the invention.

Figure 1:
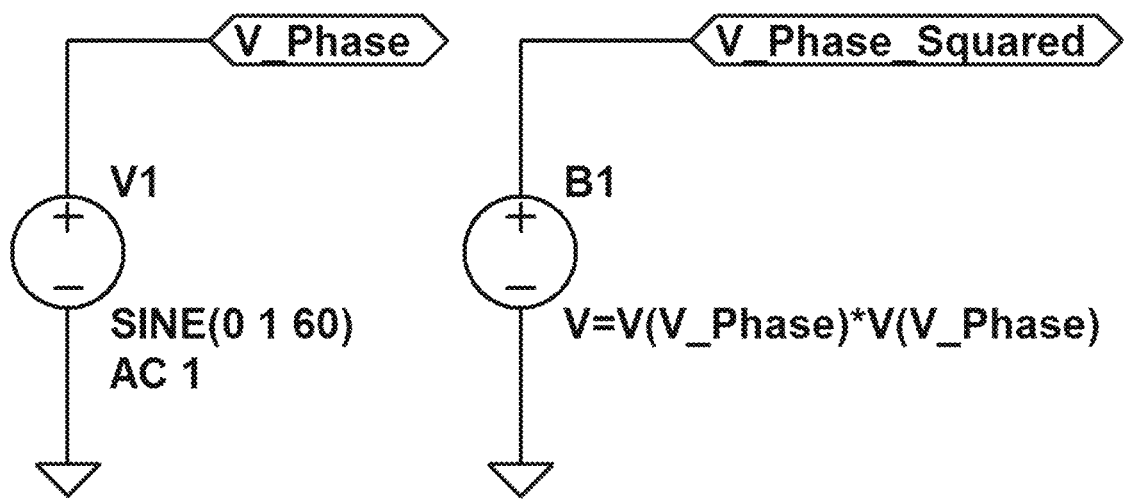
FIG. 1 shows an electrical schematic, according to an exemplary embodiment of the invention.

The above-described and other features will be appreciated and understood by those skilled in the art from the following detailed description, drawings, and appended claims.

DETAILED DESCRIPTION OF THE PREFERRED EMBODIMENT

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

To provide an overall understanding of the invention, certain illustrative embodiments and examples will now be described. However, it will be understood by one of ordinary skill in the art that the same or equivalent functions and sequences may be accomplished by different embodiments that are also intended to be encompassed within the spirit and scope of the disclosure. The compositions, apparatuses, systems and/or methods described herein may be adapted and modified as is appropriate for the application being addressed and that those described herein may be employed in other suitable applications, and that such other additions and modifications will not depart from the scope hereof.

Simplifications or omissions may be made to avoid obscuring the purpose of the section. Such simplifications or omissions are not intended to limit the scope of the present invention. All references, including any patents or patent applications cited in this specification are hereby incorporated by reference. No admission is made that any reference constitutes prior art. The discussion of the references states what their authors assert, and the applicants reserve the right to challenge the accuracy and pertinence of the cited documents. It will be clearly understood that, although a number of prior art publications are referred to herein, this reference does not constitute an admission that any of these documents form part of the common general knowledge in the art.

As used in the specification and claims, the singular forms "a", "an" and "the" include plural references unless the context clearly dictates otherwise. For example, the term "a transaction" may include a plurality of transaction unless the context clearly dictates otherwise. As used in the specification and claims, singular names or types referenced include variations within the family of said name unless the context clearly dictates otherwise.

Certain terminology is used in the following description for convenience only and is not limiting. The words "lower," "upper," "bottom," "top," "front," "back," "left," "right" and "sides" designate directions in the drawings to which reference is made, but are not limiting with respect to the orientation in which the modules or any assembly of them may be used.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

The present invention relates to a method and apparatus described herein uses modern digital logic that is used to meet the need by controlling Switch-Mode Power System (SMPS) components to produce efficient conversion of the AC input source to a DC output load, maintain a near-unity Power Factor Control (PFC), require relatively small components for energy storage and filtering, as well as support a form of soft-start load application to a Poly-Phase AC source.

Sine-Squared Properties

Figure 2:
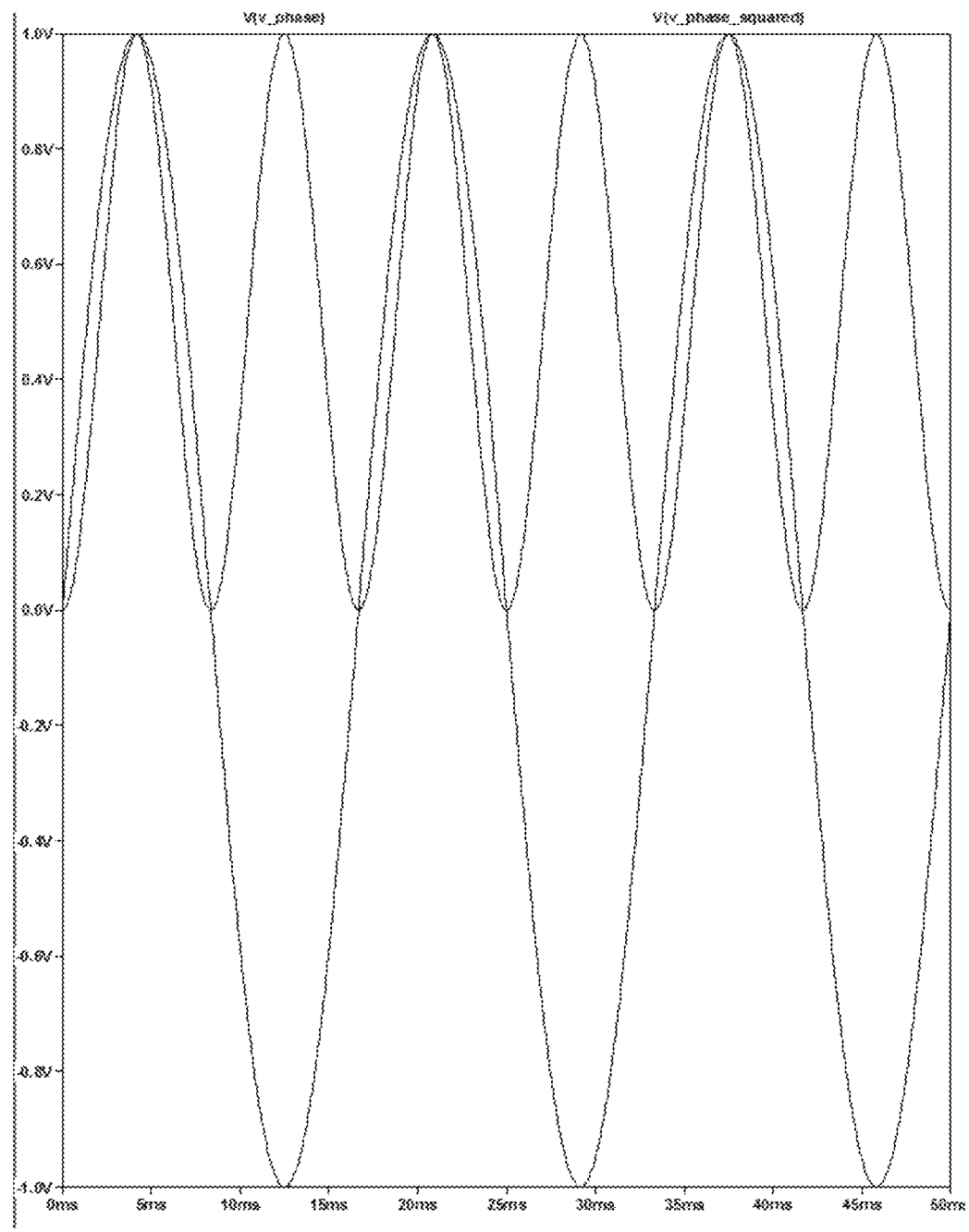
FIG. 2 shows an electrical simulation of the schematic in FIG. 1, according to an exemplary embodiment of the invention.

The voltage of each phase of the poly-phase source is modulated by a "Pulse-Width-Modulation" with a duty-cycle that varies in proportion to the sine of the phase-angle of that source. The resultant waveform has an average voltage proportional to the source voltage squared. Each resultant waveform consists of a DC plus AC at twice the source-line frequency according to the well-known mathematical identity (FIGS. 1-2):

$$V_{Phase-Peak}\sin^2(\omega t) = \frac{V_{Phase-Peak}}{2}(1-\cos(2\omega t))$$

Figure 3:
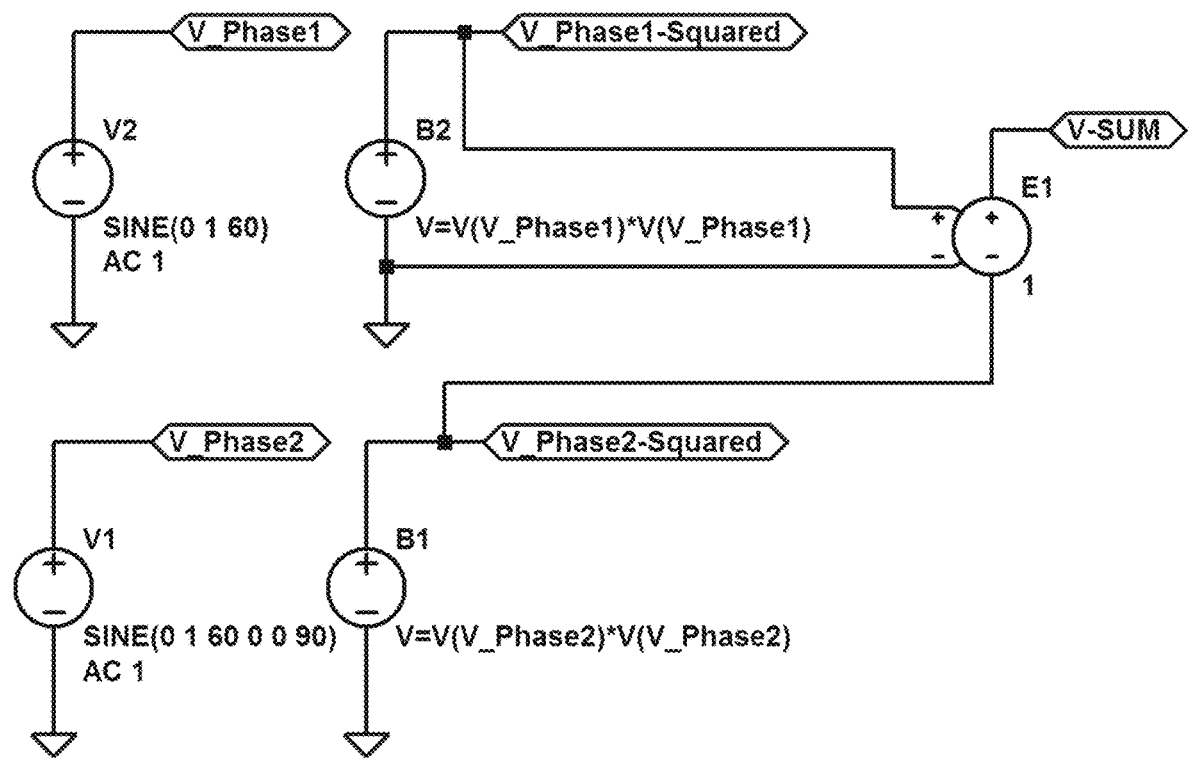
FIG. 3 shows an Electrical Schematic for Showing Two-Phase Results, according to an exemplary embodiment of the invention.
Figure 4:
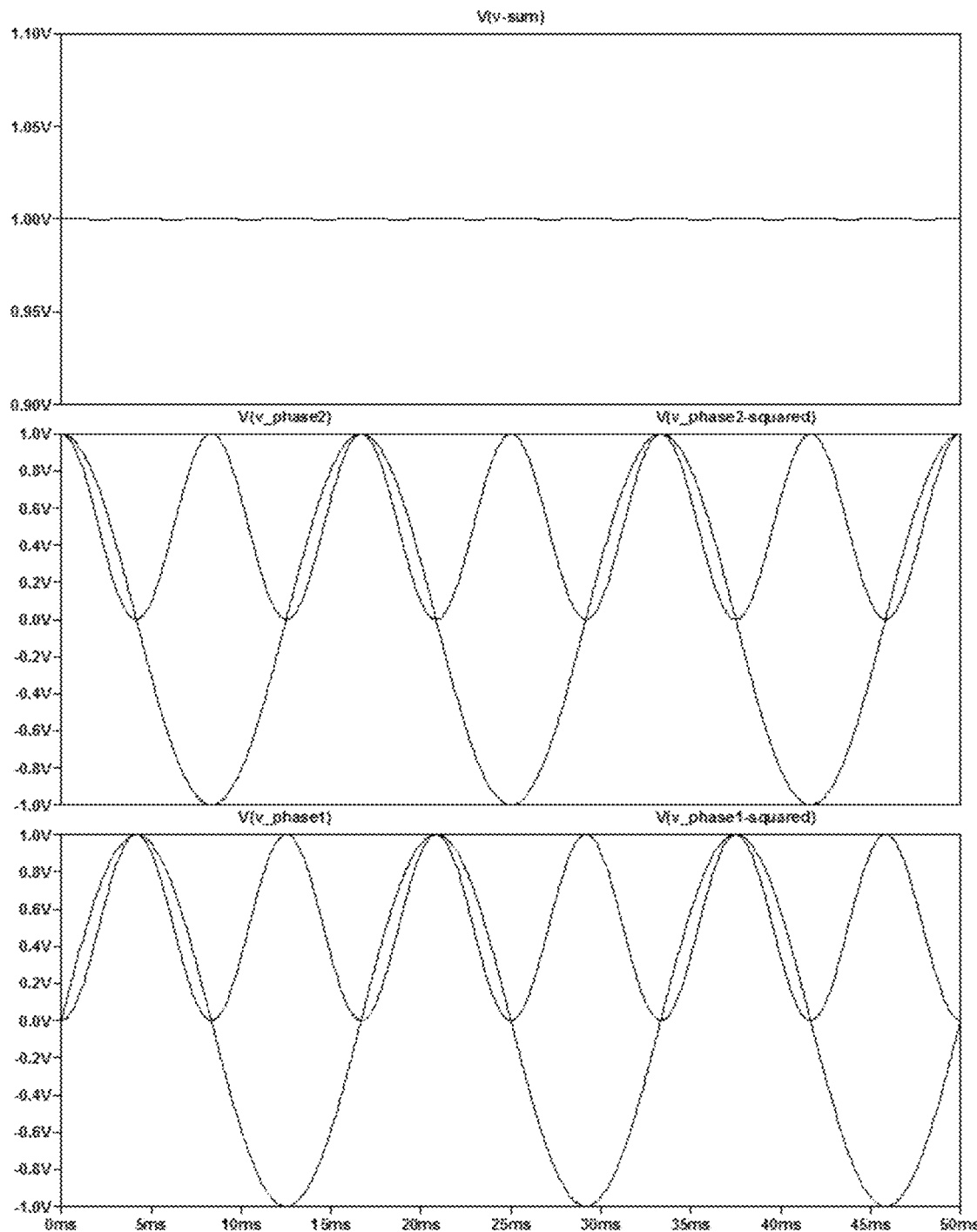
FIG. 4 shows an electrical simulation of the schematic in FIG. 3, according to an exemplary embodiment of the invention.

Poly-phase sources are designed so that the average power produced from the assemblage of all phases is relatively constant because the instantaneous sum of the phasor powers is constant. For the least-number case of two phases, the instantaneous voltages are at 90 degrees separation and the results follow, FIGS. 3-4.

Figure 5:
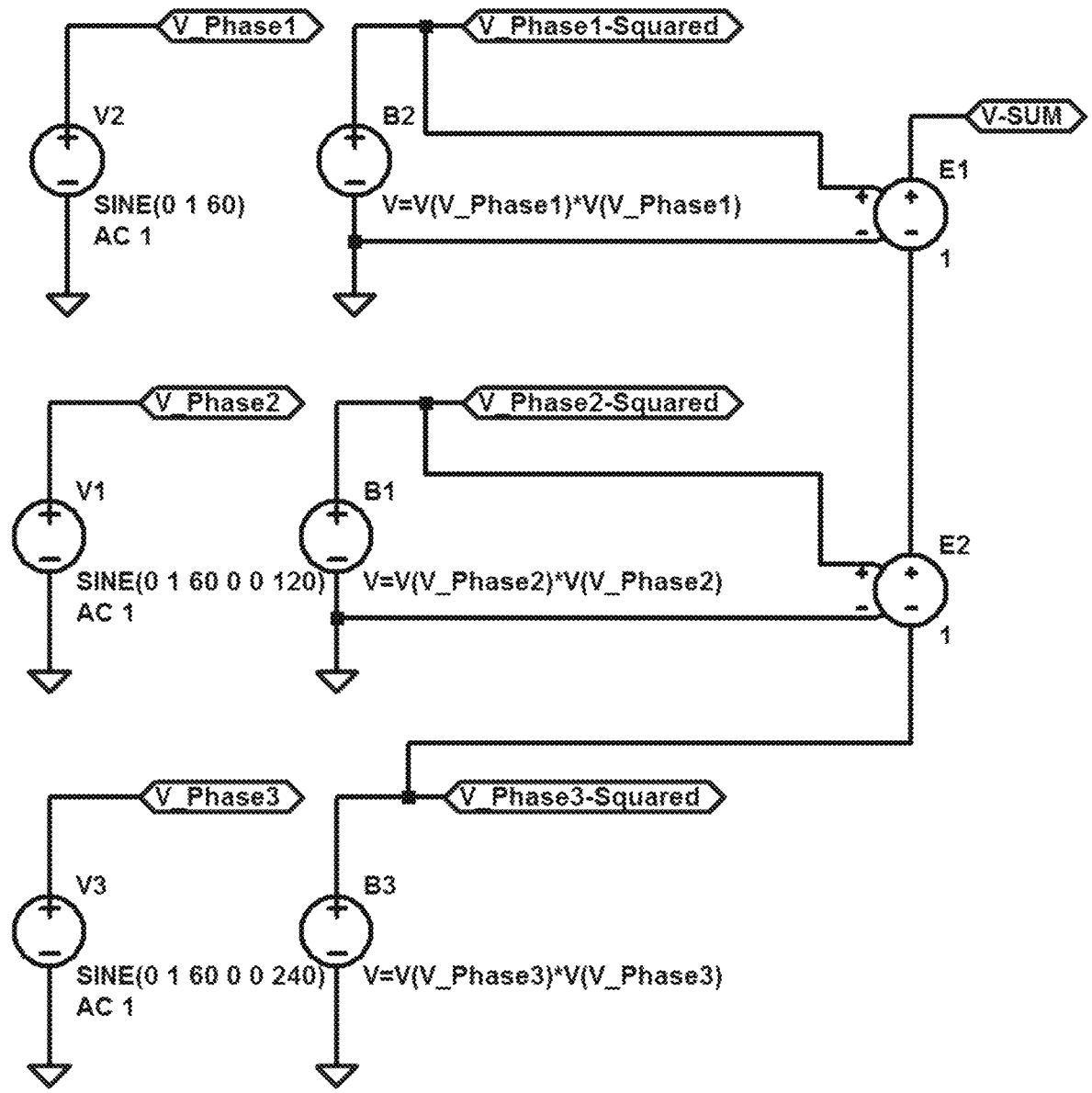
FIG. 5 shows an Electrical Schematic for Showing Three-Phase Results, according to an exemplary embodiment of the invention.
Figure 6:
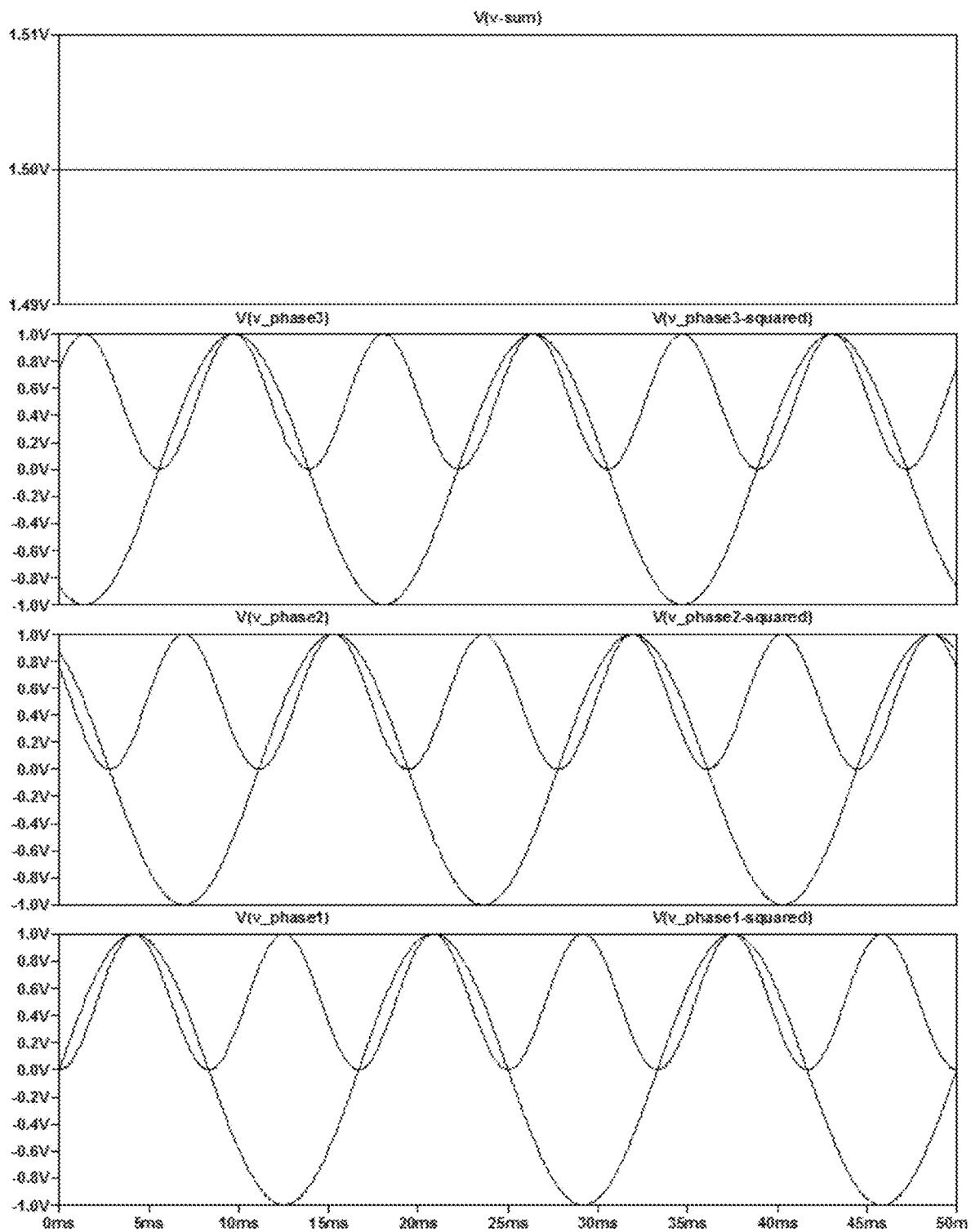
FIG. 6 shows an electrical simulation of the schematic in FIG. 5, according to an exemplary embodiment of the invention.

We can extend the Two-Phase Case to as many phases as we require; three-phase being the most wide-spread case for power distribution with 120-degree separation (FIGS. 5-6). The results show the effects of multiplying a sine-wave source by an in-phase source at the same frequency and phase. The instantaneous product is a DC constant plus a twice-frequency AC waveform. The illustration using the square of voltages is exact whenever each phase is presented with equal resistive loads with value "R" and the instantaneous power is the ratio: $V^2/R$ for each phase. Insofar as the current is derived also in-phase and instantaneously proportional, the result is the same using the voltage x current product and is the fundamental reason that unity Power-Factor is desired as a balanced load condition for poly-phase sources; the total power is constant.

This method and apparatus produces the desired unity Power-Factor result by utilizing digital methods to control a PWM modulator and provide the requisite sine-squared behavior for good Power Factor.

Zero-Crossing Detector Sub-System—

Figure 7:
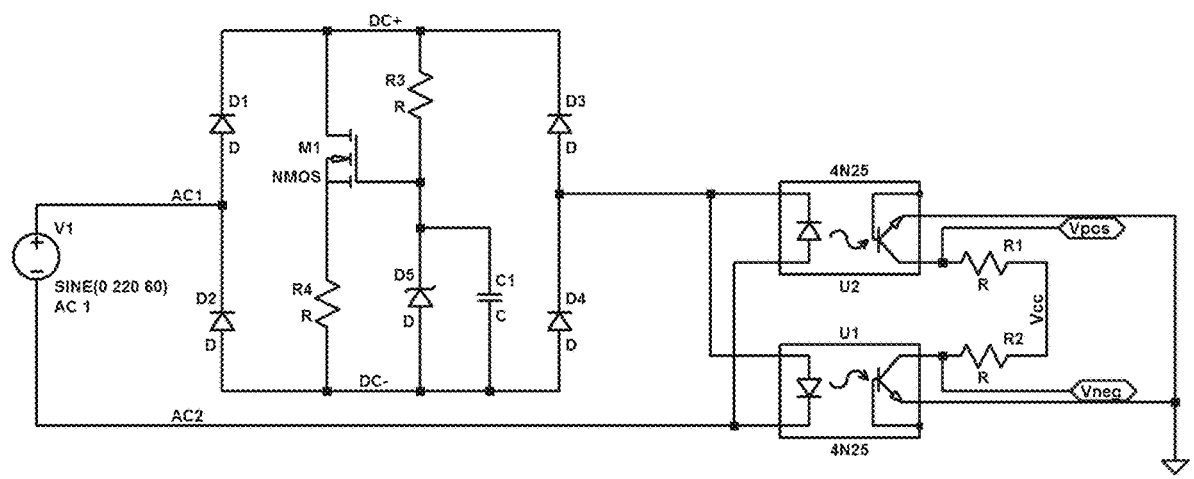
FIG. 7 shows an electrical schematic for showing zero-crossing detector, according to an exemplary embodiment of the invention.
Figure 8:
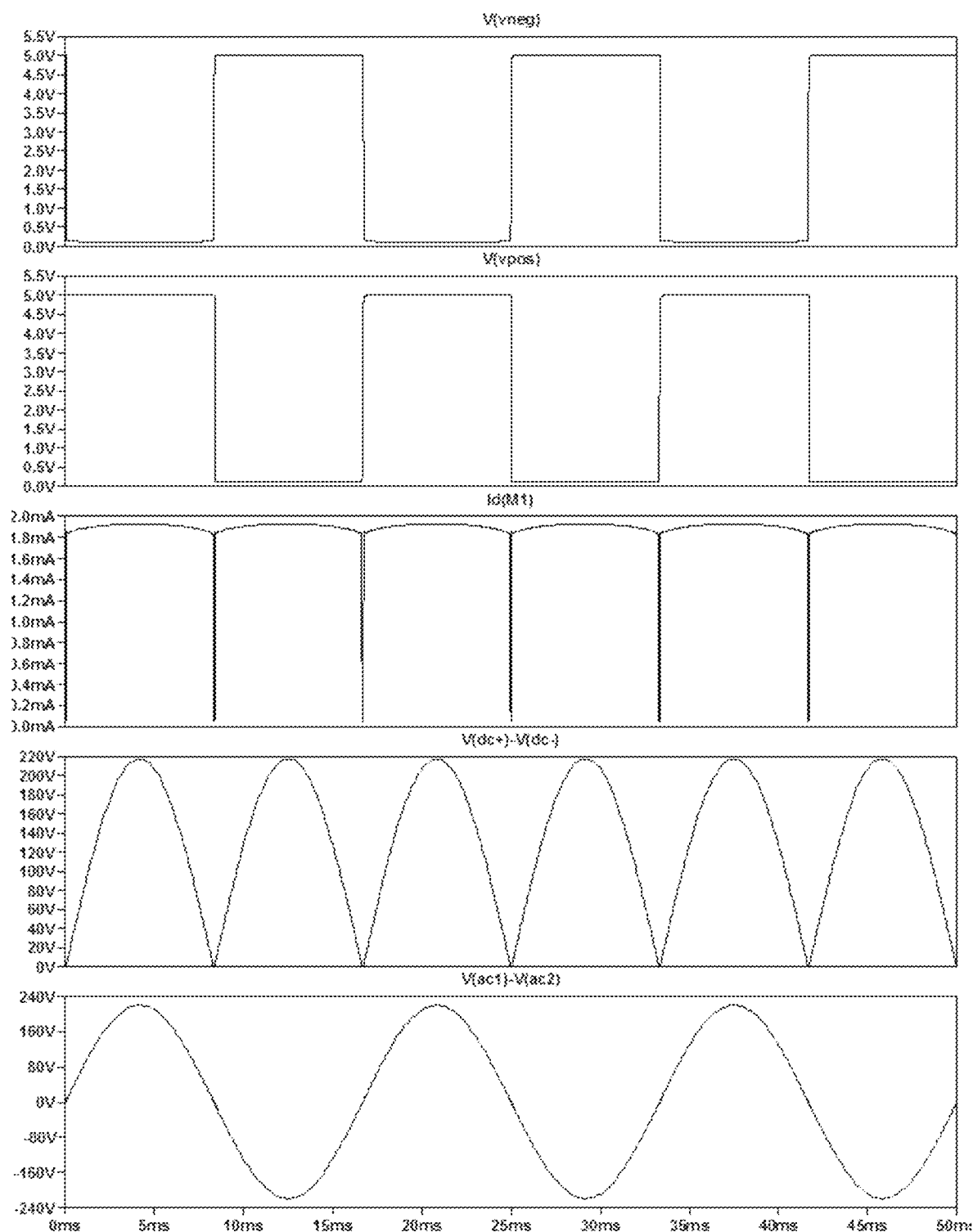
FIGS. 8-9 show electrical simulations for showing zero-crossing, according to an exemplary embodiment of the invention.
Figure 9:
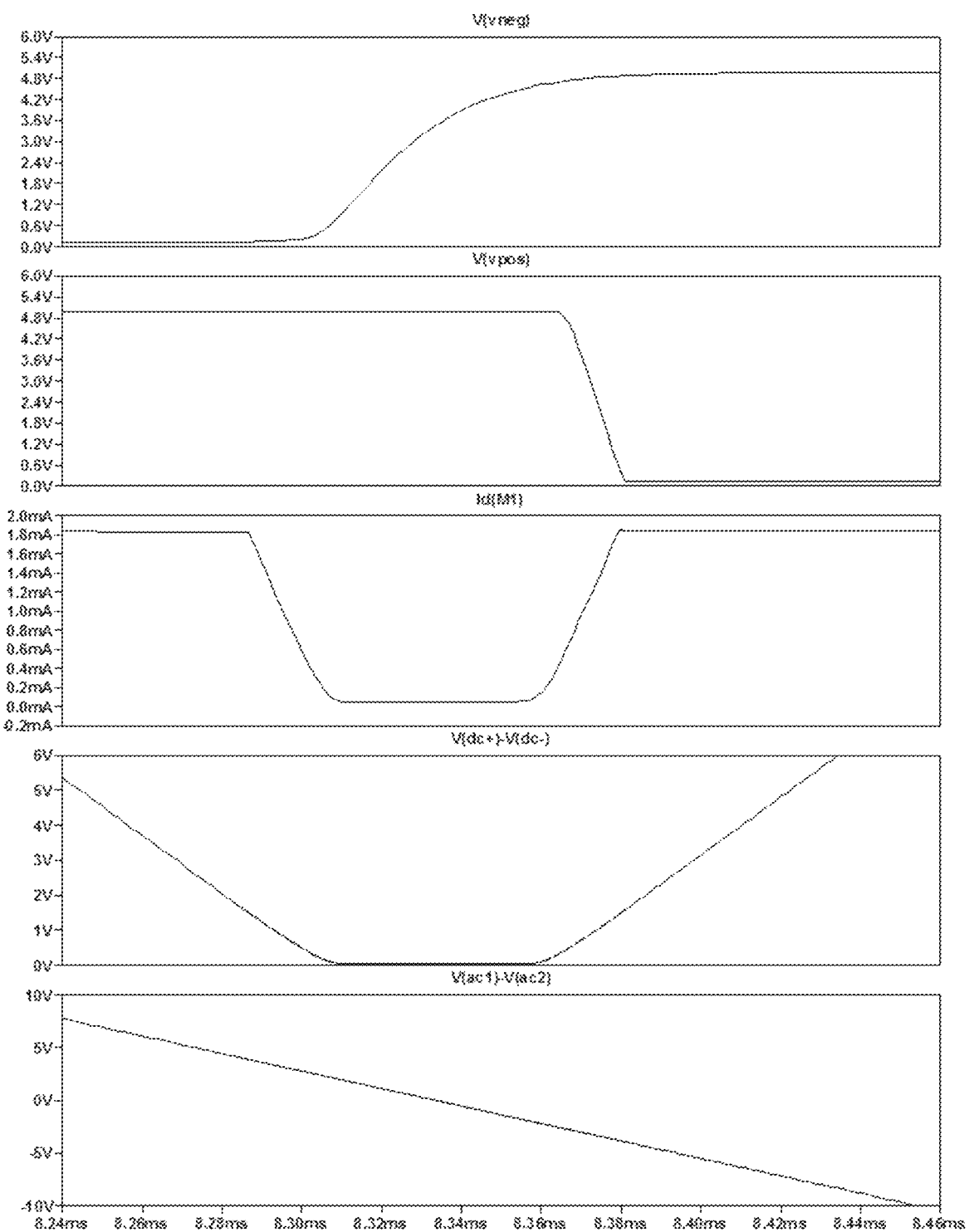

Each phase of the poly-phase source provides an individual zero-crossing timing reference for the digital apparatus (FIGS. 7-9). The Zero-Crossing Detector consists of several sub-functions. The full-wave diode bridge rectifier, consisting of elements D1, D2, D3, and D4 convert the AC sine waveform of ($V_{AC1}-V_{AC2}$) shown in the bottom pane of the electrical simulation above, to the pulsating waveform of ($V_{DC+}-V_{DC-}$) just above. The components of elements NMOSFET M1, resistors R3 & R4, Zener diode D5, and capacitor C1, act as a current limiting circuit (known to one skilled in the art) that limits the current taken from the AC supply and directed through the full-wave diode bridge rectifier to a maximum design value (shown here as ~2 milli-Ampere) to protect the back-to-back diodes of the optical couplers U1 & U2, as well as minimize the parasitic power needed to make the zero-crossing determinations. Each optical coupler provides a positive pulse corresponding to a half-cycle of the AC source. As shown, $V_{neg}$ is a positive pulse during most of the interval when the AC source is negative, and $V_{pos}$ is a positive pulse during most of the interval when the AC source is positive.

In the detail, we see the ($V_{AC1}-V_{AC2}$) waveform passing through zero volts in a positive to negative transition. The current limiter shows that the current declines to zero and stays near zero at the voltage zero-crossing. We see that the $V_{pos}$ and $V_{neg}$ transitions are near each other but not simultaneous and occur closely surrounding the actual zero-crossing event. We use half the time interval between the $V_{pos}$ and $V_{neg}$ transitions to closely approximate the actual zero-crossing event.

The zero-crossing circuit is implemented as shown in the schematic and provides the two signals at the $V_{pos}$ and $V_{neg}$ transitions. This circuit is realized in the form shown so that each of the power phases can be monitored individually and each pair of timing signals for each phase can be isolated using optical isolators or other means and provide galvanic isolation between the phases of the poly-phase power source.

We also utilize similar optical isolators or other means at the output of the digital logic portion of the sine-squared digital controller so that all the logic is expressed in a single Field-Programmable Logic Array (FPGA) device operating from its own independent DC logic supply.

Pulse-Width Modulator (PWM) Requirements—

Figure 10:
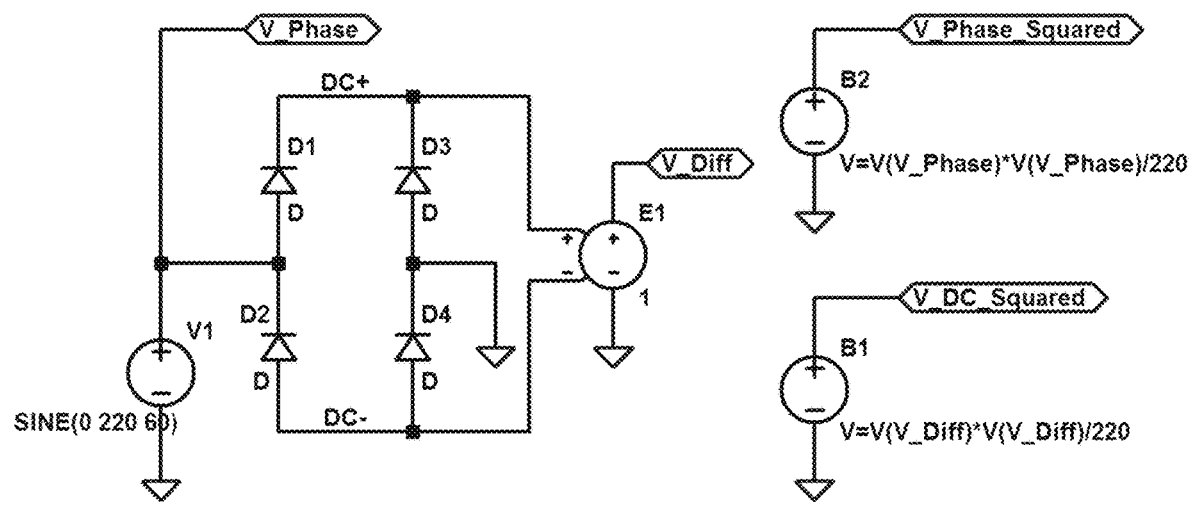
FIG. 10 shows an electrical schematic, according to an exemplary embodiment of the invention.
Figure 11:
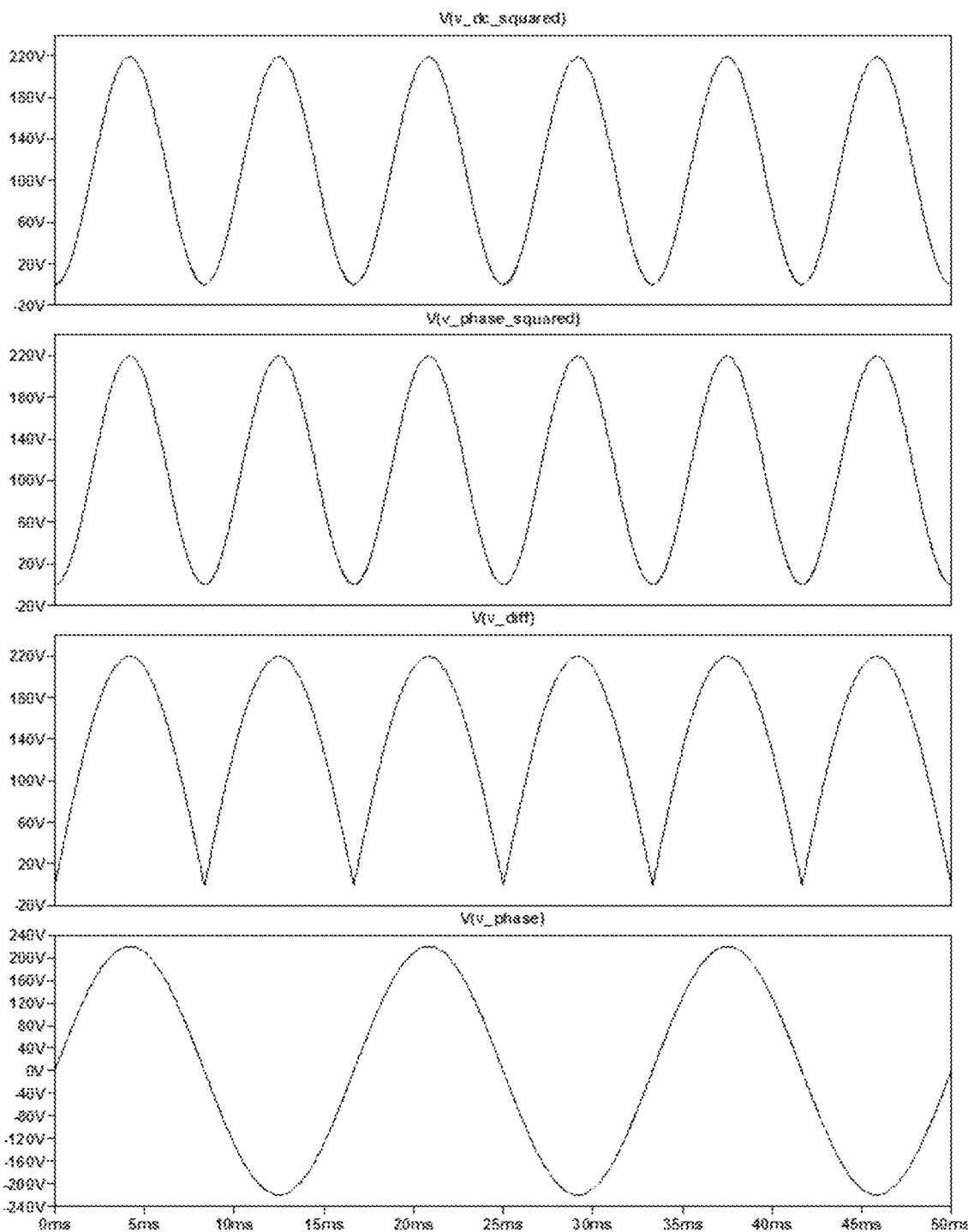
FIG. 11 shows an electrical simulation, according to an exemplary embodiment of the invention.
Figure 12:
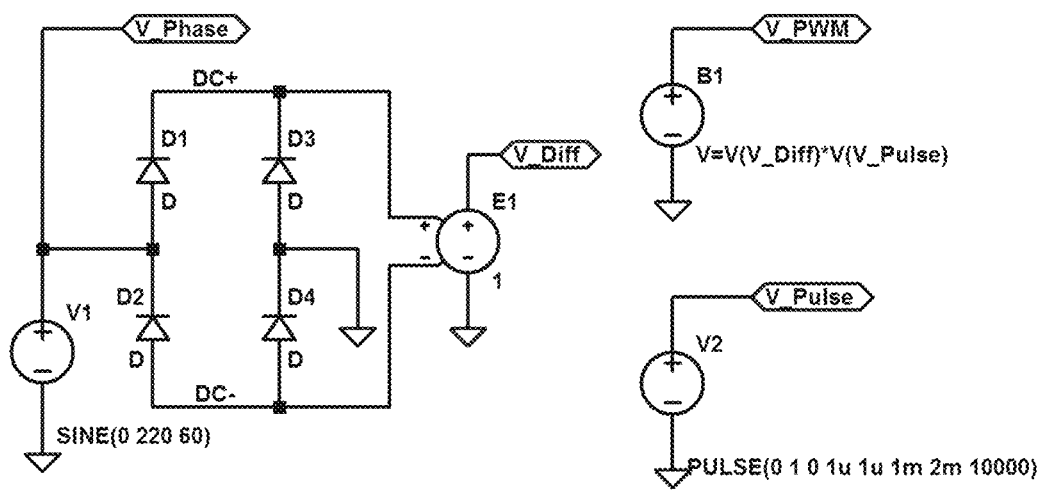
FIG. 12 shows an electrical schematic, according to an exemplary embodiment of the invention.
Figure 13:
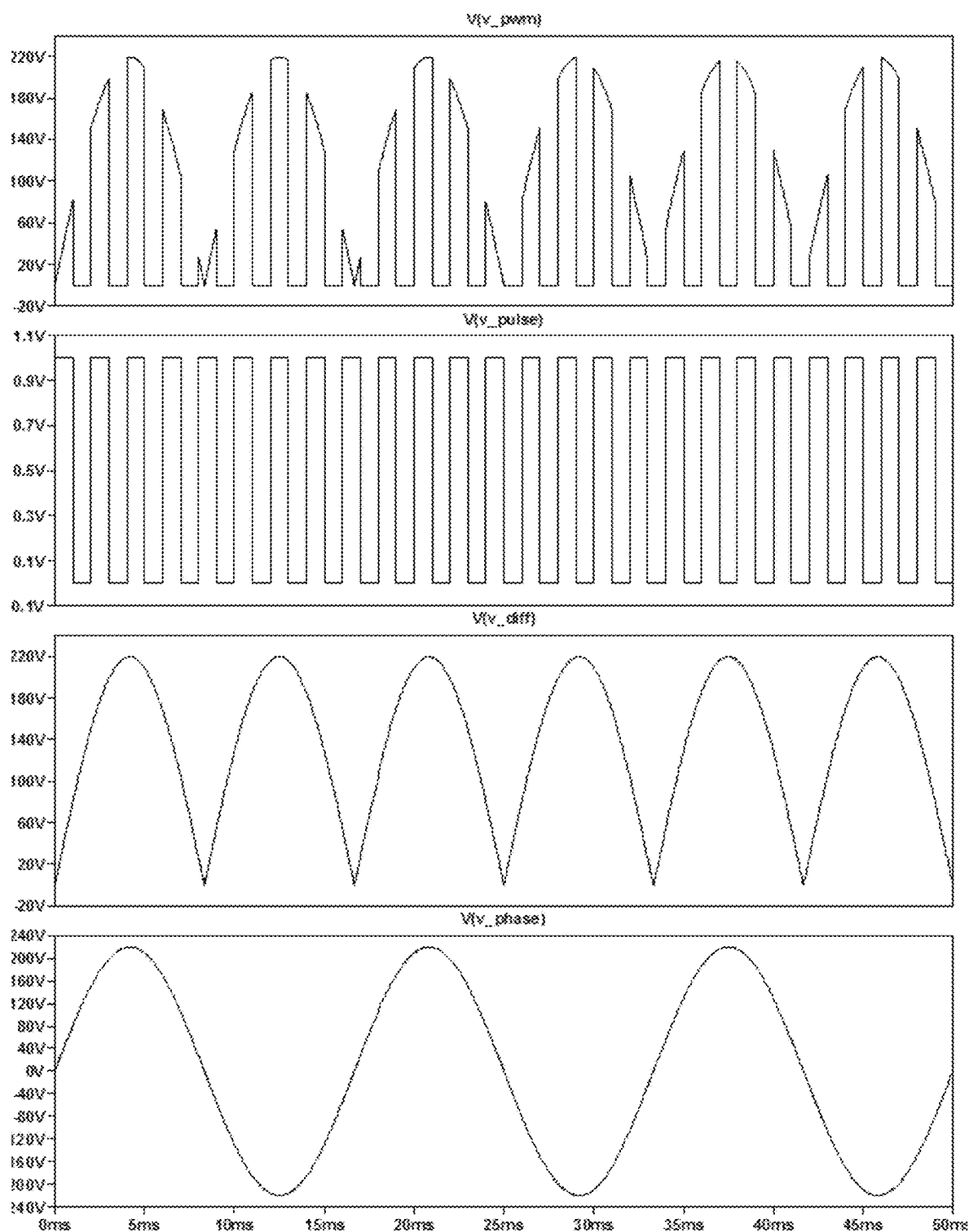
FIG. 13 shows an electrical simulation, according to an exemplary embodiment of the invention.

We use a PWM approach to multiply the available sine-wave source waveform by a sine-wave gain function. We have shown above that the voltage-squared summation from poly-phase sources provides the resultant DC in the summation. Herein we recognize a half-wave symmetry and use it to reduce the range of voltages impressed on the PWM circuitry. We utilize a Full-Wave Bridge Rectifier to produce a pulsating DC voltage from each phase as shown in FIGS. 10-11.

Using the Full-Wave Rectifier consisting of D1, D2, D3, and D4, we have converted the 220 VAC, 60 Hz (FIGS.

12-13) sinewave of V_Phase into the pulsating half-sine waveform of V_Diff as known to all skilled in the art. The transformation is utilized prior to the PWM circuitry in order to make the time-dependent voltage excursions half as large, and the period of the repetitive waveform half as long a duration. We show that the square of the original AC waveform and the square of the V_Diff pulsating waveform produce the same combined AC plus DC result due to the indifference of the squaring action to positive or negative input values. The AC waveform was scaled from unity to the more practical 220 VAC value and one term of the squares was inversely scaled by the same factor in recognition that a PWM can have gain values between zero and unity but no greater.

We show that the V_Pulse waveform has a unity value for ~50% of each square-wave cycle. During that part of its period when its value is "1", the value of V_PWM is identical to V_Diff, but when the V_Pulse waveform is "0" the value of V_PWM is also zero. We express the ON/OFF ratio of V_Pulse as its duty-cycle "D" and use that as the equivalent short-term average multiplication factor of the PWM. As a sine-squared modulation, the value of D must follow a sine function over the period of V_Diff. It follows that D must be zero when V_Diff is zero and unity when V_Diff is maximum, returning to zero as V_Diff decreasing again to zero in each cycle. The method and apparatus of this invention performs the requisite production and application of signals to produce the appropriate duty-cycle modulation. We further modify the scale of the duty cycle pattern to provide an ancillary soft-start PWM feature.

There are a number of PWM systems that can be utilized with the sine-squared duty-cycle control and the one shown below is for illustration purposes using prior art in Switch-Mode Power Systems and should be easily understood by one skilled in the art. The reasons for choosing this example implementation will be discussed in-context.

Full-Wave, H-Bridge, Phase-Overlap, Pulse-Width Modulation (PWM) Example—

Figure 14:
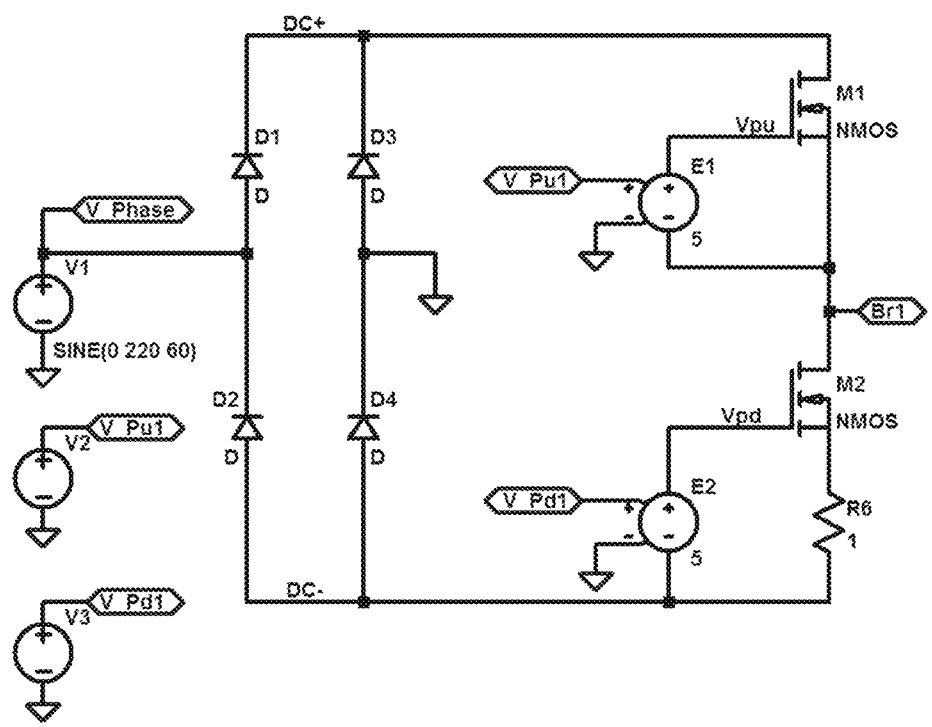
FIG. 14 shows an electrical schematic, according to an exemplary embodiment of the invention.
Figure 15:
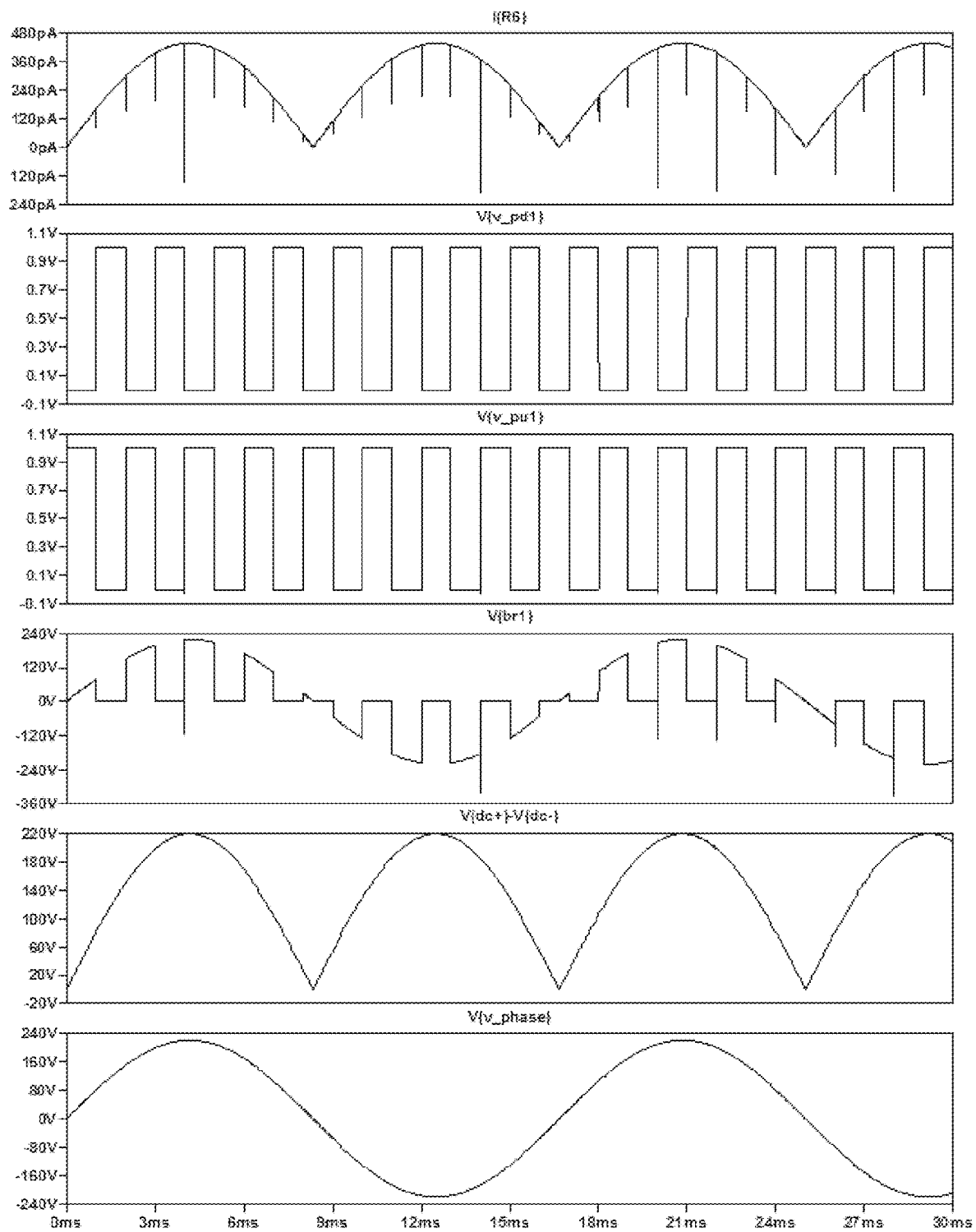
FIGS. 15-16 show electrical simulations for showing zero-crossing, according to an exemplary embodiment of the invention.

We use a Full-Wave, H-Bridge, Phase-Overlap PWM approach to support lowered stress on switching devices, increase the equivalent PWM duty-cycle range, minimize switch timing variations, and numerous other factors involved in producing an isolated output. To begin, we show half the bridge with ~50% square-wave excitation (FIGS. 14-15).

Figure 16:
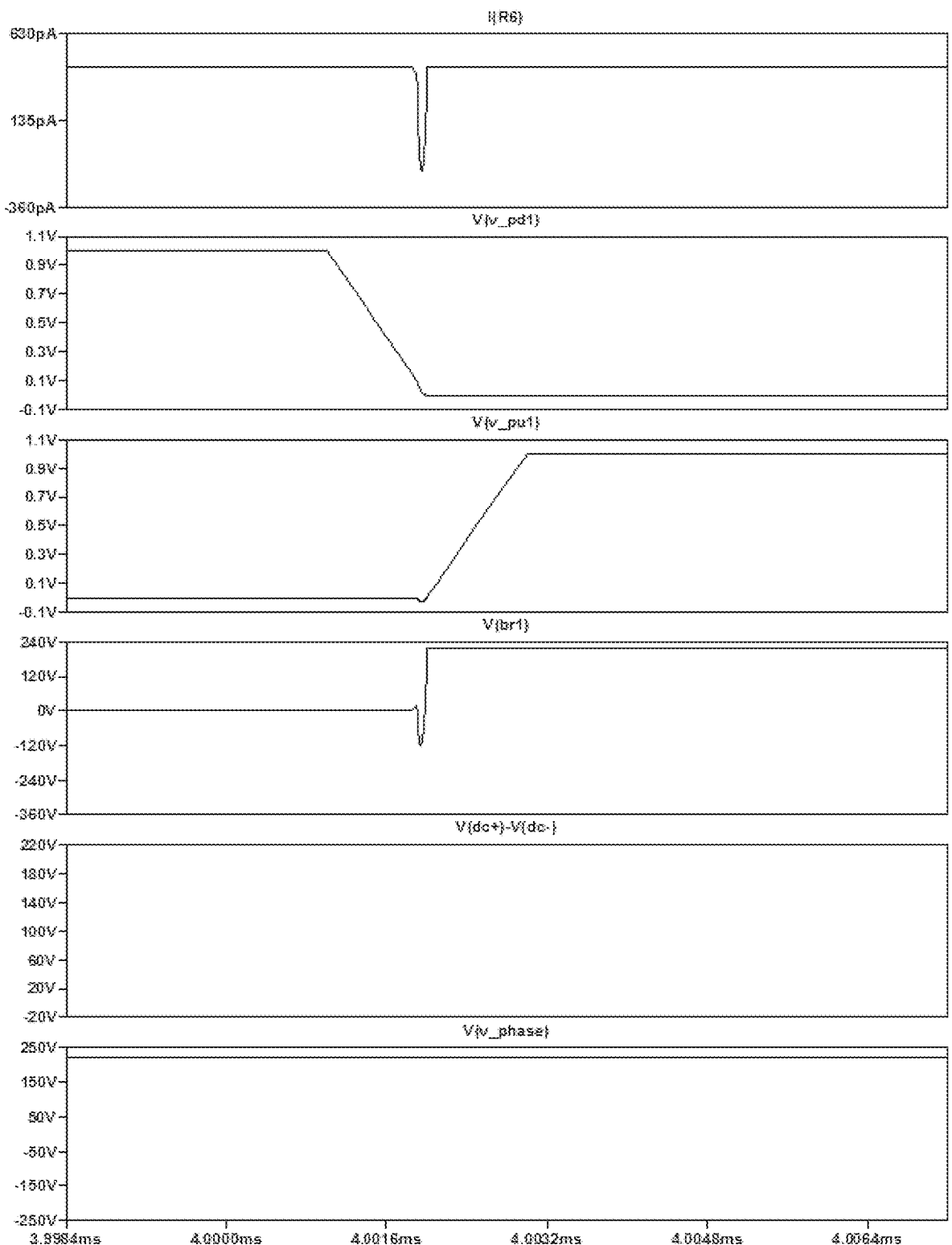

We then utilize (FIG. 16) a complementary square-wave excitation for the V_Pu1 and V_Pd1 gate-drivers for the NMOS switching transistors M1 and M2. The excitation waveforms are required to have very little overlap to prevent "shoot-through" currents as shown in the I(R6) currents in R6. The detail below shows the activations with a non-overlap of V_Pu1 and V_Pd1 gate-drive signals.

Figure 17:
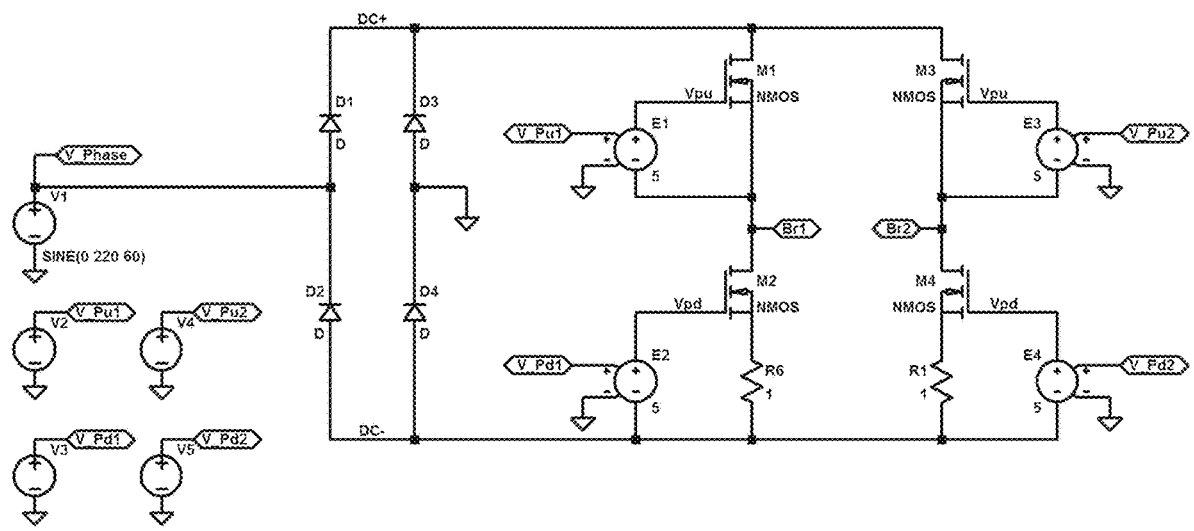
FIG. 17 shows an electrical schematic, according to an exemplary embodiment of the invention.
Figure 18:
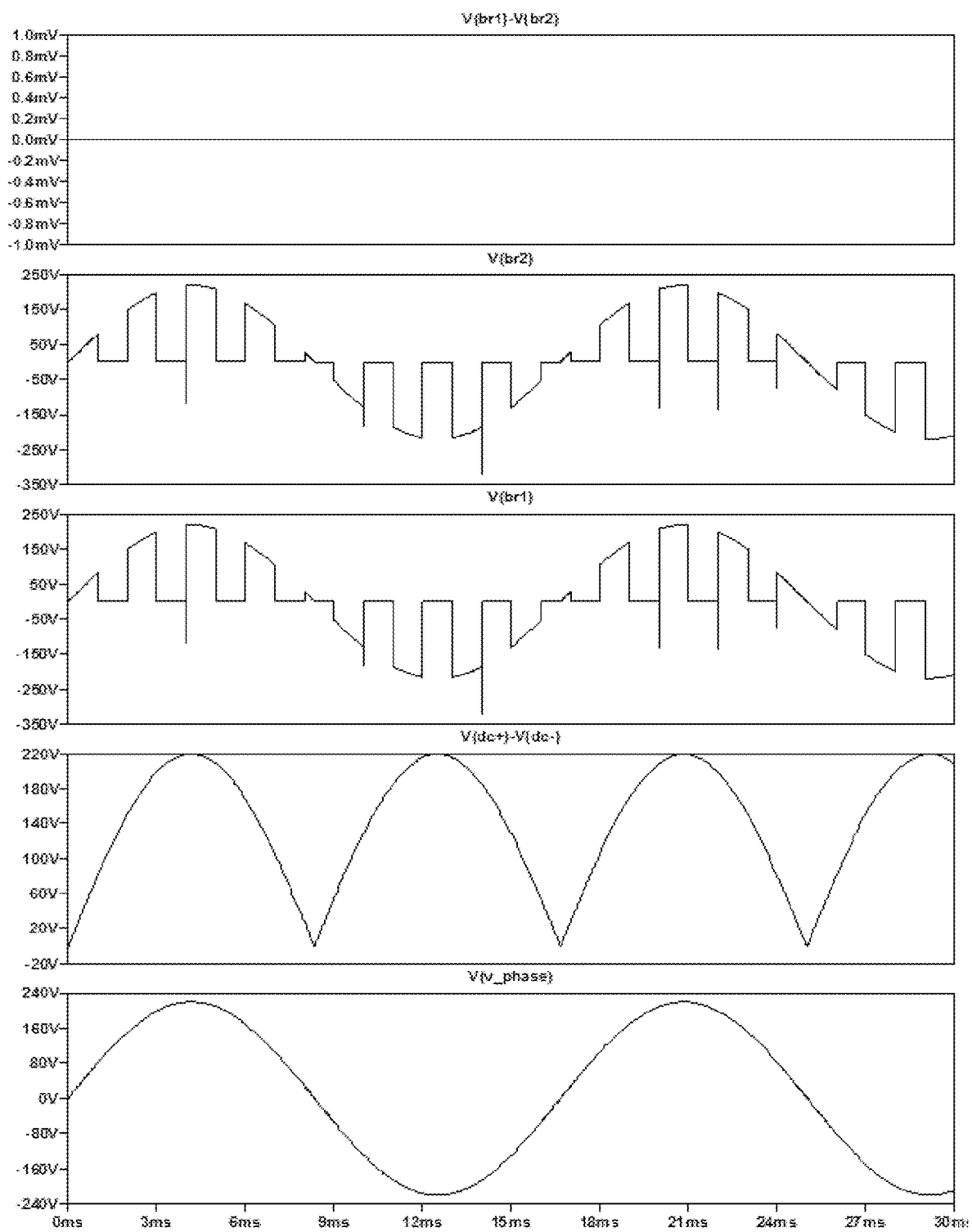
FIGS. 18-21 show electrical simulations for showing zero-crossing, according to an exemplary embodiment of the invention.

The complementary square-wave excitation with near-50% duty cycle is one of the reasons why this particular form of phase-overlap PWM is chosen. It places a burden on the controller to provide very precise signal timing. The voltage-dependent voltage sources E1 and E2 represent the isolated gate drive electronics needed for this form of PWM control and the V_Pu1 and V_Pd1 sources represent the precise digital 1/0 signals from that digital controller. We have developed only half of the Full-Bridge and we proceed to show the other half as follows (FIGS. 17-18).

Figure 19:
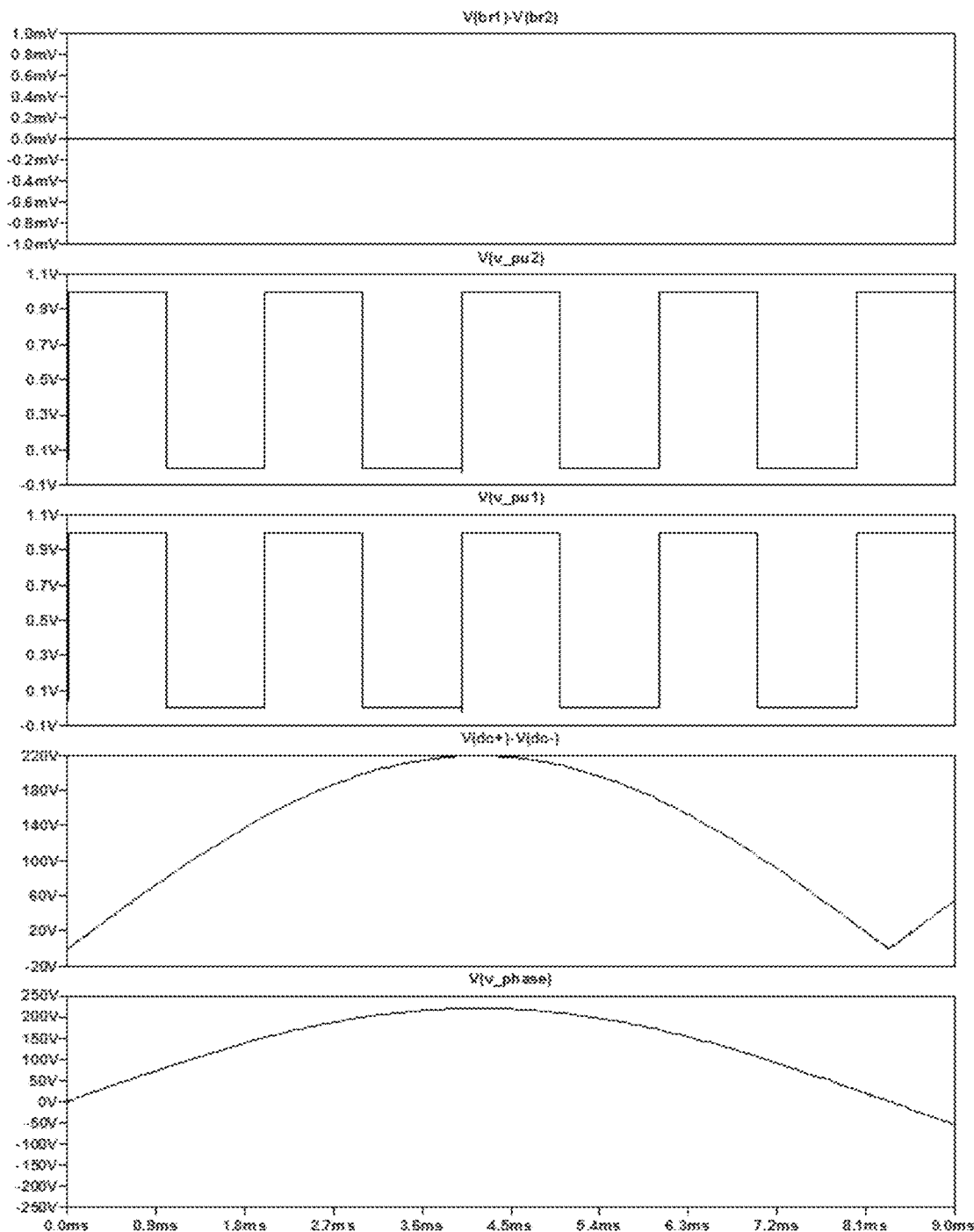

The complementary square-wave excitation with near-50% duty cycle is replicated in V_Pu2 and V_Pd2 sources to be identical copies of the V_Pu1 and V_Pd1 sources. As such, the sets of square-waves are identical with no phase difference between, as shown in the detail of the V_Pu1 and V_Pu2 over the first half-cycle of the source waveforms (FIG. 19).

Figure 20:
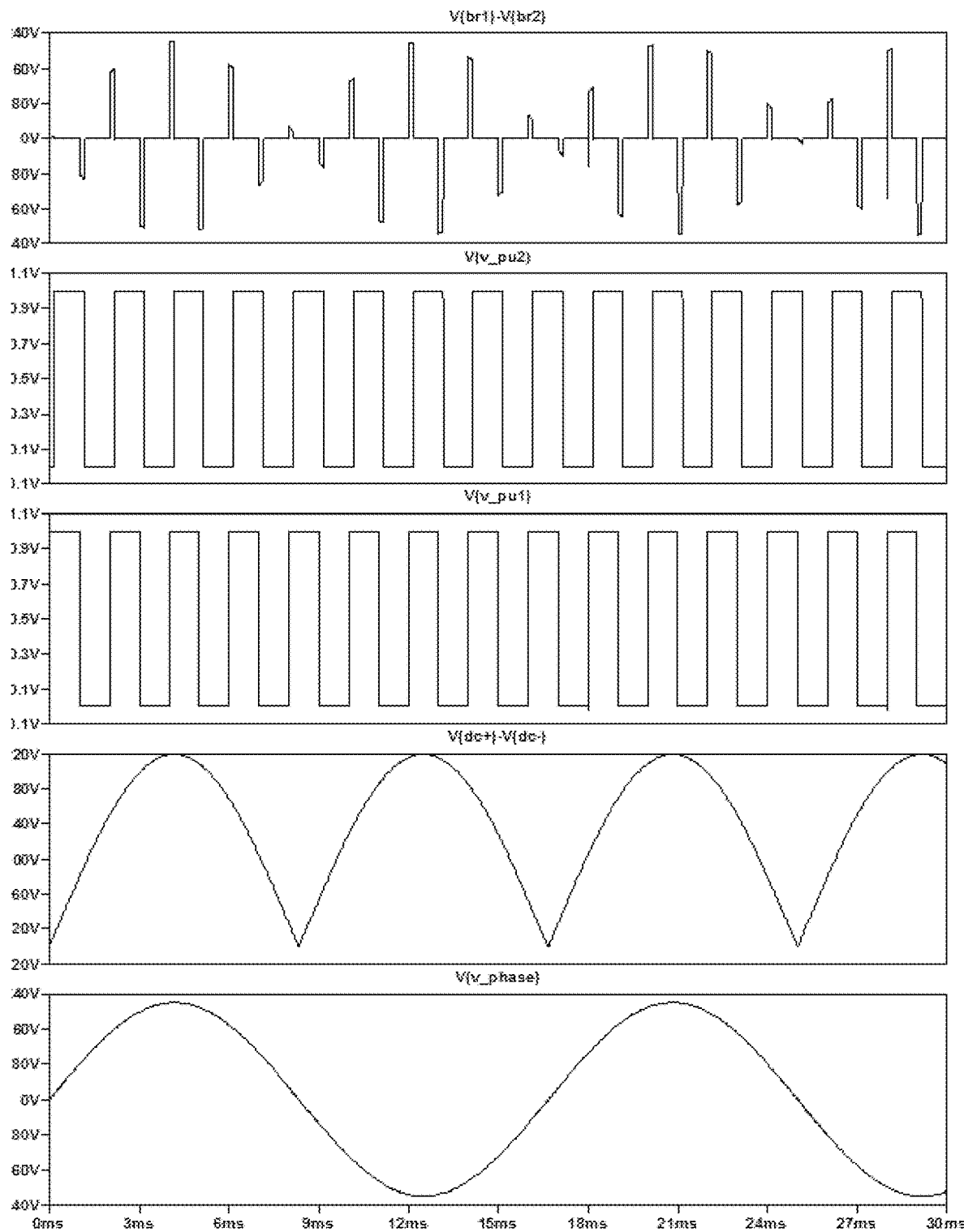
Figure 21:
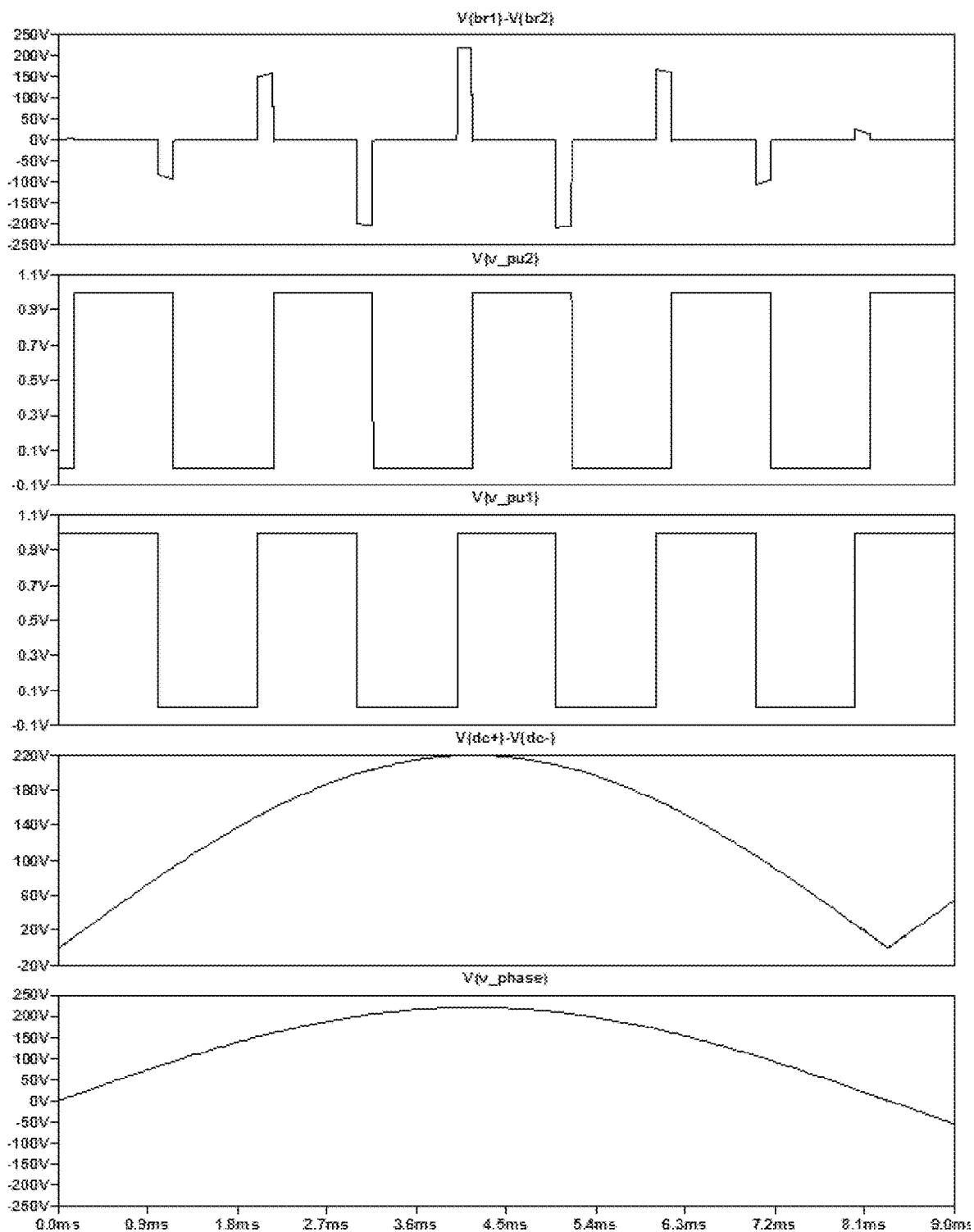

We show this result and define it to be the case with the effective PWM duty-cycle D equal zero as will become clear soon. We induce a starting delay in the V_Pu2 and V_Pd2 sources (FIGS. 20-21).

Figure 22:
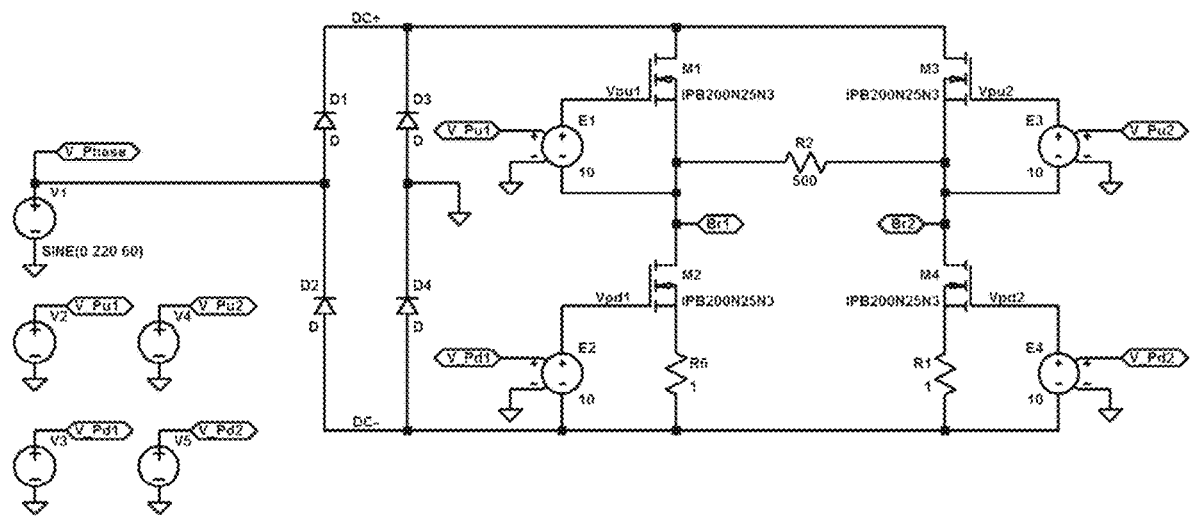
FIG. 22 shows an electrical schematic, according to an exemplary embodiment of the invention.
Figure 23:
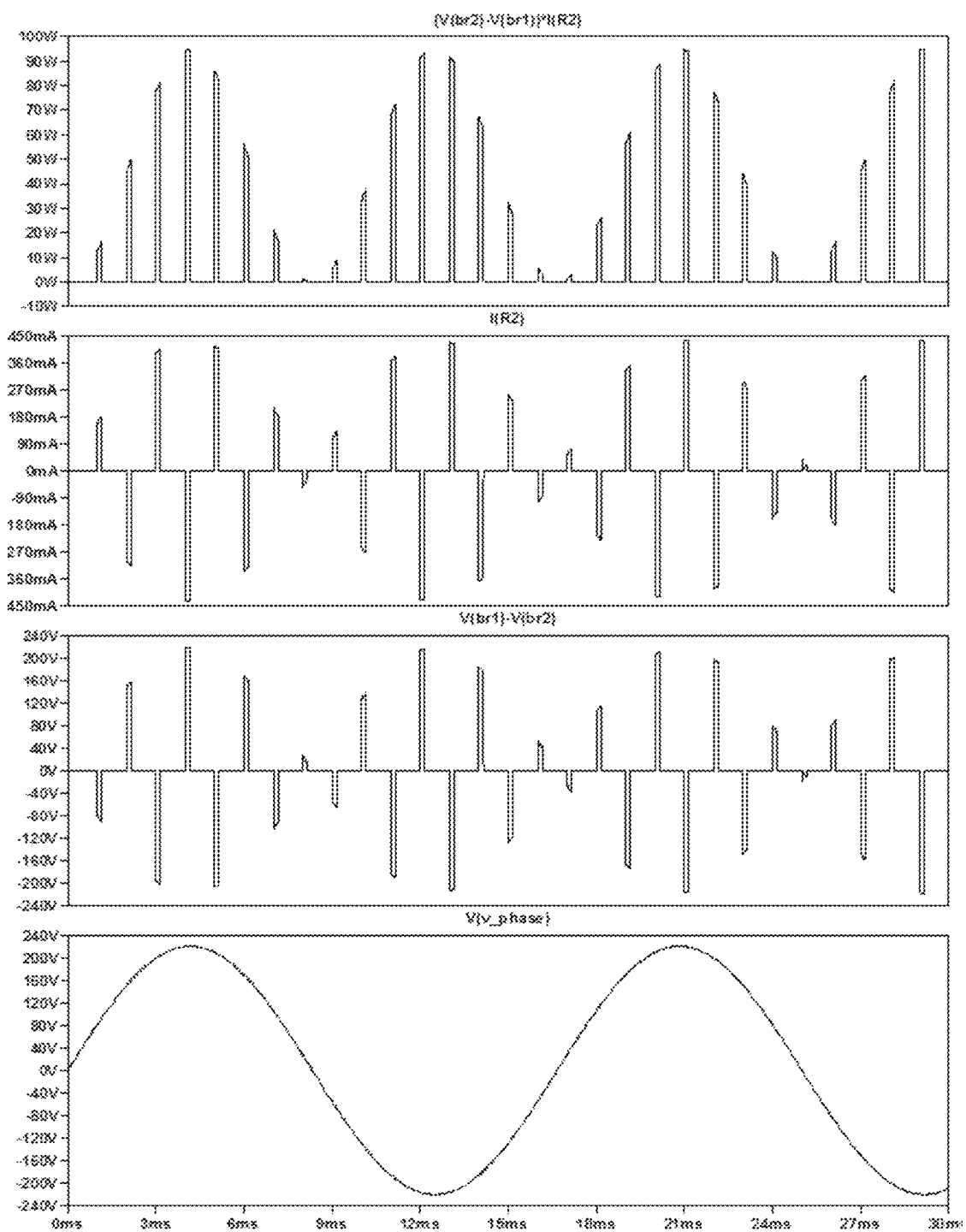
FIG. 23 shows an electrical simulation, according to an exemplary embodiment of the invention.
Figure 24:
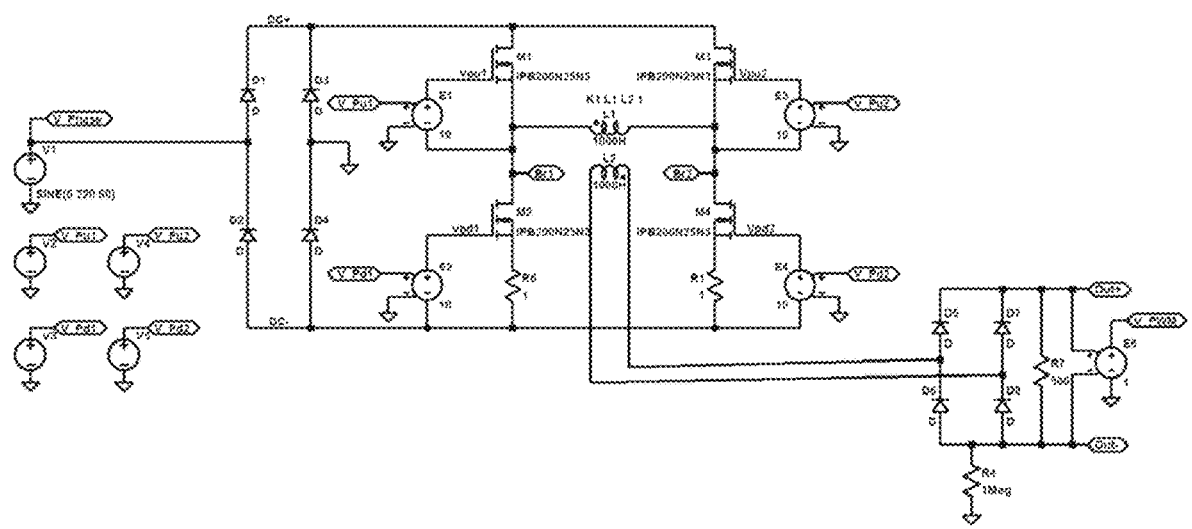
FIG. 24 shows an electrical schematic, according to an exemplary embodiment of the invention.
Figure 25:
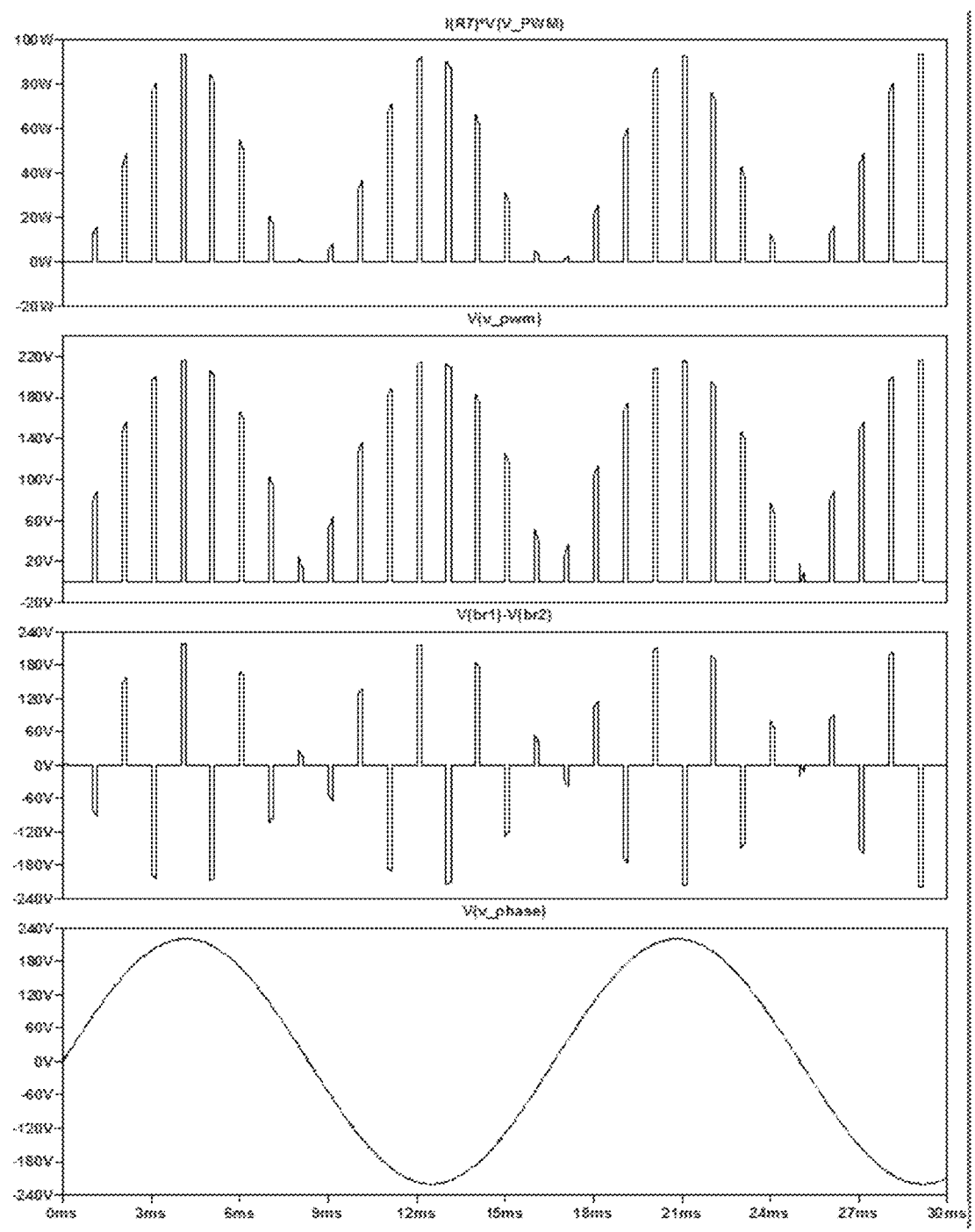
FIG. 25 shows an electrical simulation, according to an exemplary embodiment of the invention.

We show this result and define it to be the case with the effective PWM duty-cycle D non-zero. Both sides of the full-bridge are excited by ~50% duty-cycle square waves that differ only in the percentage of phase-overlap of those square waves. The difference V(Br1)–V(Br2) is pulsating and is the same magnitude peak-to-peak as the original phase voltage, but modulated by a PWM duty-cycle (FIGS. 22-23). We change the switching NMOS transistors M1, M2, M3, and M4 to an Infineon IPB200N25N3 that has a maximum 250 VDC rating and 64 A at 10 V Vgs and 24 milli-Ohms $R_{ds-ON}$ to represent a practical choice. We connect a 500 Ohm load resistor across the difference V(Br1)–V(Br2). To isolate this waveform, we employ transformer coupling then another Full-Wave diode bridge to provide the pulsating modulated waveforms (FIGS. 24-25).

We have shown the operation of a phase-shift, phase overlap PWM control for SMPS uses and cite prior art for availability of such control in SMPS converters, such as the Texas Instrument DU248 or the Linear Technology LTC1922-1.

We, however, induce the need for a specialized phase overlap PWM controller for poly-phase, sine-squared, conversion that combines the isolated outputs to cancel the AC ripple component of the combination, provide that operation with fast feed-forward control, reduce the energy storage and filtering components (by design architecture) to those needed for the high-frequency switching ripple only, and permit a form of soft-start to reduce transient start-up loading of the poly-phase source.

Full-Wave, H-Bridge, Phase-Overlap, Sine-Squared, Digital, PWM Controller—

We use a Verilog test-bench; ZC_TB to introduce timing signals representative of those produced by the Zero-Crossing detector. The signals Pos and Neg represent the values produced and converted to 1/0 format. For illustration, and to begin discussion of the controller functions, we also include a timing counter "Counter" with values in microseconds (FIGS. 26-29). We simulate the waveform over several cycles of the Pos and Neg waveforms to show the relative timing. The reference cursor is places at the first instance of interchange of the signals as shown.

The Zero-Crossing circuit, as first introduced, provides Pos and Neg signals of the opposite polarity of those shown. To remove the uncertainty of the detection polarity, we introduce an XOR function to provide the "Timer" signal. The "Timer" signal is at logic "1" whenever either Pos or Neg uniquely active.

The "Timer" signal is at logic "0" whenever Pos and Neg signals are in the Zero-Crossing interval. We are able to discriminate the Period of the Pos and Neg signals as well as the duration of the Zero-Crossing intervals, but lose the ability to discriminate whether it is Pos or Neg that is uniquely active.

Figures 29, 30:
Figure 31:
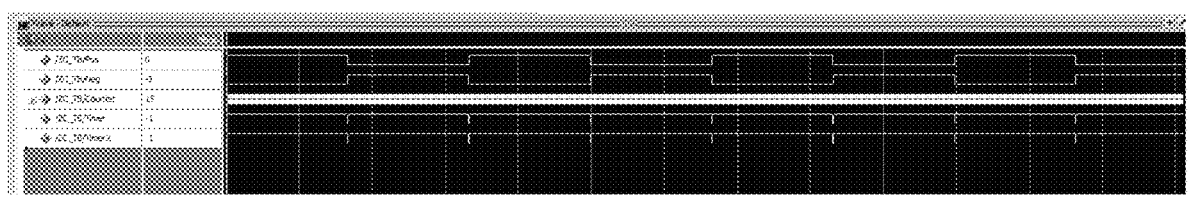
FIGS. 31-32 shows various Verilog Code simulations, according to an exemplary embodiment of the invention.
Figure 32:
Figure 34:
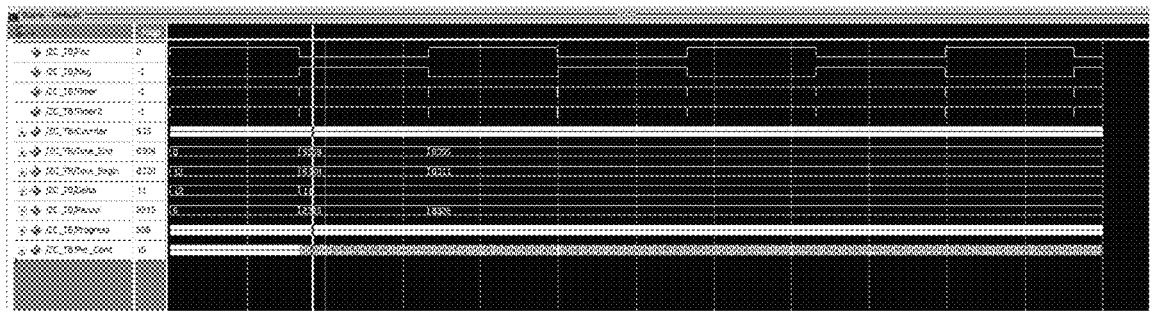
FIGS. 34-36 shows various Verilog Code simulations, according to an exemplary embodiment of the invention.
Figure 35:
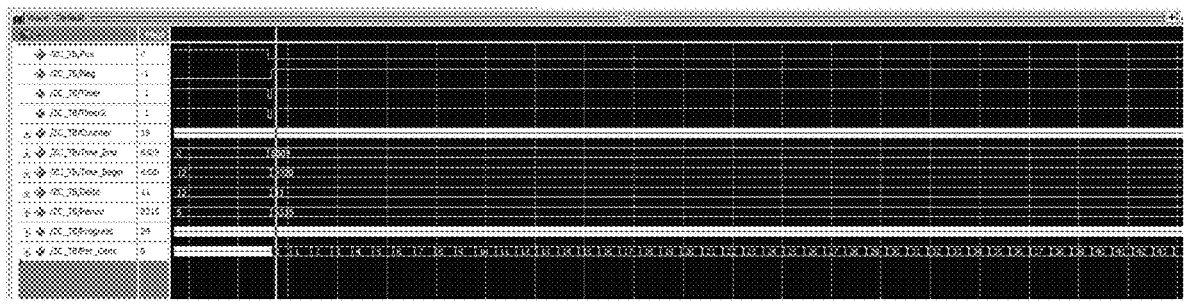
Figure 36:
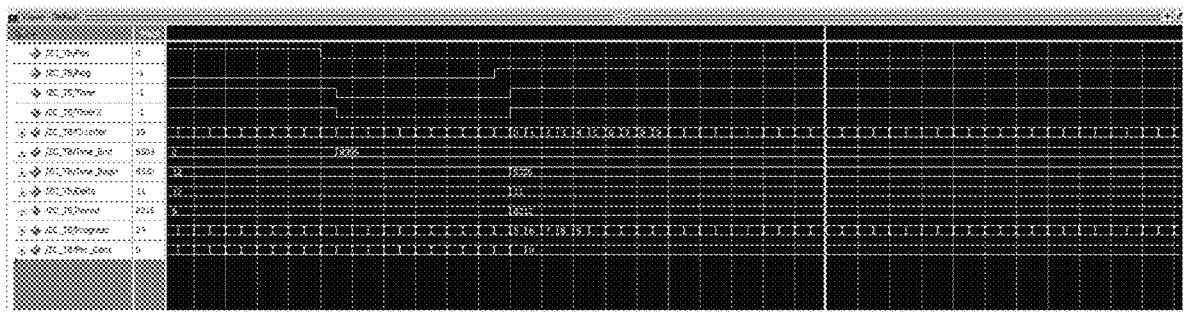
Figure 37:
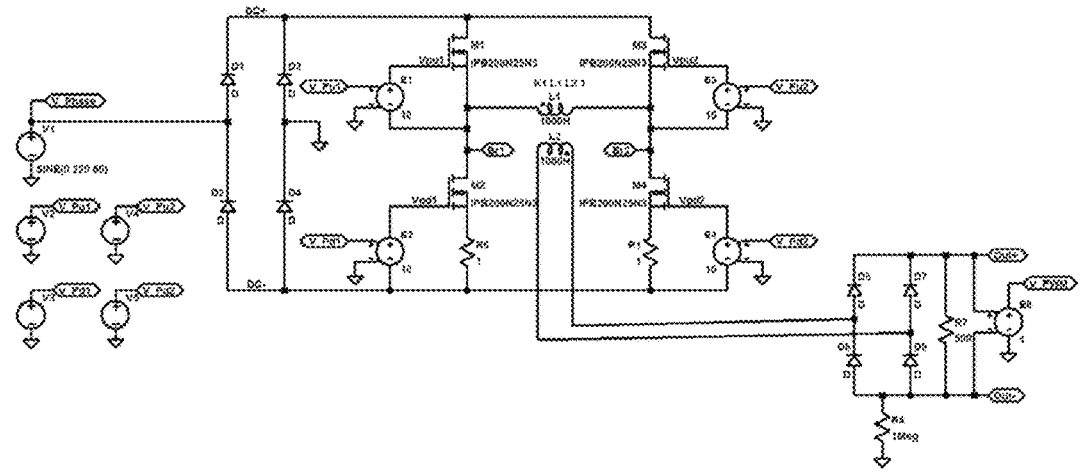
FIG. 37 shows an electrical schematic, according to an exemplary embodiment of the invention.
Figure 38:
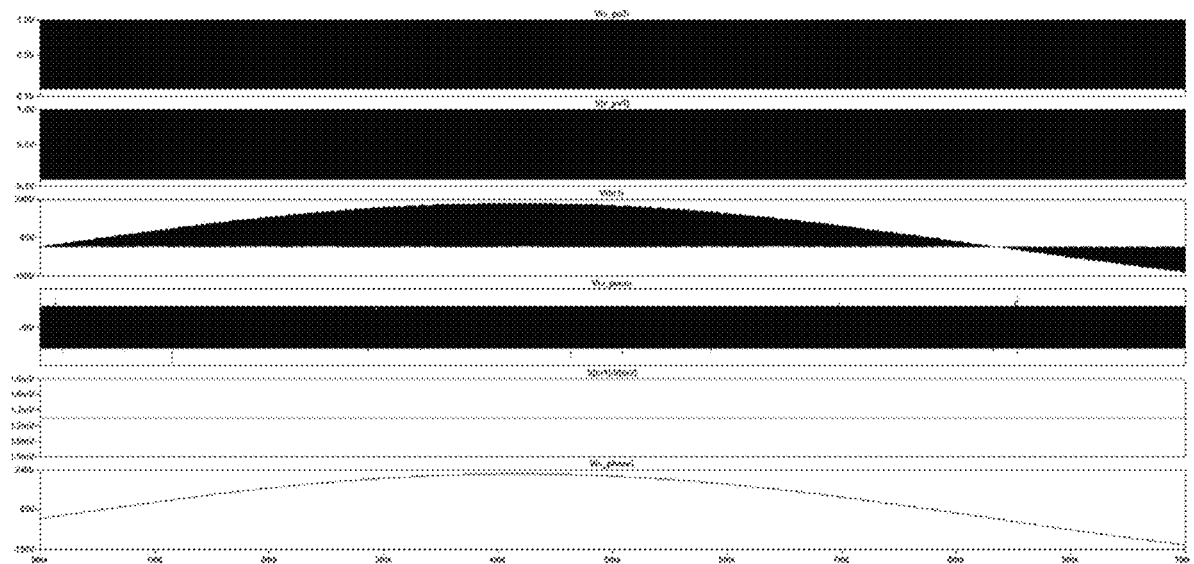
FIGS. 38-43 show electrical simulations for showing zero-crossing, according to an exemplary embodiment of the invention.
Figure 39:
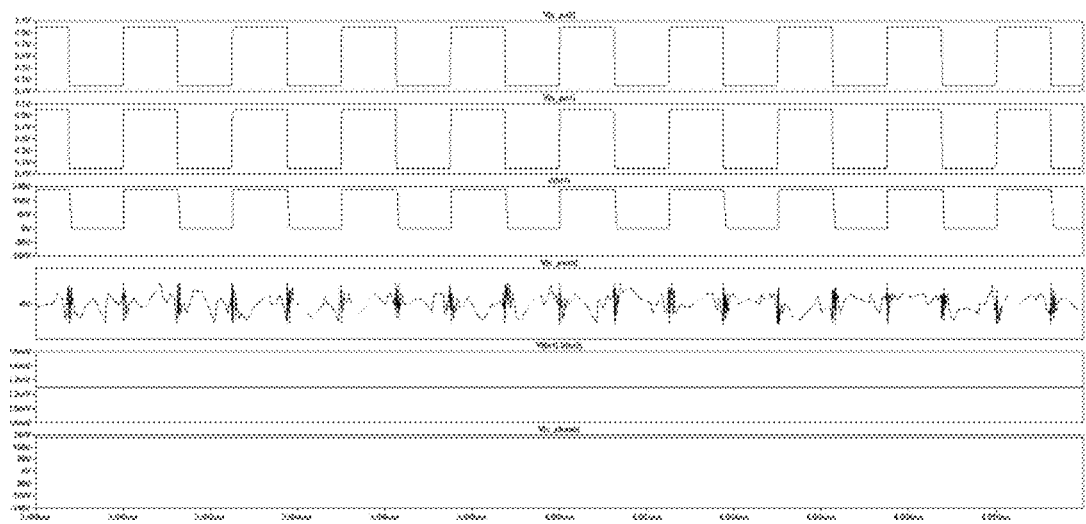
Figure 40:
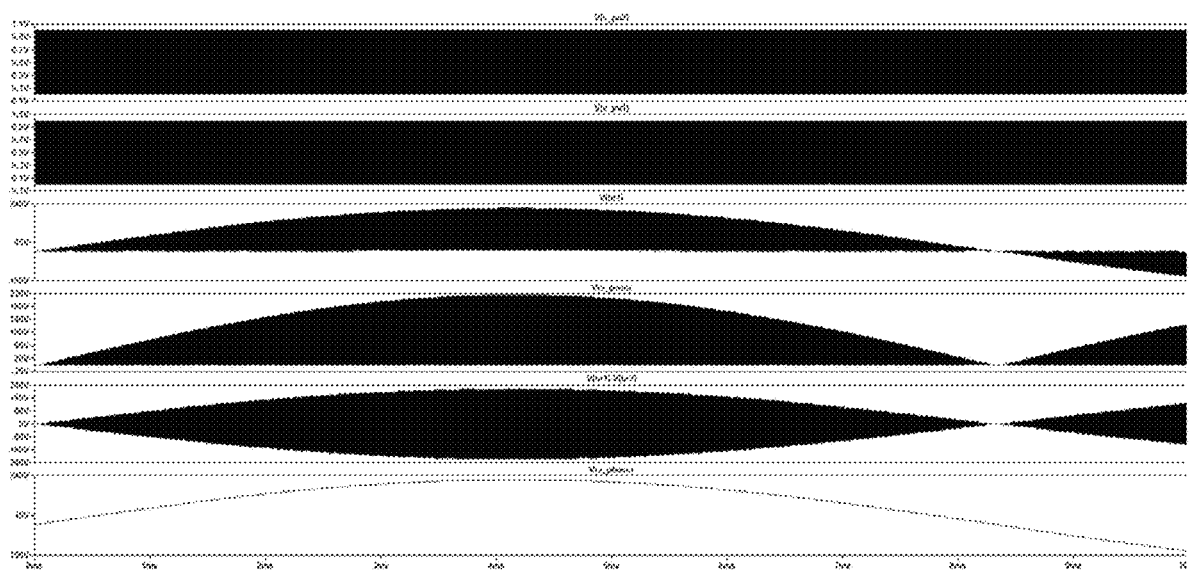
Figure 41:
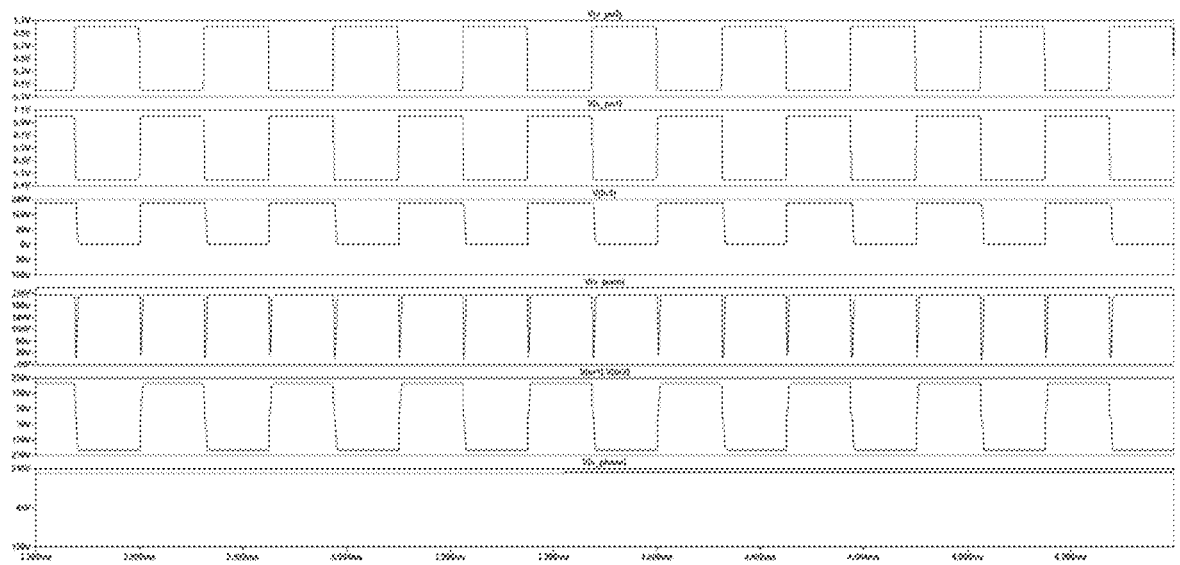
Figure 42:
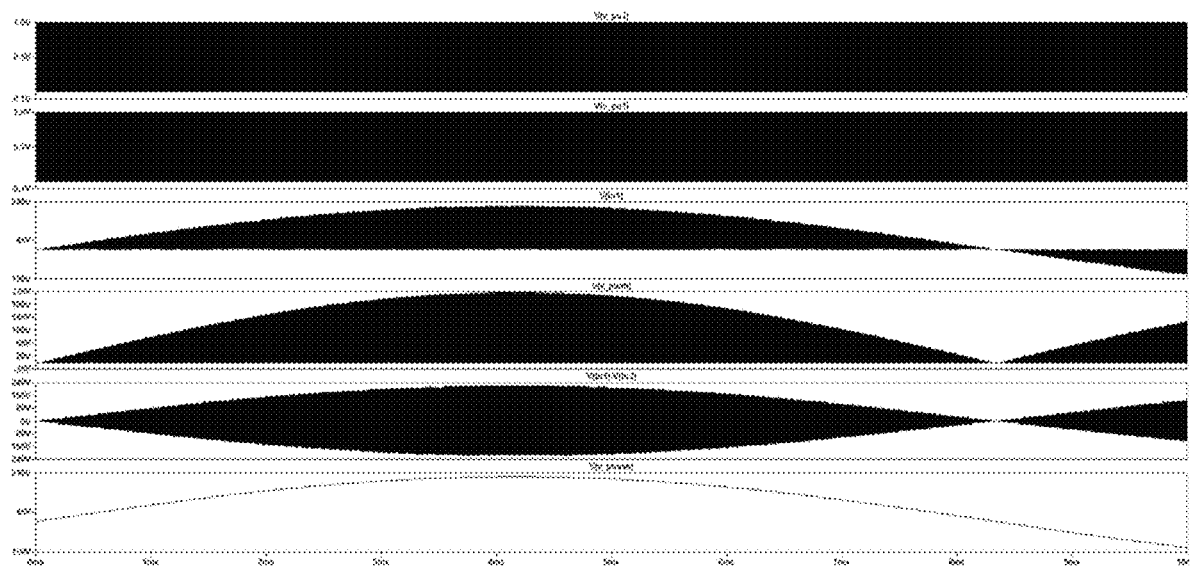
Figure 43:
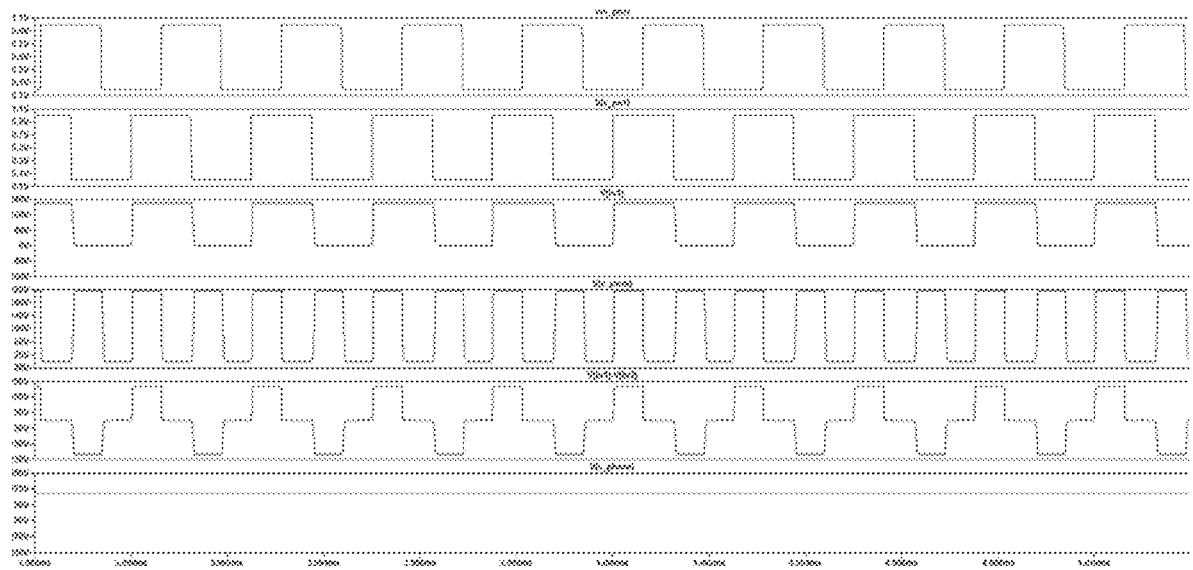

To make the point, we develop the "Timer2" signal developed from another XOR function using the logic inverse of both Pos and Neg signals and see that both the "Timer" signal and "Timer2" signal produce identical results and facilitate the use of either polarity signals from the Zero-Crossing circuit so long as the polarity is consistent for the Pos and Neg signals at the Zero-Crossing circuit outputs (FIGS. 30-32).

A shown in the "First Zero-Cross Interval Detail", both Timer and Timer2 produce similar results. The "falling-edge" occurs as the Zero-Cross Interval begins and the "rising-edge" occurs as the Zero-Cross Interval completes. Because we have synchronized both Timer and Timer2 using the "Counter" waveform edges, we can only determine the edges within a cycle of the Counter. As we shall see, that does not present a problem because both edges are treated the same. From the simulation results, we see that the Timers "falling-edge" occurs at a Counter value between 8320 and 8321 microseconds (the period of the count is 1 microsecond), and the "rising-edge" occurs between 8331 and 8332 microseconds indicating the 11 microseconds difference programmed into the simulation. Measurements on each phase using the Zero-Crossing circuit will provide similar, but numerically different results. We know though, that we can calculate the interval between "falling-edge" and "rising-edge" to the accuracy of the Counter employed (FIGS. 33-36).

The comment at line 34 "//Show Period Calculations" indicates the addition of Verilog "Behavioral" code that adds calculations to:

calculate the "Delta" interval around the Zero-Crossing, to determine the "Period" of the half-wave of the source waveform, to reset the Counter, to augment the reset Counter with half of "Delta" and move the effective start, and to "normalize" a Progress/Period ratio to be a "Per_Cent" Progress.

The Behavioral Verilog Simulation captures the design intent to measure the Period of the half-wave of the source waveform and produce an accurate representation of the progress through that Period, in the illustration in percentage values. We use that percentage progress to generate Sine multiplier values to apply to the PWM multiplication in the prior discussion.

The Behavioral Verilog Simulation shows the objectives, but synthesis from Behavioral Verilog is notoriously deficient. Rather, we use the prior Behavioral Verilog as an objective template for construction of digital logic to accomplish implementation. In the process, we shall modify parameters in trade-off for other, additional objectives and link the generation of PWM control signals to the Counter and Progress measures illustrated above.

During the development of the topics, we will discuss the preferred implementation within its context without limiting to a particular implementation exclusively.

Implementation Considerations Context—

We have employed a digital clock period of 1 microsecond to facilitate ease of illustration. A 60 Hz sine wave has a period of 16.667 milliseconds so the half-cycle time between zero-cross events is 8.333 milliseconds. We see from the Pos, Neg, and Timer waveforms in the behavioral simulations above, event edges at or near 8,300 microseconds as expected. In the behavioral code, we have assigned a counter with 16 bits that supports counts to 65,535; nearly 80 times greater than required. In a hardware implementation, counter, register, and data-paths that are wider than required take space and consume power with no benefit, so we investigate smaller counter, register, and data-path widths.

For 60 Hz operation, we obtain a range of frequencies that we can expect from the poly phase source, typically within plus or minus a few percent. To be conservative, we will support a plus or minus 10 percent range of frequencies: 54 Hz to 66 Hz specifically. At 54 Hz, the period of the sine wave is 18.52 milliseconds and at 66 Hz, the sine wave period is 15.15 milliseconds. We need to determine half-cycle periods in the range from ~7.6 milliseconds to ~9.26 milliseconds.

PWM Clock Rate:

We are forming our PWM using the phase-overlap of square-waves in the H-Bridge configuration. We need to choose the PWM square-wave frequency to meet requirements for switching and component losses as well as Electro-Magnetic Interference (EMI) considerations. The switching losses tend to increase as the switching frequency increases, but the size and weight of magnetic components, including inductors, transformers, and EMI filters tend to decrease as the frequency increases. Using phase-overlap PWM, there is a duration of overlap on both rising and falling edges of the square-waves. In that regard, the PWM pulse rate is twice the square-wave frequency.

In addition, and particular to the digital controller technique, we control the phase-overlap in discrete increments associated with a very-high frequency master clock-oscillator. The square-wave frequency determines a two-pulse per square-wave PWM rate, and the ratio of the master clock-oscillator to square-wave frequency is associated with the phase-overlap resolution per square-wave cycle. The master clock-oscillator is divided down to provide both of two square waves, one as reference phase and the other as a delayed version under time-increment control.

To determine relevant frequencies and resolutions, we start from the Period of half-cycle 120 Hz frequency and multiply up to set operating frequencies.

For approximation purposes, we use the half-cycle 120 Hz frequency as a reference and multiply it by increasing powers of two; it is more convenient to construct digital counters in 4-bit binary powers of two. For example, a 4-bit counter supports a 16×120 frequency of 1920 Hz which is close to the 2 kHz shown in initial illustrations. Whereas, an 8-bit counter supports a 256×120 frequency of 30,720 Hz instead. Furthermore, a 12-bit counter supports a 4096×120 frequency of 491,520 Hz instead.

Accompanying the increased frequency is a higher PWM resolution of the Period measurement. A 4-bit counter allows phase-shift resolutions of 1:16 or about 6.25% of the half-cycle. The 8-bit counter allows PWM sampling timing resolutions of 1:256 or about 0.4% of the half-cycle. Finally, the 12-bit counter allows PWM sampling resolutions of 1:4096 or about 0.025% of the half-cycle.

There seems to little need for further resolution if the final allowable Power-Factor Correction (PFC) error is nearer ~1% from combined sources. The square-wave full-bridge switching frequency must be related to the longest half-wave period which occurs at 120 Hz-10% or 108 Hz, with the 9.26 millisecond Period duration. Using 12-bit counters, we can provide 4096 maximum PWM square-wave cycles if they are longer than 2.26 microseconds. The PWM square-wave frequency must be 442.368 kHz or lower to prevent a 12-bit counter from overflow during the longest half-wave period. As a design nominal, we choose a PWM frequency of 400 kHz with a period of 2.5 microseconds per cycle.

In terms of this PWM clock frequency, a 54 Hz source produces a count of 3704; less than the 4096 range of the counter. Similarly, a 66 Hz source produces a count of 3030; less still than the maximum range. The 66 Hz period has a 0.033% PWM resolution and the 54 Hz period has a 0.027% resolution.

For implementation, we have chosen a 400 kHz PWM square-wave frequency for convenience. We see that a 12-bit counter produces Period values between 3030 and 3704. If we report the Period value, the actual line frequency can be calculated and reported. If, however, the Period value reaches 4096, we know that the line frequency is too low and we should report and possibly disable the PFC action. A full count signifies that the line frequency is at or below ~49 Hz and definitely out-of-range for normal operation.

Phase-Overlap Clock Rate:

For phase-overlap resolution, we support generation of a first PWM clock at 400 kHz and a second PWM clock also at 400 kHz, but the second clock is delayed relative to the first clock in order to obtain the requisite phase-overlap and resultant PWM pulses thereby derived. With a lower-limit delay of zero, both first and second clock waveforms are identically in-phase and the resultant PWM pulses are also zero. With a half-cycle delay, the second clock waveform is identically out-of-phase and the resultant PWM pulses are a 100% duty-cycle square-wave.

We repeat again the electrical schematic for the Isolated Full-Wave Bridge, and Simulation Results for In-Phase, Out-of-Phase, and Intermediated Delayed Phase Operations (FIGS. 37-43). We contrast the three cases simulated with In-Phase, Out-of-Phase, and Intermediated Delayed Phase Operations and the resultant V_PWM waveforms. In all cases, the resultant V_PWM waveforms show the product of the PWM pulse-width multiplied by the V_Phase voltage:
a) the In-Phase case shows a V_PWM waveform at near-zero because the effective PWM is zero,
b) the Out-of-Phase case shows a V_PWM waveform at near V_Phase voltage because the effective PWM is near 100%, and
c) the Intermediated Delayed Phase case shows a V_PWM waveform at near V_Phase voltage but with a pulse-width at the PWM value and a resultant short-term average of the product.

We have shown the PWM acting as a 0 to 100% multiplier over the delay-range of In-Phase to Out-of-Phase, or delays from zero to one-half-cycle of the PWM waveform with a 400 kHz PWM clock rate and the nominal 60 Hz line frequency.

To obtain the desired sine-squared behavior at the line frequency, we must control the phase delay of the second PWM clock to obtain the sine-wave multiplier.

As a first consideration, the phase-delay is implemented in increments related to a master-clock oscillator, from which is derived the two PWM clocks. If we choose another 12-bit division, we are directed to a 1.6384 GHz master-clock oscillator frequency. That frequency provides phase increments of 0.025% of the PWM cycle. If we limit the counting to a 10-bit division, we can employ a 409.6 MHz master-clock oscillator frequency and provide 0.098% of the PWM cycle in phase increments.

Together, the PWM multiplier precision in terms of the number of PWM cycles per line cycle, and the PWM multiplier precision in terms of the phase-overlap determine the choice of master-clock oscillator frequency. Further, we have chosen a digital controller implementation using a Field-Programmable Gate Array (FPGA) from among the options including Gate-Array and Full-Custom ASIC implementations.

The FPGA option is chosen because it uses an off-the-shelf programmable digital-logic component with least lead-time delay, supported development tools (Quartus and ModelSim) and Programmable Development Kits for product demonstrations. The results of the FPGA development are in the form of both logic-symbol schematics and Verilog HDL that can be used to support either/both Gate-Array and Full-Custom ASIC implementations should unit cost reduction and/or volume demands require implementation technology change.

For low-cost FPGA components, a 1.6384 GHz master-clock oscillator frequency is too high, but a 409.6 MHz master-clock oscillator frequency is feasible with careful implementation constraints. We choose the 409.6 MHz master-clock oscillator frequency. The FPGA also does not support external generation of the 409.6 MHz master-clock oscillator frequency and coupling through an input pin due to frequency limitations of the device's pin electronics. Rather, to alleviate this limitation, the manufacturer of the FPGA supplies free Intellectual Property (IP) rights for the use of a Phase-Lock-Loop (PLL) master-clock oscillator requiring an external reference oscillator at a lower frequency within the capabilities of the device's pin electronics. We choose to use a 32× multiplication factor for the PLL and an external 12.8 MHz precision reference oscillator.

We obtain the 409.6 MHz master-clock oscillator frequency as 32× the 12.8 MHz precision reference oscillator frequency. Careful design is still required in the distribution and use of the 409.6 MHz master-clock oscillator frequency because delay errors are possible if precise circuit timing is shown to be needed by the FPGA implementation. The Quartus tool performs synthesis of the both logic-symbol schematics and Verilog HDL to map the placement results onto the logic within the FPGA. Multiple iterations are often required during the implementation but incremental design of the high-frequency parts can be performed and locked to a particular suitable placement within the FPGA device. The placement effort is similar to the physical design placement and routing required in either/both Gate-Array and Full-Custom ASIC implementations as well.

Figure 44:
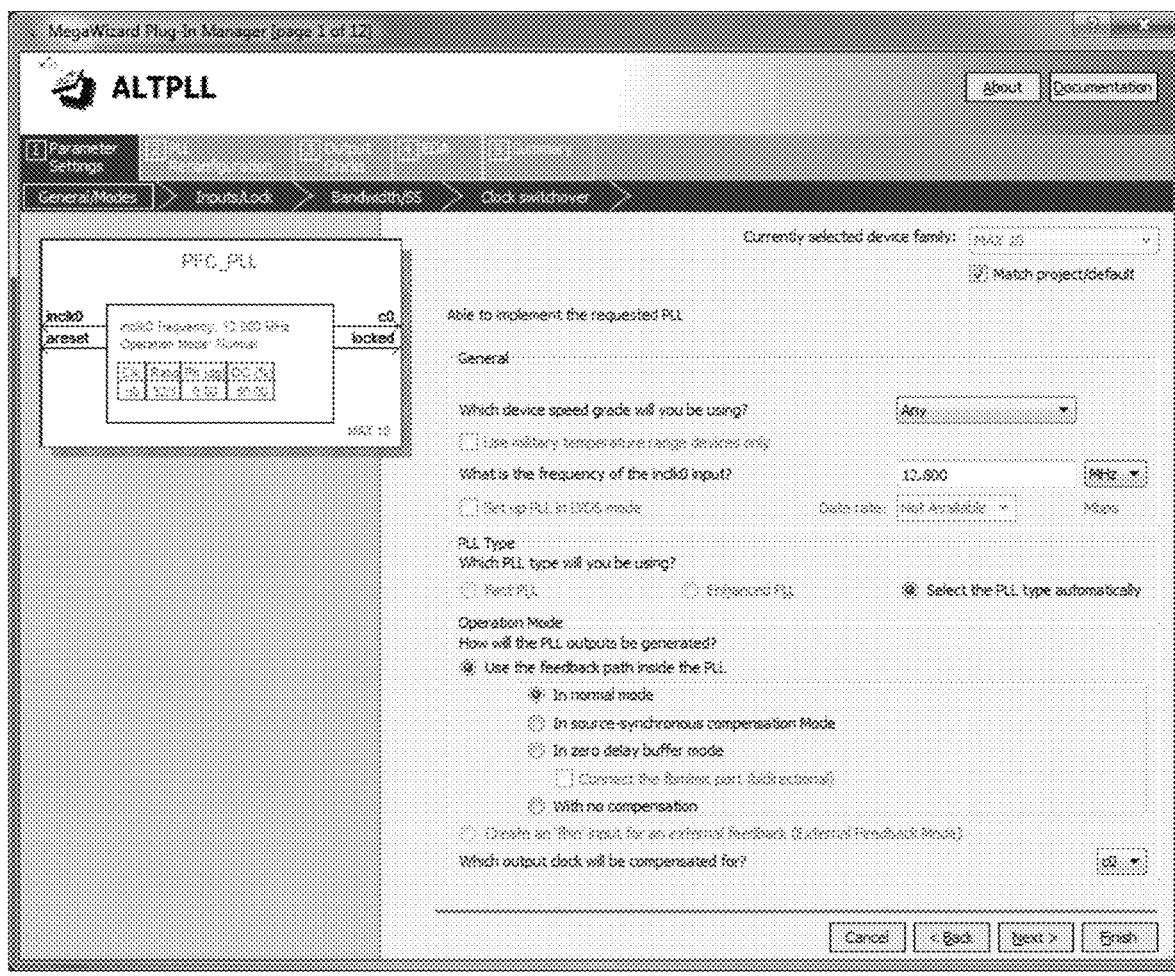
FIGS. 44-46 show various invocations, according to an exemplary embodiment of the invention.
Figure 45:
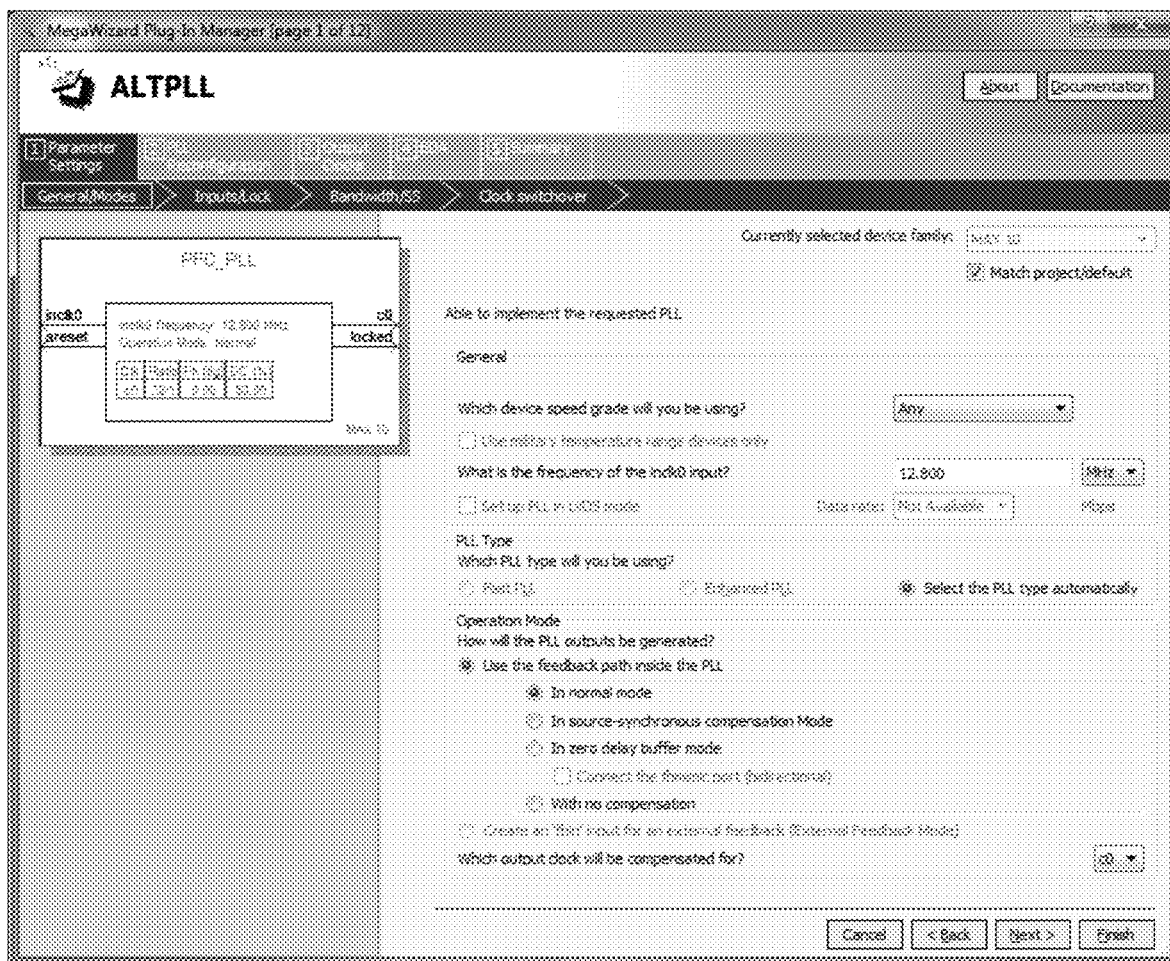
Figure 46:
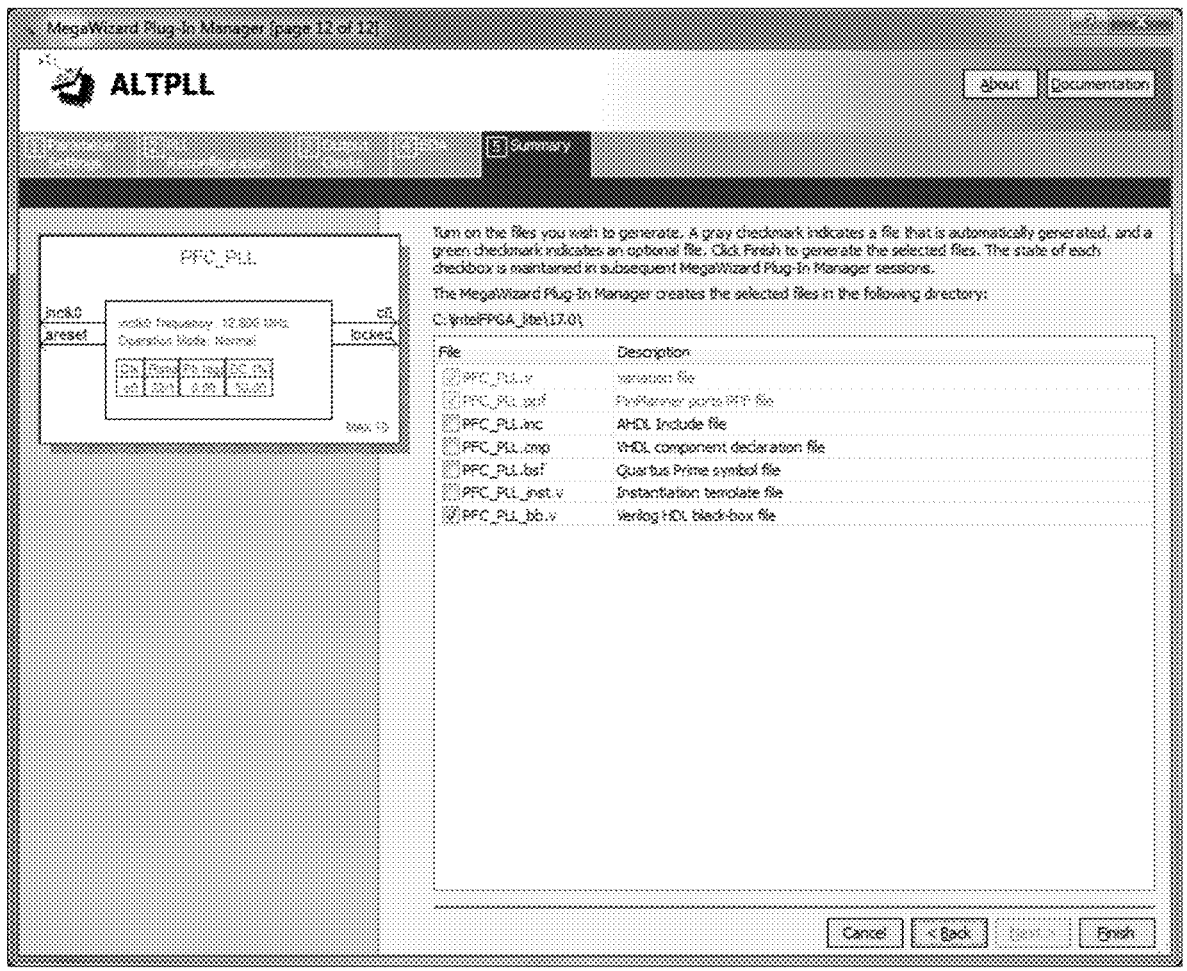

For this apparatus, we are using the MAX 10 FPGA IP Block ALTPLL to provide the master-clock within the boundaries of the FPGA and accept that IP as external to this apparatus. We do, however, show the interaction required to configure that IP below, but include its operation as background to the operation and provide a simple clock signal to test operation (FIGS. 44-46).

Figure 47:
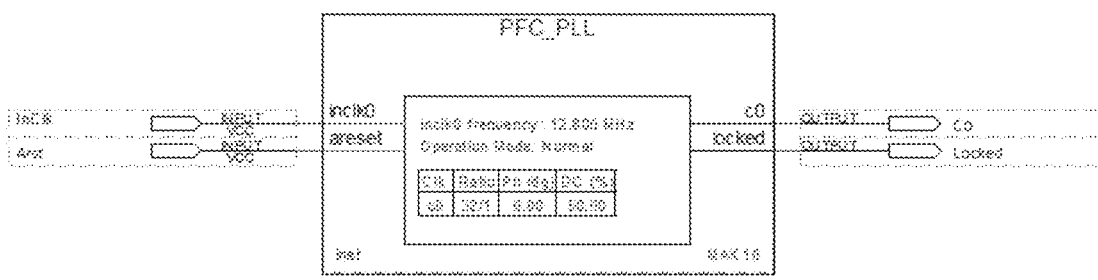
Figures 48, 49:
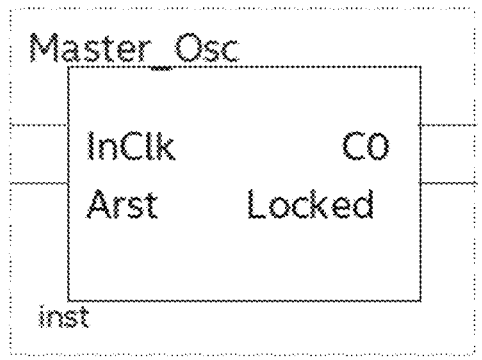

We mention that the PFC_PLL is not utilized in simulation because it is not part of this IP, but also because it requires the simulation tool to simulate in 1 nanosecond steps with 1 picosecond accuracy. The simulation data files become very large and do not display well on the available simulation computer. Instead, we use a behavioral oscillator with the same period as the 409.8 MHz master-oscillator for convenience. The period of a 409.8 MHz square-wave is 2.4414 nanoseconds and it is modeled as a register that is complemented every 1.2207 nanoseconds (FIGS. 47-48). Note that the Verilog code generated by the Quartus tool is proprietary and refers to the PFC_PLL instantiation b2v_inst generated (FIGS. 49-51).

Note that the Behavioral Verilog we have substituted is not proprietary and does not refer to the PFC_PLL instantiation b2v_inst generated above by the Quartus tool. We have generated a meaningless 12.8 MHz square as an output for visual reference, as well as an arbitrary Arst signal. We have also generated a Locked signal that can be used by any following timing circuitry to initiate start-up of those circuits.

To implement frequency division functions, we implement and utilize Flip-Flop circuits. The FPGA has available proprietary versions, but we construct a non-proprietary version from universal logic functions so that the schematics of this methodology and apparatus can be constructed with other technology that can use digital logic and the universal logic symbols associated with that implementation.

Figures 53, 54:
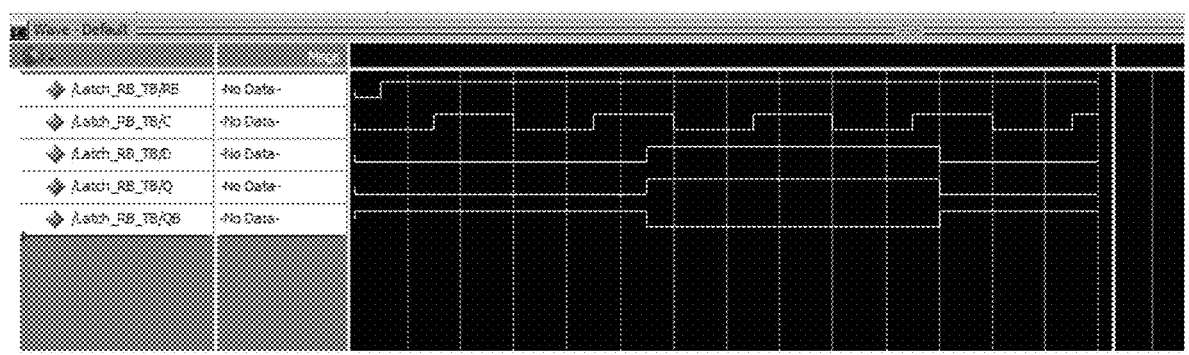
FIG. 53 shows Verilog Code, according to an exemplary embodiment of the invention.
FIG. 54 shows a simulation, according to an exemplary embodiment of the invention.

First, we construct a Master-Slave form of the "D" Flip-Flop DFFRBCR with negative-True Reset RB, that changes state on the negative-edge of "C" clock falling. The underlying Latch with negative-True Reset RB, is a fundamental predecessor (FIG. 52). The "Q" output tracks the "D" input whenever the clock "C" input is a logic "1" but holds or latches the last value of "D" whenever the negative edge of "C" occurs (FIGS. 53-54).

Figures 55, 56:
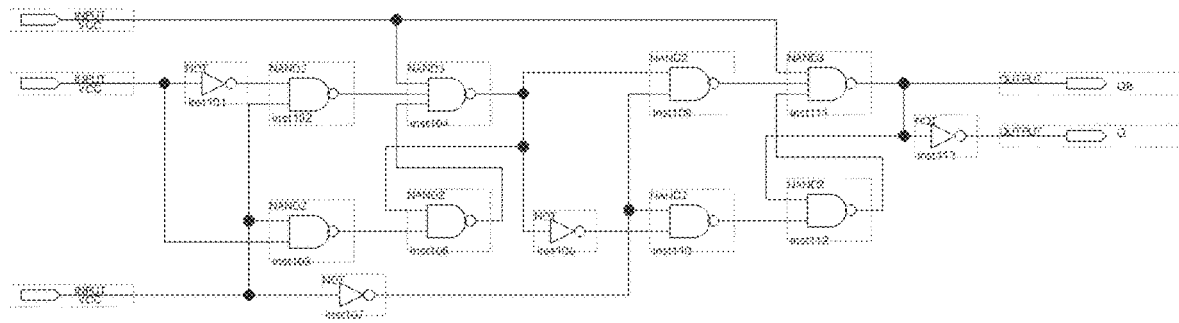
FIG. 55 shows a schematic, according to an exemplary embodiment of the invention.
FIG. 56 shows Verilog Code, according to an exemplary embodiment of the invention.
Figure 57:
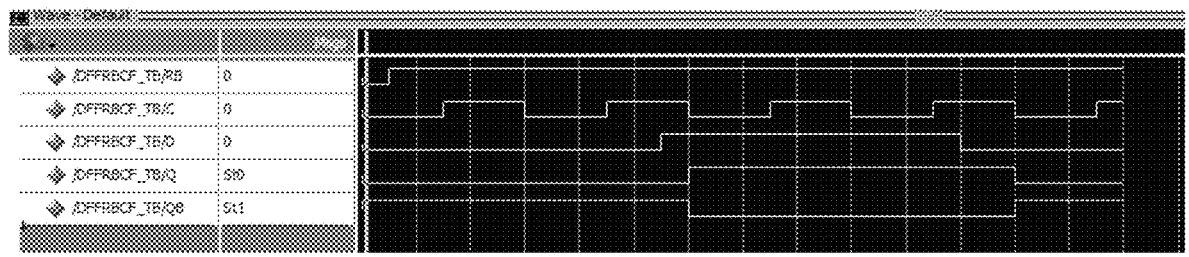
FIG. 57 shows a simulation, according to an exemplary embodiment of the invention.

As stated and shown in simulation, the "Q" output does track the "D" input whenever the clock "C" input is a logic "1" but holds or latches the last value of "D" whenever the negative edge of "C" occurs. We "merge" two Latch_RB circuits, with the "C" control input signal inverted between the master and slave latches to form the Master-Slave form of the "D" Flip-Flop DFFRBCR (FIGS. 55-57).

Figure 58:
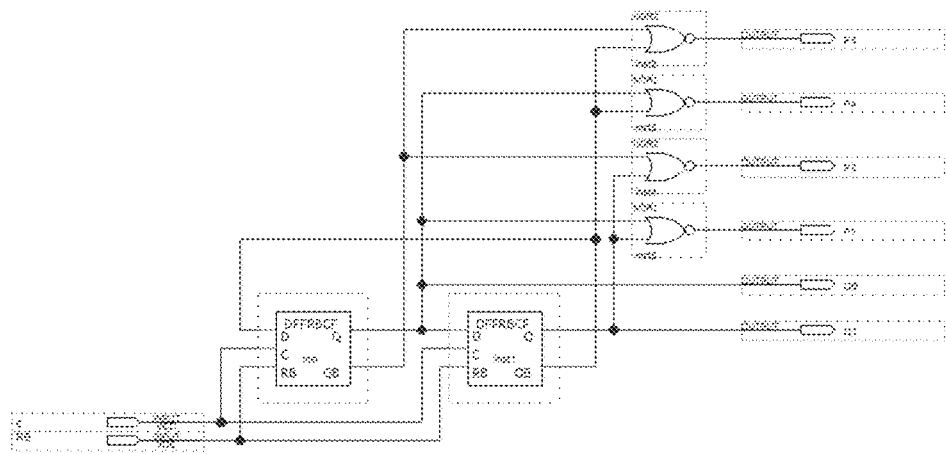
FIG. 58 shows a schematic, according to an exemplary embodiment of the invention.
Figures 59, 60:
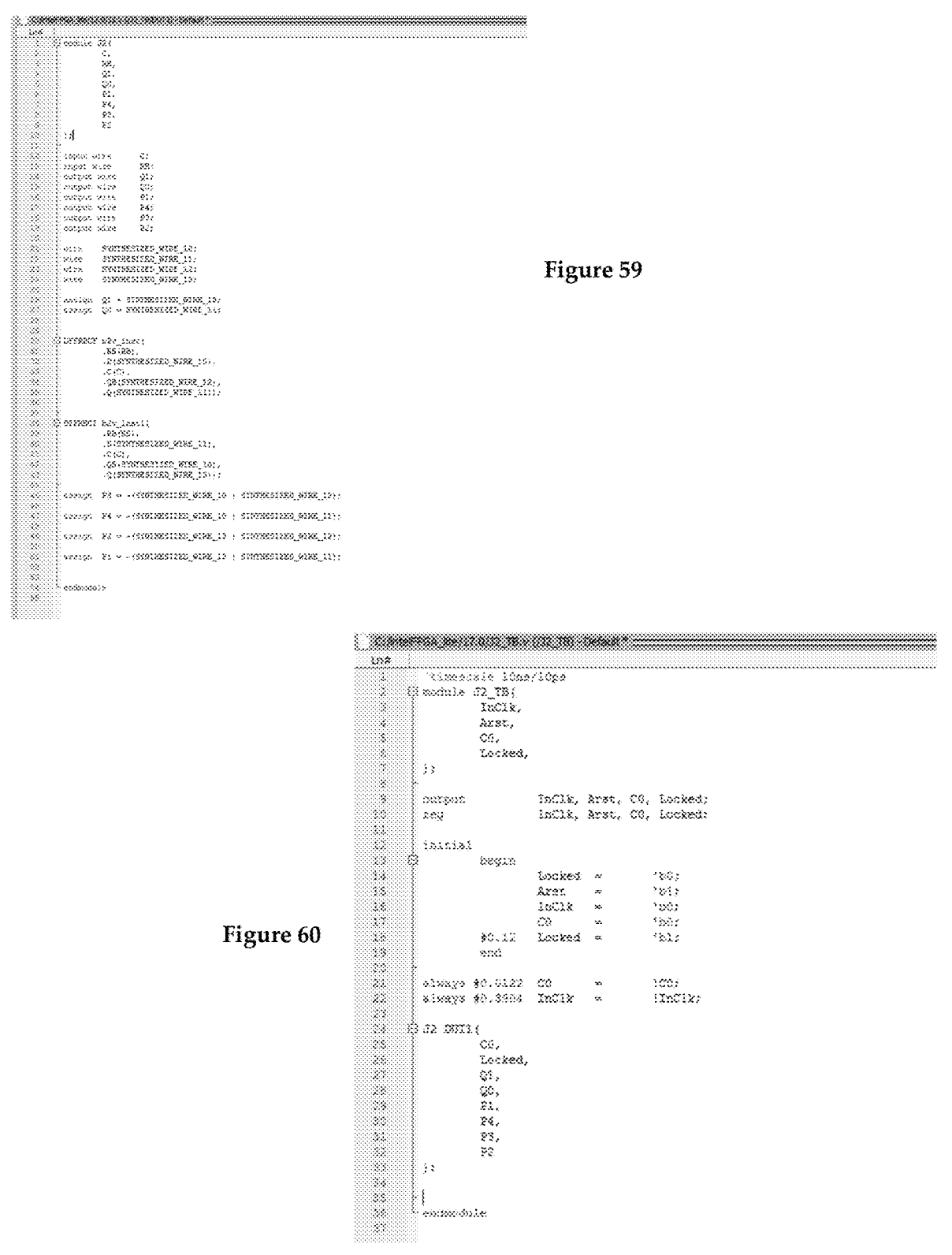
Figures 61, 62:
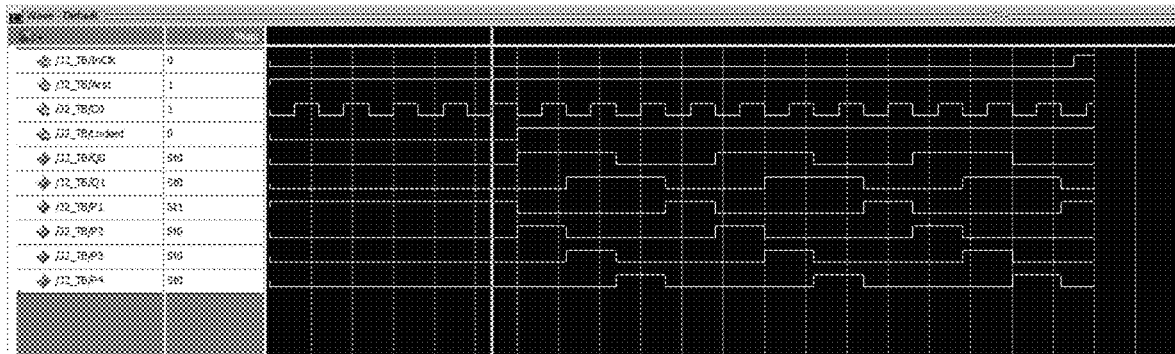

We note the salient difference in behavior that the "Q" output acquires and maintains output changes only on the falling-edge of the "C" input forming the function of edge-triggered behavior. We use the DFFRBCF throughout the demonstration of functions as a canonic Flip-Flop made of simple logic gates. There is no issue with proprietary designs although other Flip-Flop designs can be substituted by one skilled in the art (FIGS. 58-59). The J2 2-Bit Frequency Divide is first in a cascade of five such stages, each providing frequency division so that 5×2 Bits provides a 10-Bit divider as required to produce 400 kHz from the 409.8 MHz master-oscillator (FIGS. 60-62).

We have constructed the J2 module as a 2-Bit "Johnson" counter with NOR-gate decoders to provide a 4-phase decoded output wire-vector. The construction is chosen so that there are only two DFFRBCF D-Flip/Flops as loads on the input C clock. The delay path from the C clock to the Q1 output is through a single DFFRBCF D-Flip/Flop. This design provides small loads and small delays through the 2-Bit counter so that highest speeds can be obtained in the FPGA implementation.

Figure 64:
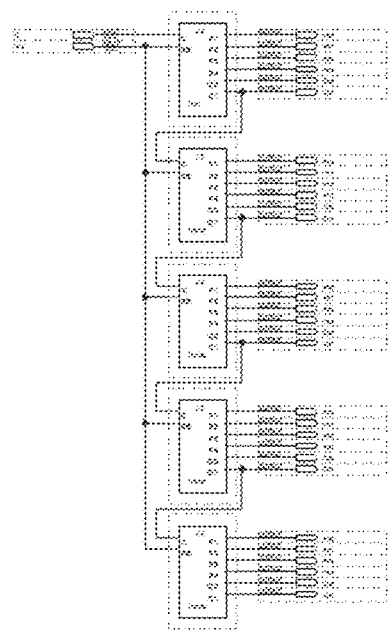
Figure 63:
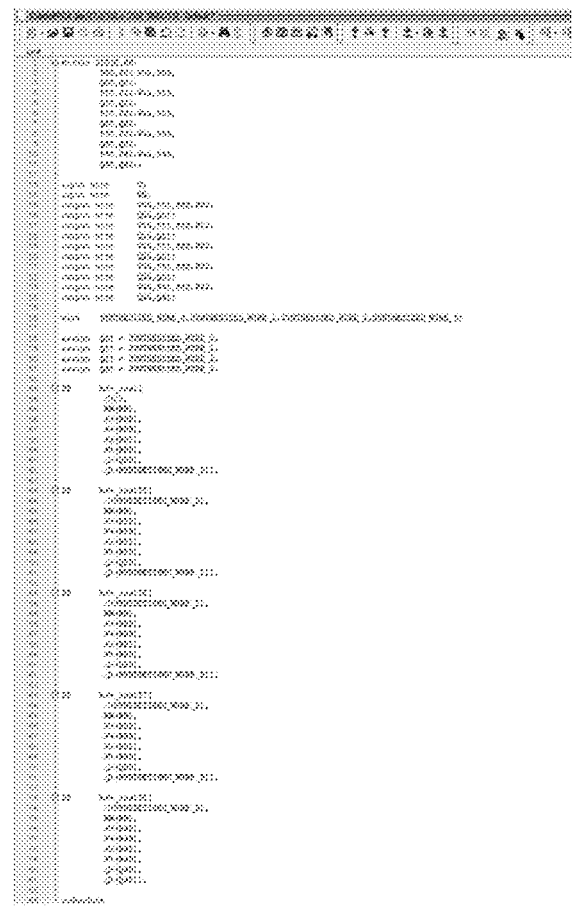
FIG. 63 shows a schematic, according to an exemplary embodiment of the invention.
Figure 65:
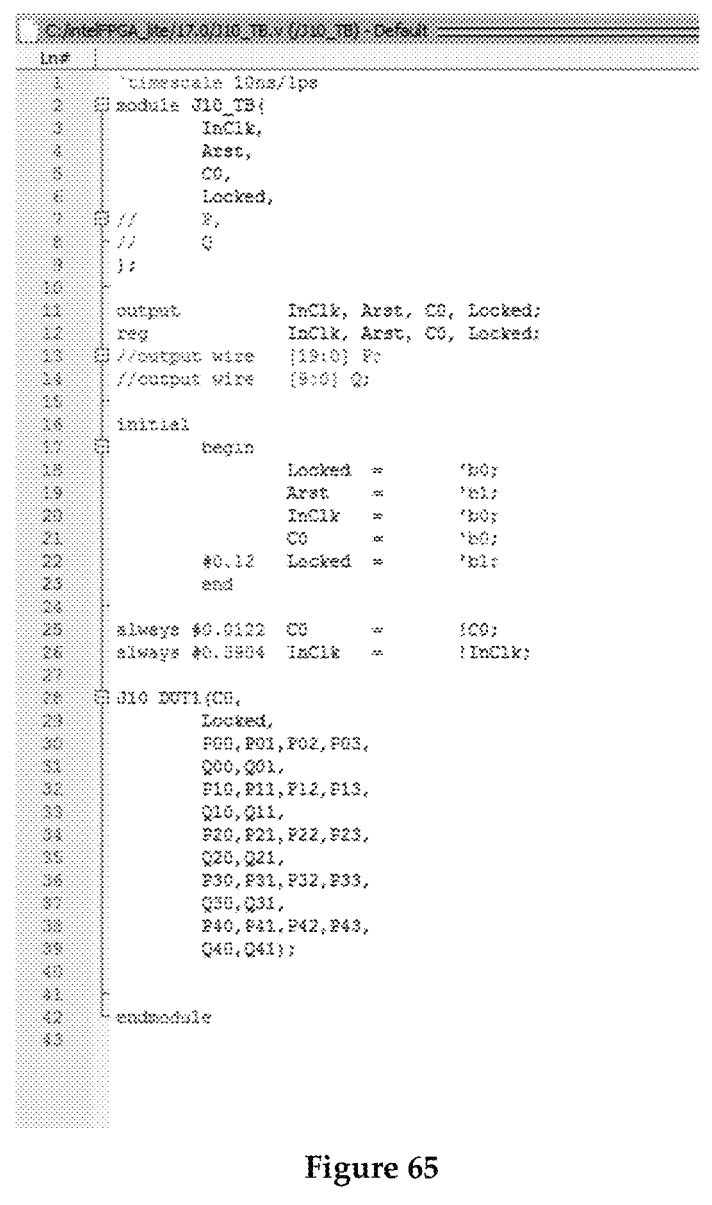

Note the Q0 and Q1 outputs are overlapping as is characteristic of the 2-Bit Johnson counter and consequently only one DFFRBCF D-Flip/Flop changes state on each falling edge of the input C clock. This design minimizes the dynamic power drain and facilitates simple decoding of the P1, P2, P3, and P4 output signals. The P1, P2, P3, and P4 output signals show a "Marching 1" pattern that makes state timing/decoding with each group of the four counter states implied by a 2-Bit counter, explicit with little decode logic (FIGS. 63-65).

We have extended the definition of the P1, P2, P3, and P4 output signals show a "Marching 1" pattern to provide the P0X, P1X, P2X, P3X and P4X output signals, with the X signifying a "Marching 1" pattern at each division level. The first instance of J2 within the J10 DUT1 provides the Q00 and Q01 2-Bits of Johnson counter decoded to provide the P01, P02, P03, and P04 output signals show the highest frequency "Marching 1" pattern.

The second instance of J2 within the J10 DUT1 provides the Q10 and Q11 2-Bits of Johnson counter decoded to provide the P11, P12, P13, and P14 output signals show a rate at one-quarter of highest frequency "Marching 1" pattern. Similarly, the third, fourth and fifth instances J2 within the J10 DUT1 provide frequency division by four at each stage, as well as their respective P2X, P3X and P4X output signals. With four patterns at the highest rate and four patterns at each lower rate, we can locate $4^5$=1024 distinct decoded states with simple 5-Input AND functions for any particular state (FIGS. 66-67).

Figure 68:
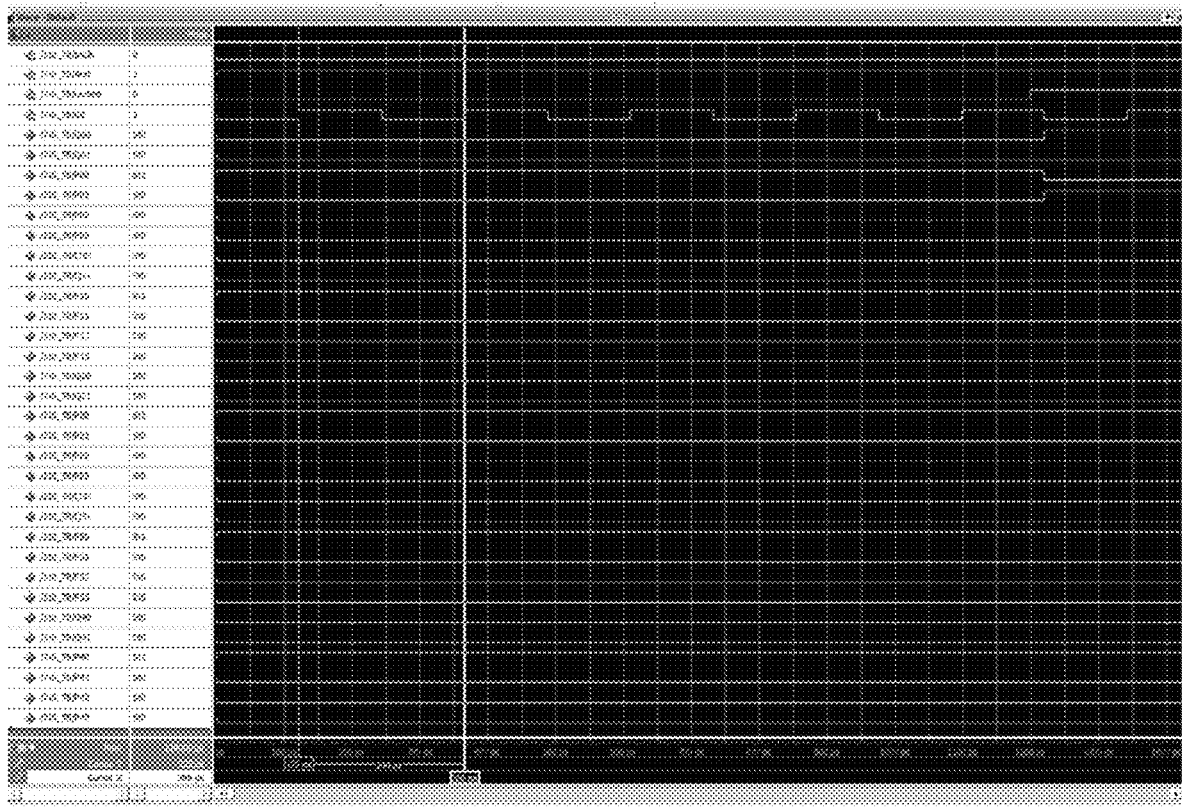
Figure 69:
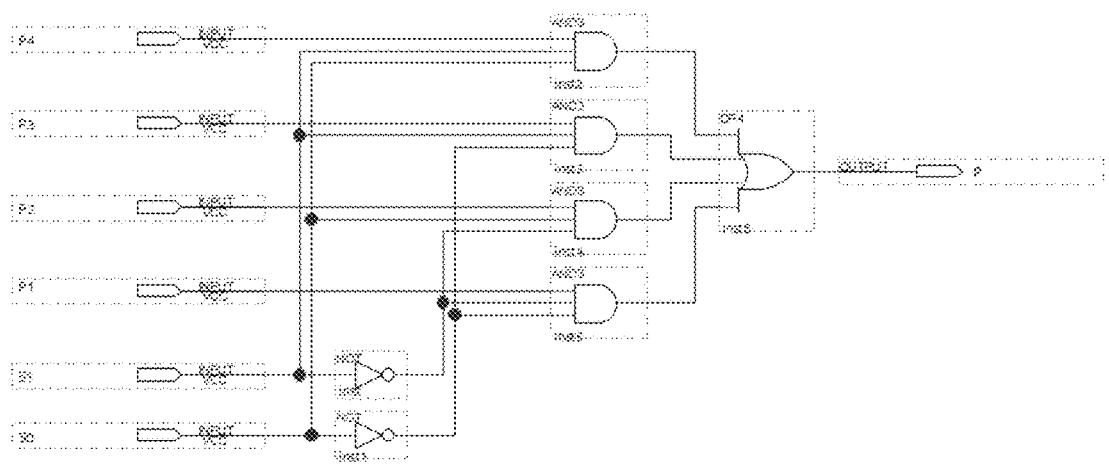
FIG. 69 shows a schematic, according to an exemplary embodiment of the invention.
Figure 72:
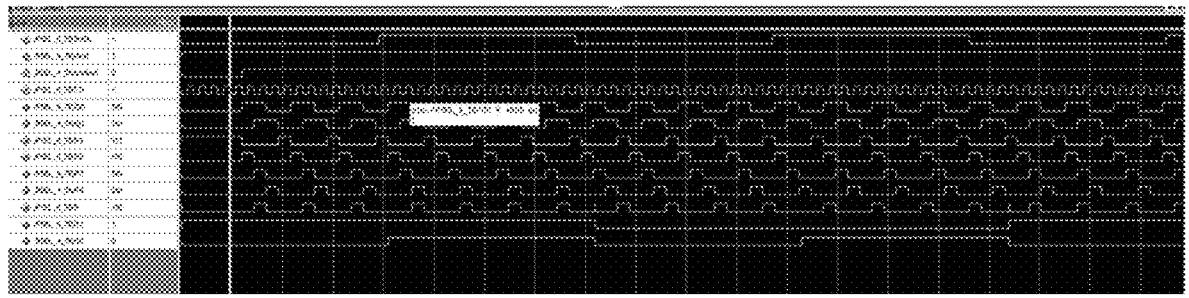
FIG. 72 shows a simulation, according to an exemplary embodiment of the invention.
Figure 73:
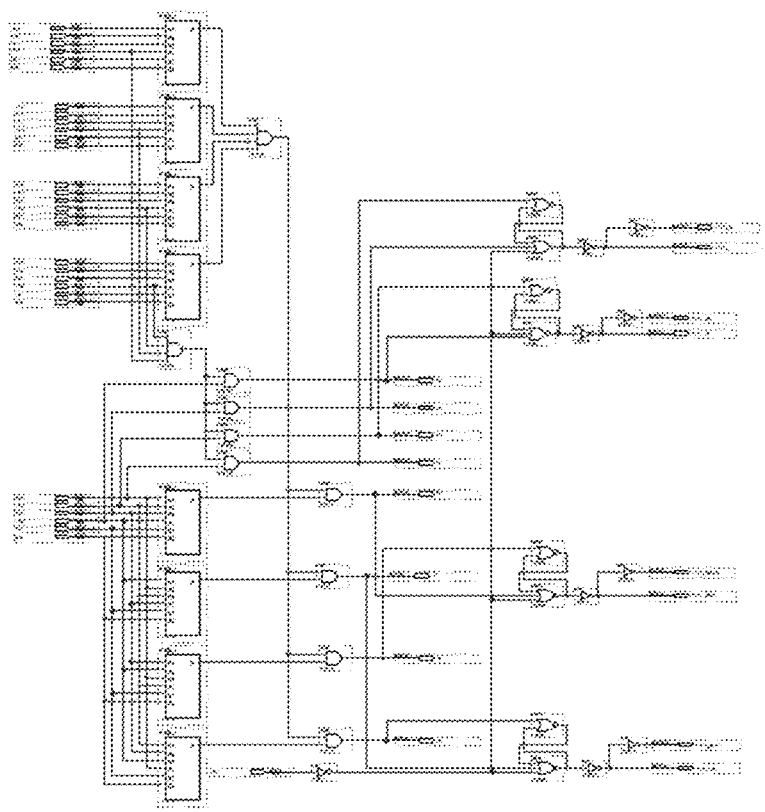
FIG. 73 shows a schematic, according to an exemplary embodiment of the invention.
Figures 78, 79:
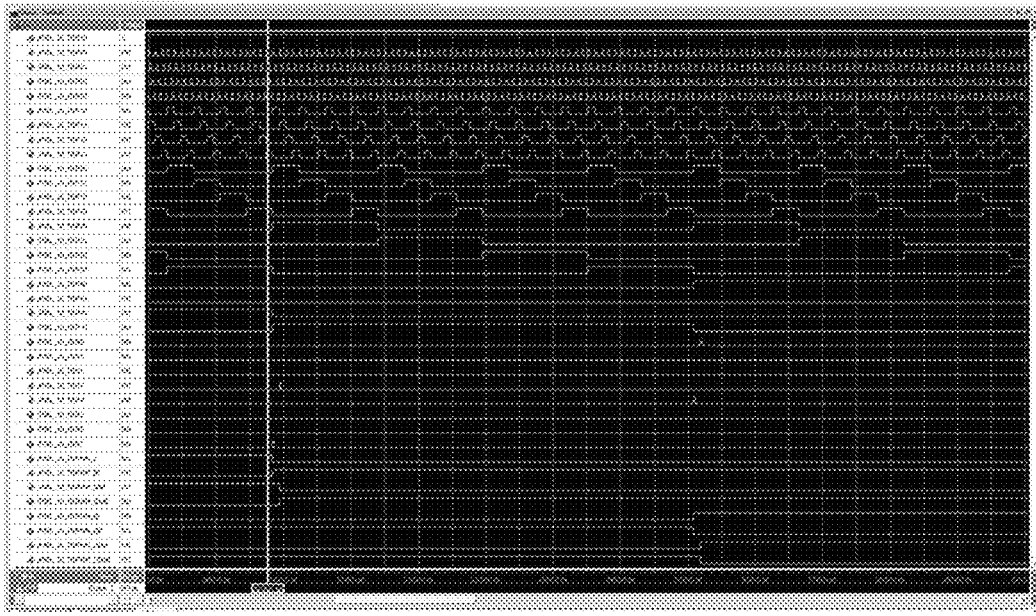
Figure 80:
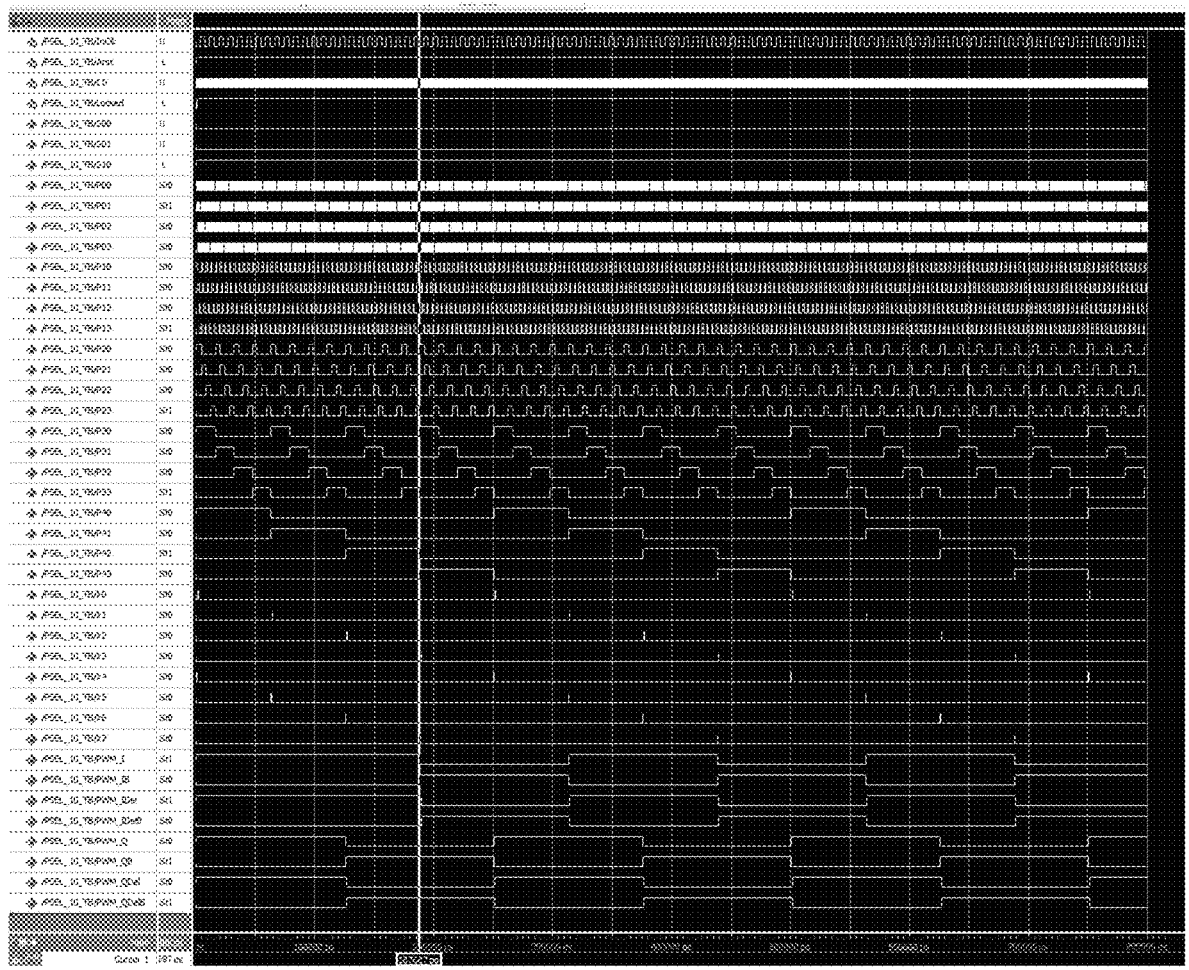

With two markers at the lowest rate at successive rising edges of Q40, we see a scaled time difference or period of ~0.25 microseconds and thus the desired 400 kHz PWM Clock result with decoded states to every 2.44 nanoseconds. With two markers at the Master_Oscillator at successive rising edges of C0, we see a scaled time difference or period of ~244 picoseconds and thus the target 409.6 kHz Master_Oscillator result with rising-edge to rising-edge cycles of every 2.44 nanoseconds is rendered at 10× the speed/time resolution, as is the PWM clock. Simulation at 10× is supportable, but operation in the FPGA is not due to the speed limitations imposed by its manufacture. If we realized the design in another, higher speed technology the 10× could be supported. The ModelSim simulation tool has no information about implementation limitations and will simulate at whatever speeds we tell it (FIG. 68).

Phase and Phase-Overlap Square-Waves:

We use the Select inputs S0 and S1 to select a particular pulse stream from the set of four possible choices. We will use this strategy to establish a reference set combination of pulses and also a selected second set combination of pulses to establish a desired delay between pulse sets. The simulation above shows the correspondence between the S0 and S1 codes and the P output as selected from the set of four possible choices (FIGS. 69-72). The Quartus tool represents the schematic as above with over 280 lines of Verilog code as presented in FIGS. 73-80. In the eight bottom simulation traces, we see two-phase PWM signals I and Q in quadrature, as well as Delayed versions of each and complements of each.

Figure 81:
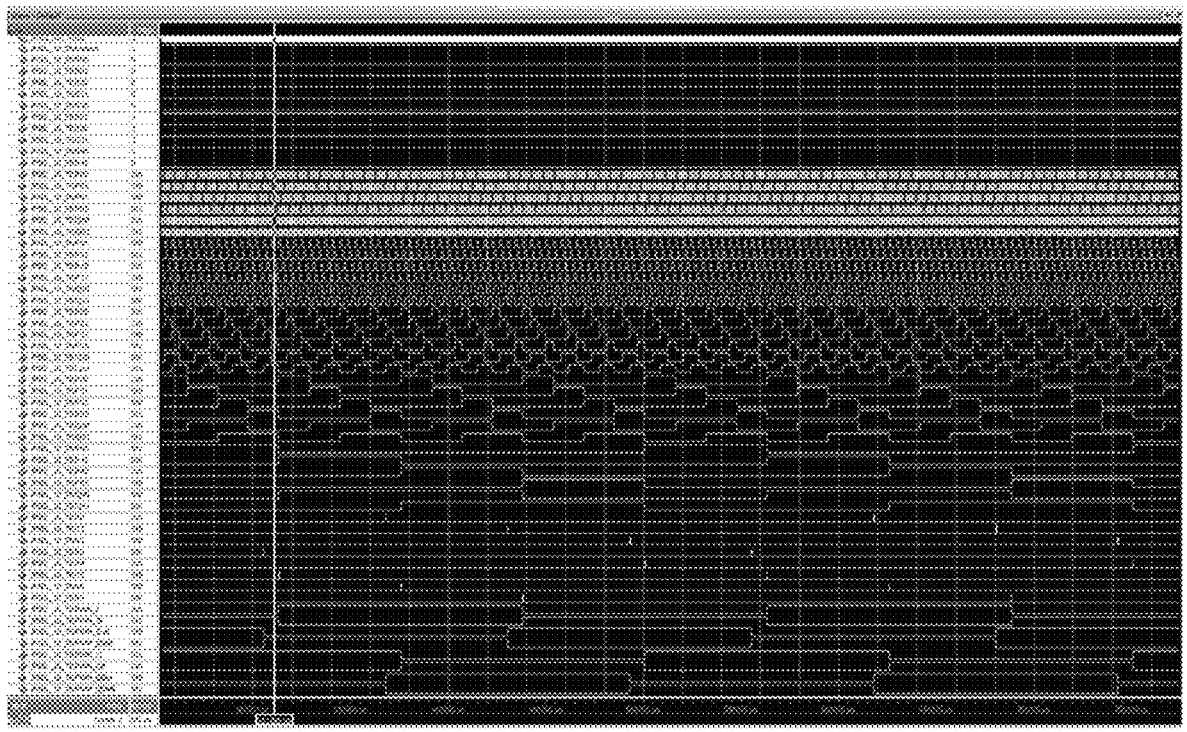
Figure 82:
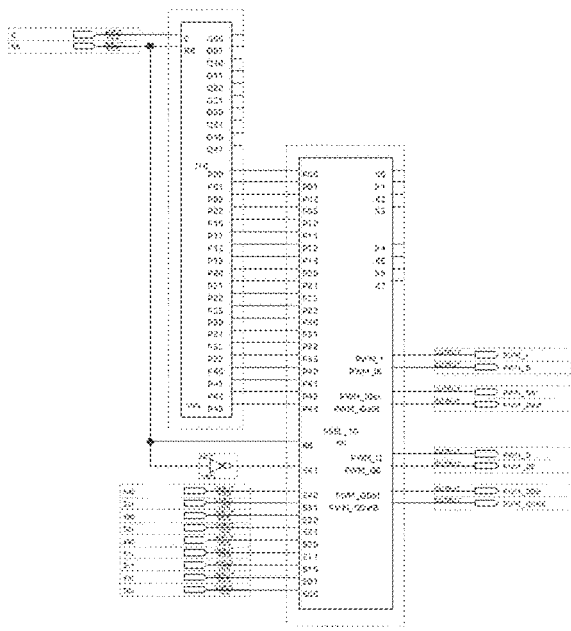
FIG. 82 shows Verilog Code, according to an exemplary embodiment of the invention.
Figure 86:
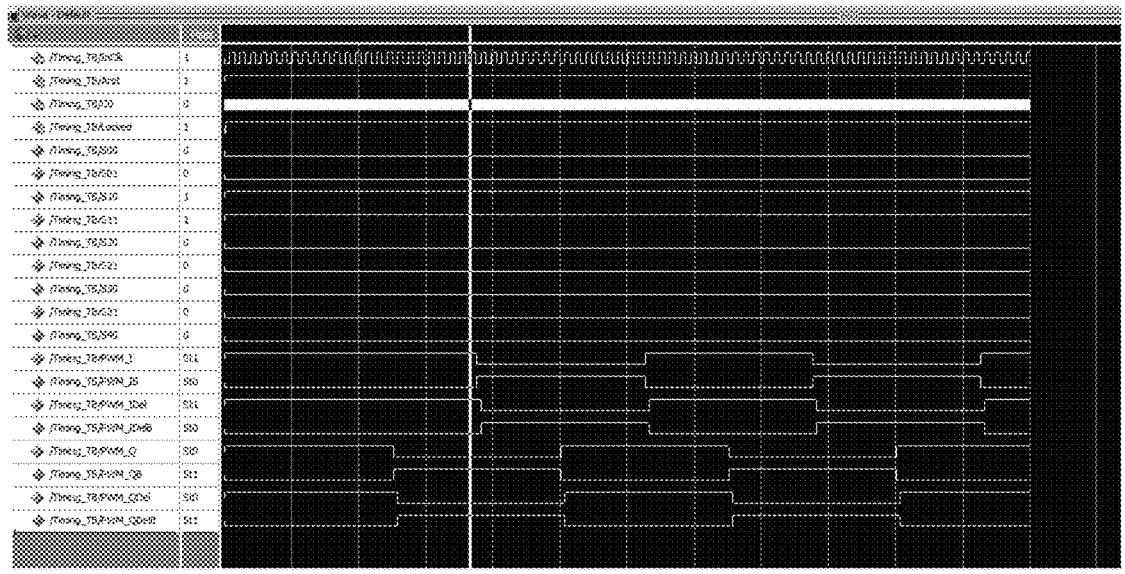
FIGS. 86-87 show simulations, according to an exemplary embodiment of the invention.
Figure 87:
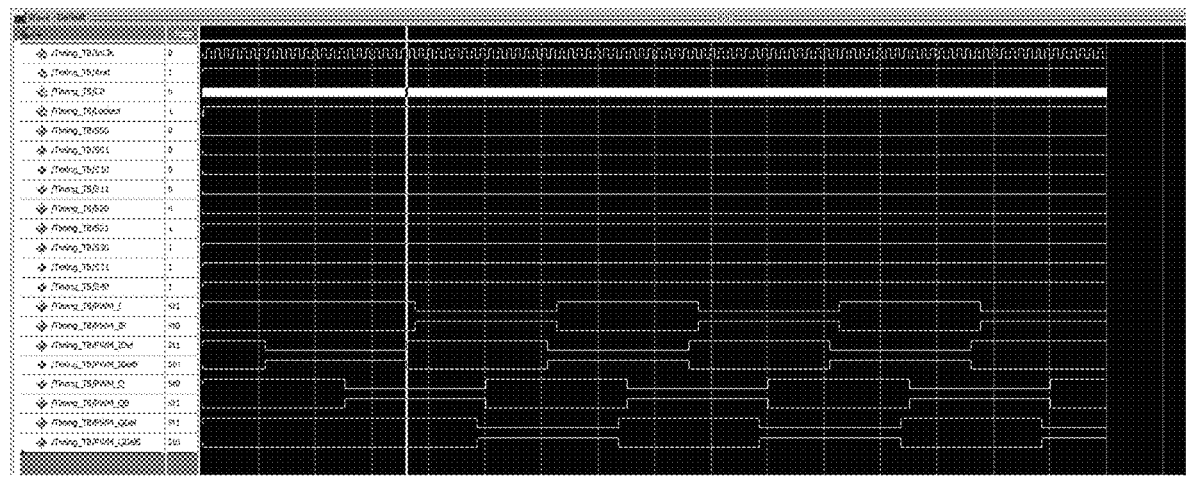

In the eight bottom simulation traces, we again see two-phase PWM signals I and Q in quadrature, as well as Delayed versions of each and complements of each, with the delay clearly visible on all. This controller construction permits the Phase-Overlap of PWM controlling square-waves to be a direct consequence of the binary code present on the collection of S inputs. The I and IDel pair (along with their IB and IDelB complements) are needed to control an H-Bridge PWM as discussed in prior sections. The addition of the Q and QDel pair (along with their QB and QDelB complements) support a two-phase set of H-Bridge PWM circuits in addition, but share the same collection of S inputs for delay in that Phase-Overlap of PWM controlling square-waves. The addition of a poly-phase-overlap PWM feature supports multiplication of the PWM pulse rate, sharing of the load currents, fail-safe redundancy, and further reduces EMI filtering requirements that is nearly equivalent to increasing the PWM frequency alone (FIG. 81).

In the eight bottom simulation traces, we again see two-phase PWM signals I and Q in quadrature, as well as Delayed versions of each and complements of each, with the delay clearly visible on all. The delay is nearing one-half cycle of the PWM square wave signal. Note that the higher-order binary S bits are "1" with the exception of S41—the highest order bit. Activation of S41 selects delays in the second half of the PWM square-wave cycle and past the desired PWM pulse-width control range. Therefore, despite the selection of 1024 possible delays values, those above 512 delay increments are unusable in this implementation; we have only $2^9$ or 1-in-512 delay precision, rather than the target 1-in-1024 delay precision (0.19% instead of 0.097%). The difference is not substantial enough to warrant a design change to attempt to increase the Master_Oscillator frequency 2× higher in this technology.

The binary range of codes from hexadecimal 000 to 1FF covers a linear (straight-line) control range. To obtain the requisite sine-wave weighting we require computation of a binary sine wave over the period of the line input between zero-crossing events. We require the selection S41 to be logic "0" to generate the correct range of delays from zero to one half of the PWM cycle so we have connected it to the reset to achieve that goal (FIGS. 82-87).

Normalized Period Method and Apparatus Implementation—

We have shown the method and apparatus above to obtain the requisite PWM period Timing for two sets of quadrature H-Bridge control signals. The PWM periods serve as the timing clocks for the Period measurements and behavioral computation of the normalized Period in the introductory discussions of the H-Bridge PWM apparatus. We follow with the digital circuitry and its translation to Verilog that achieves the requisite behaviors.

Figures 88, 89:
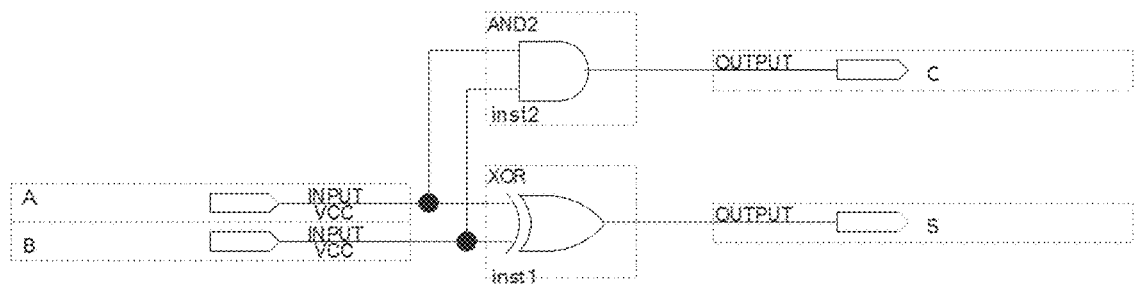
FIG. 88 shows a schematic, according to an exemplary embodiment of the invention.
FIG. 89 shows Verilog Code, according to an exemplary embodiment of the invention.
Figure 90:
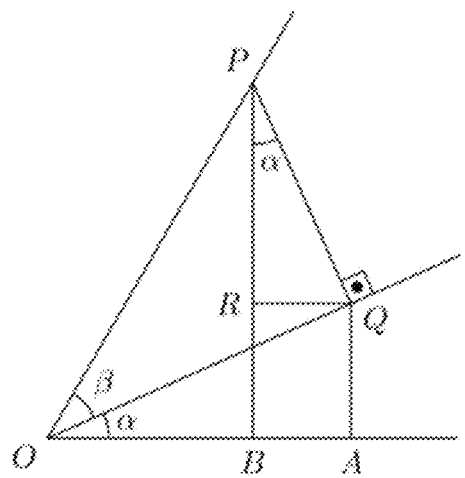
FIG. 90 shows the Geometrical derivation of the Sums of Angles Identity, according to an exemplary embodiment of the invention.
Figure 91:
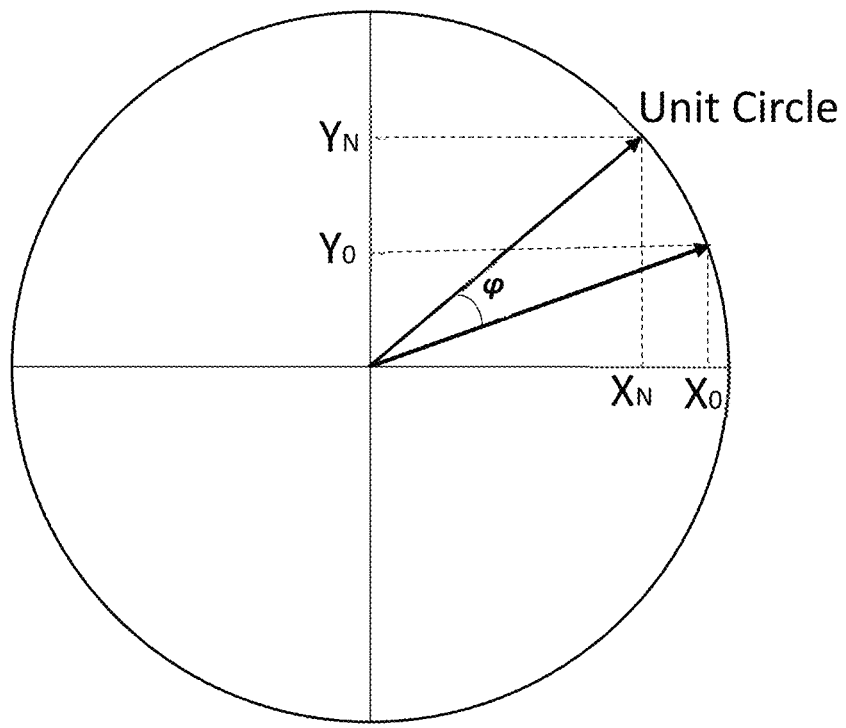
FIG. 91 shows the CORDIC approach successive rotation of a unit vector, according to an exemplary embodiment of the invention.

To obtain the timing information for the Period and its normalization, we employ a collection of digital arithmetic and counters cells and combine them and perform those functions required in the preceding behavioral Verilog as introduced. To combine two binary signals and form binary arithmetic, we start with the well-known Half-Adder HA cell (FIGS. 88-89).

In binary arithmetic, the count at a binary digit (bit) is either "0" or "1" so adding two numbers results in either of those representations at every power of two (hence the binary name). Larger numbers are represented as in many number systems by a positional notation and a "radix point" for reference. In general terms, we have:

$$B^{n+1}, B^n, \ldots, B^1, B^0, \ldots, B^{-1}, B^{-2}, \ldots, B^{-m}, B^{-m-1},$$

Most commonly, we use B=10 for base-10 or decimal arithmetic. In digital systems, we use B=2 for base-2 or binary arithmetic. The radix point divides the field of positions to integers on the left and fractions on the right. For counters, we normally use integer numbers only.

All arithmetic proceeds from addition and subtraction into more and more complex forms. For binary addition, we combine bits "A" and "B" in any every position to create a result "Sum" as well as a "Carry" to the next higher power of the base.

We show the expected results below:

$A+B$=Sum, and Carry

0+0=0 Sum, and 0 Carry

0+1=1 Sum, and 0 Carry

1+0=1 Sum, and 0 Carry

1+1=0 Sum, and 1 Carry

The Half-Adder HA cell as shown above produces the results required as known to those skilled in the art. For a bit position placement that has lower-order bits adjacent, the case also exists that we are summing three bits to produce the Sum "S" and Carry "Co"; the third input bit is a carry-in "Ci" from the lower order bit adjacent to produce the results as follows:

$Ci+A+B=S$, and $Co$

0+0+0=0 Sum, and 0 Carry

0+0+1=1 Sum, and 0 Carry

0+1+0=1 Sum, and 0 Carry

0+1+1=0 Sum, and 1 Carry

1+0+0=1 Sum, and 0 Carry

1+0+1=1 Sum, and 1 Carry

1+1+0=0 Sum, and 1 Carry

1+1+1=1 Sum, and 1 Carry

To accommodate arithmetic at bit positions with a carry-in, we employ the Full-Adder FA. Both HA and FA utilize the A and B stimulus and the Ci stimulus applies to the FA only. C is the Carry out for the HA only and Co is the Carry out for the FA only. Sh is the Sum out for the HA only and Sf is the Sum out for the FA only. Note that the Sum signals are identical whenever the Carry-In Ci is not activated. To build a counter, which is a specialized adder with a single, low-order bit added at each count interval forming an incrementer, we have only the present-state bit at each location and a possible Ci with no second "B" argument. We will utilize the counter to determine the "Period" between zero-crossings of the line in terms of PWM periods.

We generate hierarchical schematics from the cells available and use those cells in higher order applications. We will be making the required 12-Bit counter but we begin with a 4-Bit building block Count4. Note that the C signals do not change whenever the Carry-In Ci is not activated. From that cell we build.

Normalized Period Event Time Capture Implementation

Armed with the Count_12 Counter implemented above, we will be required to acquire the values of the count at two events bordering the zero-cross interval. To do so we require two 12-bit registers to capture the count first at the falling-edge of the beginning of the zero-cross interval and then at the rising edge at the end of the of the zero-cross interval. As a consequence, we organize DFFRBCF Flip-Flops into 12-Bit registers and proceed with implementing the calculation. As before we employ a hierarchical approach beginning with a 4-Bit cell.

The REG_12 and Obs12 are nearly identical in function but different in the construction of their outputs. The REG_12 assigns a distinct name Q0, Q0B, Q1, . . . to each output and presents that as twelve different single-bit variables and twelve complements. The Obs12 collects all outputs into an indexed list Q[11:0] of outputs and presents that a single indexed variable. The structure of the Obs12 is much more convenient in the simulation but there are restrictions in the Verilog language that prevent connection to following modules if indexed wire bus structures are used everywhere. For that reason, the Obs12 is placed for simulation observation only. We construct an instance of the counter, two REG_12 with Obs12 connected to the outputs to make the counts easier to interpret here, but are not retained in the final implementation.

The Events schematic above combines an instance of the Count_12 counter, a REG_12Q and REG_12 instance, along with three instances of the Obs12 cell. The Counter accumulates a binary value based on the PWM Clock and the REG_12Q and REG_12 are edge-triggered by the Timer signal. The Timer signal is the XOR of the Pos and Neg signals developed in the zero-cross circuit.

The Events_TB simulation shows the Pos and Neg signals generating the Timer signal. The Counter C is changing too fast to resolve in this high-level simulation, but near the Timer signal pulse, both the T and X Obs12 register signals change state. At startup, the T Obs12 is reset to the hexadecimal FFF value but the X Obs12 is reset to the hexadecimal 000 values. The T Obs12 is intended to capture the C value of the Counter at the beginning of the Timer pulse and the X Obs12 is intended to capture the C value of the Counter at the end of the Timer pulse. The two values will be combined to calculate the Timer interval count difference and thus subtracted as the X–T interval count difference.

Digital subtraction is performed in 2's complement arithmetic; the Counter is X at the end of the interval and is larger than the Counter value T at the beginning, so the Counter value T is obtained using the REG_12 Register which provides the complement of its "Q" contents (000=>FFF at RB event) and the Counter value X is obtained using the REG_12 which provides both its "Q" and "QB" outputs. By constructing a binary ADD function and incrementing with a "Carry-In" bit, the 2's complement arithmetic is performed directly using the "QB" outputs without an additional complement function. By construction, the X–T interval count difference must always be a positive number result.

In the detail above, we see the same simulation expressed in a hexadecimal and digital radix. We see the Counter C incrementing at each Clk falling edge. Because the Obs12 uses the same Clk signal, we see the T and X registers acquiring values one Clk cycle after the Timer edges. The X Obs12 acquires the positive binary 0110 0111 1000 value and the T Obs12 acquires the negative 1001 1000 0111 value which is the 1's complement of the 0110 0111 1000 C Obs12 value at the edge occurrence. The values of Pos and Neg times we use are approximations of expected values for a zero-crossing event near a 60 Hz operating condition, as is the difference. We now need binary ADD functions to generate the 2's complement summation to find the Timer interval duration. And more instances to correct the Period value as well as the Counter value.

For specialized locations, we can employ slightly different cells as shown above. In the schematics, input signals are commonly on the right and signals flow from right to left and top to bottom, hence the organization of 4-Bit and 12-Bit examples shown above, despite the number systems bit-order from right to left in higher powers of the base. For subtraction, we will perform the 1's complement prior to applying the signals to the inputs and we will substitute an ADD_4Ci at the input, low-order location to be able to increment the result for 2's complement subtraction and thus construct the ADD_12Ci variation as needed. In subsequent implementation, we shall also connect the Ci bit to the 1's complement to make another cell capable of either addition or subtraction under input control, but we will show that further variation in the implementation where it is required.

We augment the specialized "Events" schematic with an instance of the Add_12Ci cell two instances of the Add_12 to make the requisite calculations from the Count value at the Timer edges and improve the approximations of values for a zero-crossing event for a particular 60 Hz operating condition. The result is to obtain the Period schematic from the "Events" schematic and illustrate the calculations.

The objective is to improve the estimation of the zero-crossing event by capturing the T and X register values, the later value as a positive number and the earlier value as the 1's complement of the Counter. The instance of the Add_12Ci combines the T and X register values and increments the result using its Ci input to produce the "D" difference value as the width of the Timer pulse surrounding the actual zero-crossing event. In the Period schematic, the augmentation that includes two instances of the Add_12 cell uses a physical "shift" of the bits comprising the "D" difference as half the width of the Timer pulse. That half-D result is added to a positive representation of the T-register Count value at the beginning of the Timer pulse and thus form the Period value of the previous line frequency interval. That half-D result is also added to the Counter "C" value at the end of the Timer pulse and beginning of the next line frequency interval. Because the Pos and Neg signals generating the Timer signal are not synchronous events to the Counter sequence, we use the PFD circuit below to reset the Counter to a zero value at the end of the Timer pulse and beginning of the next line frequency interval, but because it is starting "late" by half the D interval, we add a half-D result to produce a "corrected" X value as a measure of counter progress into the next line frequency interval.

We see from the simulation that all the prior behaviors of the Period cell are preserved but the synchronization afforded by the PFD is now present. The Counter is reset and the X output has the value of the counter augmented by the half-R correction. Likewise, the Period P is similarly corrected. Because the Obs12 cells are used only to make internal values easily presented in indexed variable form, we remove those and form a cell without them.

Using the Obs12 registers to present hexadecimal behaviors, we see the expected behavior for the Period measurements. We obtain the P value as the corrected Period for each previous line frequency interval and we obtain the X value as the corrected Counter for each following line frequency interval. As the early Behavioral Verilog model required, we have introduced a digital that performs the required calculations for Period and now we need to normalize the ratio by calculating ratio R from X/P that was done in Behavioral Verilog but requires a digital representation.

Combinational Logic Divider Implementation

The arithmetic of division, much like multiplication, consists of an operation, shift and repeat. We implement the shift, as we did to obtain half-D values above, by shifting the wiring between cells. Multiplication is shift and conditional add and division is shift and conditional add/subtract. We use the non-restoring, 2's complement subtraction by implementing a conditional 1's complement, add and increment.

Generally, in binary division, successive shifted or divided by two versions of the denominator P are conditionally subtracted from the numerator X, resulting in a partial remainder. The sign of the partial remainder determines a bit in the Ratio R, and whether the partial remainder is accepted for the next operation or is restored to its value before the subtraction. In non-restoring division, the sign bit of the partial remainder determines whether the next operation is an addition or subtraction, thus using the next operation to perform the same correction that the restoring approach does in two operations.

For the implementation to calculate the ratio R from the P and X arguments, we know that all input numbers are unsigned positive integers arising from Counter values, but the ratio R is a fractional result less than unity. Further, with the restoring approach to division, we must be able to represent negative numbers during the calculation. We have been careful in selection of the 12-bit representation of the PWM time-base Counter and the clocking frequencies so that we do not encounter an overflow of the Counter during normal operation; indeed, an overflow is an indication of a fault condition. We have also been considerate of the Period value range so that we get the highest resolution possible with Period P values from 3030 to 3703 implying that the Most Significant Bit (MSB) of the Period P values will nominally be between values of 2048 and 4096 and therefore a logic "1" for any expected value.

To perform a subtraction, we employ signed arithmetic which requires a sign bit in the MSB position. We do not wish to give up the 12-bit resolution so we augment the P and X arguments with a sign bit, transforming the data to a 13-bit signed representation. Because both P and X arguments are positive, that sign bit is initialized to a logic "0" value in each and we can employ 2's complement arithmetic in the non-restoring division.

Further, we consider the 12-bit resolution to be binary fraction representation with the radix point between bit 11 and bit 12, or the significant digits and the sign bit. We know that the Period P is expected to be between values of 3030 to 3703 with MSB of "1" that signifies a range of 2048 and 4096 so we choose a 12-bit binary value of 1100 0000 0000 or P value of 3072 and in the expected range. We know that we expect the X value to be less than the P value over nearly the entire range of values. For discussion, we choose 0000 0000 0001 as the first possible X value; a zero value is not possible because the Timer pulse is expected to be non-zero and the correction to X makes it non-zero, too.

The ratio of the unsigned magnitudes of (0000 0000 0001)/(1100 0000 0000) is a small, non-negative number so we expect the first partial remainder from subtracting (0000 0000 0001)−(1100 0000 0000) to provide a result with a positive result and fill the MSB of the ratio R with a logic "0" result. Using the 1's complement of P and adding R, we get (0000 0000 0001)+(0011 1111 1111) to obtain (0100 0000 0000), which we augment with the Ci input to obtain (0100 0000 0001), a value with the correct sign, but an incorrect magnitude because is −3071, both negative and different magnitude.

By augmenting the 12-bit unsigned numbers with a positive sign bit, we obtain: subtracting (0 0000 0000 0001)−(0 1100 0000 0000) and using 1's complement, (0 0000 0000 0001)+(1 0011 1111 1111) to obtain (1 0100 0000 0000), which we augment with the Ci input to obtain (1 0100 0000 0001), a value with the correct sign, but an incorrect magnitude because the correct result of 1−3072 is −3071, both negative but different magnitude. To restore the result to the correct value, we add or restore the result as: (1 0100 0000 0001)+(1100 0000 0000) to obtain (1 0000 0000 0001).

First, we construct the 1's complement cell using a hierarchical XOR logic approach.

We construct the Add_Sub_12 cell by pre-pending the XOR_12 to the "B" inputs of the ADD_12Ci cell that we have already introduced. The Ci bit is connected to the "C" input of the XOR_12 so that each bit is a bit-wise XOR of the inputs of the XOR_12 to form a 1's complement at the XOR_12 outputs. That a 1's complement at the XOR_12 outputs forms the combination with the A inputs of the ADD_12Ci cell, as well as its Ci input. As a result, when the Ci input is logic "0", the ADD_12Ci cell produces A plus B at the Y outputs, i.e., a digital addition of the two twelve-bit inputs. When the Ci input is logic "1", the ADD_12Ci cell produces A minus B at the Y outputs, i.e., a digital subtraction of the two twelve-bit inputs.

We see in the simulation that the A inputs are incremented at each interval and the B input is a constant "1" with the result that the Y outputs are A+B when Ci is "0" and A−B when Ci is "1" as expected.

In the initial Behavioral Verilog model that computed the normalized Counter value for the ratio R=X/P, we have Counter contents as the interval increases through the line source's cycle. We have been considerate of the P Period value range so that we get the highest resolution possible with Period P values from 3030 to 3703 implying that the Most Significant Bit (MSB) of the Period P values will nominally be between values of 2048 and 4096 and therefore a logic "1" for any expected value.

We deal with some uncertainty due to the range of source frequencies and Period results. For the implementation to calculate the ratio R from the P and X arguments, we know that both input arguments are those unsigned positive integers arising from Counter values.

We also know that, over the expected range, the value of X is expected to be greater than P Period value. As a result, the ratio R is a fractional number and less than unity with the possible exception near the end of the Period for cases with decreasing frequency and resultant increasing Period value. Numerically, we do not expect the Period to increase substantially in successive intervals and therefore we are using the previous Counter values over the interval to obtain the Period value.

Because the ratio R is a fraction, it is convenient to treat the Counter contents as fractional numbers also for reasons that will soon be apparent. With this understanding, X[11:0] and P[11:0] fields are binary fractions of a full Counter range with magnitude values as follows:

$$X[11:0] = \sum_{i=0}^{11} 2^{i-12} X[i]$$

$$P[11:0] = \sum_{i=0}^{11} 2^{i-12} P[i]$$

Interpreting the radix point to the left of the magnitude in a division algorithm allows extending the range of the computation by augmenting the numerator value for the ratio R=X/P with trailing low-order magnitude binary "0" values to increase the dynamic range of the calculation without increasing the bit-width of the digital hardware implementing the addition and subtraction.

We assume a residue S=X−R*P and proceed with calculation:

$$S = x - P \cdot \sum_{i=0}^{11} 2^{i-11} R[i]$$

The arithmetic of division, much like multiplication, consists of the noted subtraction series operation, shift and repeat. We implement the shift, as we did in the implementation to obtain half-D values above, by shifting the wiring between cells. Multiplication is shift and conditional add and division is shift and conditional add/subtract in non-restoring division algorithms; 2's complement subtraction is obtained by implementing a conditional 1's complement followed by add and increment.

Generally, in binary division, successive shifted or divided by two versions of the denominator P are conditionally subtracted from the numerator X, resulting in a partial remainder. The sign of the partial remainder determines a bit in the Ratio R, and whether the partial remainder is accepted for the next operation or is restored to its value before the subtraction.

In non-restoring division, though, the sign bit of the partial remainder determines whether the next operation is an addition or subtraction, thus using the next operation to perform the same correction that the restoring approach does in two operations.

Further, as with a restoring approach to division, we must be able to represent negative numbers during the calculation.

We have been careful in selection of the 12-bit representation of the PWM time-base Counter and the clocking frequencies so that we do not encounter an overflow of the Counter during normal operation; indeed, an overflow is an indication of a fault condition.

We obtain our non-restoring division algorithm result by successive approximation based on the recognition that if R=X/P, with X=R*P as a consequence. We calculate a residue S by postulating a value for each successive bit in R and forming a decision on the result of the bit to reduce the magnitude of the residue.

A typical form of the non-restoring algorithm using the P, X, R, and S definitions above, but with P, X, and S augmented to include an added sign bit and another to accommodate worst-case dynamic range of S after the shift for multiply, is expressed below as:
1: Set an auxiliary data value Sign test bit="0"
2: Set the Residue S to X
3: Set a counter index"i" to the number of data bits in the R number
4: Decide;

If SIgn=1,$S<=S+P$

If SIgn=0,$S<=S-P$

5: Set SIgn to the sign bit of the resulting S residue
6: Set R[i] to the complement of SIgn
7: Shift S left, to multiply by 2
8: Test the index for (i=0), and repeat from 4: until zero
We initialized the algorithm with the steps below:
1: Set the auxiliary data value Sign="0"
2: Set the Residue S to X Armed with the Behavioral Verilog model, we can proceed to a suitable implementation. We recognize that the Div_Behave Behavioral Verilog Code is a sequential solution that is suitable for the loop in which it is simulated, i.e., it proceeds in time-steps to a solution. In the FPGA, it is possible to construct a sequential approach, but we seek here a combinational implementation that produces an output with very little delay after presentation of the input argument values, rather than after a number of loop-timing intervals. In our combinational implementation, we are also faced with the addition of the hardware needed to deal with signed integer arithmetic.

First, we consider the index variable in "space" rather than in "time." We "unroll" the loop of execution to express the behavior as the unit of data processing within the loop in hardware.
1: Decide;

If Sign=1,$S<=S+P$

If Sign=0,$S<=S-P$

2: Set SIgn to the sign bit of the resulting S residue
3: Set R[i] to the complement of Sign
4: Shift S left, to multiply by 2 (External wiring connections)

Before we continue with the modifications of the Add_Sub_12 cell, we note that the inputs presented to the XOR_14 are obtained from the P values only and it does not change from its initial 12-bit values. Therefore, the X12 and X13 inputs are always a digital "0" at every instance. The result is that the Y12 and Y13 outputs are identically the "C" input value reducing the number of signal inputs; we can use the XOR_12 cell instead and wire the destination of the Y12 and Y13 outputs to the "C" input value.

We extended the Add_12Ci cell to include two Full-Adders and create the Add_14 Ci cell shown above and place it with the XOR_12 into the new ROW_14 cell below. In the process, we re-name the inputs and outputs to more-closely align with the names used in the iterative functions of the Divider.

With the ROW_14 cell, we re-define the Ci input as the Sign_In input to test for the internal ADD/SUB decision. The A inputs are renamed as the P inputs to reflect that they originate with the Period and are mutated by the Sign_In input to provide that value for the internal ADD/SUB function. The B inputs are identified with the S residue inputs and are redefined to correlate with the S input function. Likewise, the Y outputs are redefined as S outputs to correlate with the S output function. We define a new output R that is the complement of the S output sign bit and is used to form the Ratio bit values at each location.

In general, we have "unrolled" the algorithm, but we also needed to examine the performance under all conditions. For the case of the Period near the range of the entire field of P values (up to 4095 can be represented), and near the beginning of a new cycle of counts for the X value, the residue S begins near X−P=~(0−4095), or the 2's complement of 4095 (0 1111 1111 1111=>1 0000 0000 0001). This representation is a result of the addition of the sign bit to transform the 12-bit number to a 13-bit 2's complement form.

The problem arises in this particular case as a result of the shift operation to represent 2× the S residue value. Recall that the residue S is representative of a negative 4095 and the shift is meant to double that value; −4095=>−8190, but that number requires 13 bits for the magnitude plus an additional sign bit. Although we have only 12-bit data at the inputs, we require 14-bit internal arithmetic as the ROW_14 schematic illustrates.

The "unrolled" structure is defined in the Ratio schematic below that includes an instance of the ROW_14 cell at each level of the iteration; each cell/iteration computes a single bit of the R residue result. Because the first step in the computation requires the difference X−P, that first stage is supplied with X in the S residue location and "finessed" into computing a difference by supplying the Sign_In control bit with a digital "0" from the inverted value of the RB reset bit. Further, we use that same source of a digital "0" to produce a signal for the higher-order two bits that are not supplied from Counter values.

The Ratio cell "normalizes" the range of R so that the value is from hexadecimal 000 to 7FF as the Counter value progresses from 000 to the Period, regardless of the Period value. The R value indexes the progress through the source waveform and provides the basis for converting that basis into a sine value for PWM control.

We see above the Period Norm Synchronized Schematic as well as a copy with the Obs12 cell added for simulation observability reasons. We construct a Period_Norm_Obs.v Verilog model for the schematic above using the Quartus tool, invoke it in a Period_Norm_Obs_TB.v Behavioral Verilog model as shown below and proceed to simulate that test-bench using the ModelSim tool as we have done previously to confirm behavior.

The arithmetic of the Ratio cell maintains the R[11:0] 12 bit number for the Ratio value, but the MSB is only active if the ratio exceeds the expected hexadecimal 000 to 7FF range. We see the expected one-cycle delay caused by the Obs12 cell and infer that the Ratio reached to a number above the expected range and activated the significant R[11] bit during the Timer interval. We are now faced with converting the normalized R[11:0] values into a sine value proportional to that range of values signifying a range of angles from 0 to π radians. We require R[11:0]=000 to produce Sine(0) and R[11:0]=7FF to produce Sine(n) so that we can use those values to apply to the delay controlling the PWM phase overlap.

We construct a vector rotation over the range [000≤R[11:0]≤7FF] wherein each value of R signifies an angle from 0 to π radians. Because we have formed the normalized ratio R, we are able to compute the sine of the angle based on uniform rotations of the coordinate system in increments of $\pi/7FF_2=\pi/4096$, however, we are only able to employ a 10-bit result in the phase-overlap delay using the sine of the angle. Because the coordinate rotation scheme adds only a bit of accuracy per stage, we can calculate the entire 12-bit sine rotation resolution but only apply 10-bits of the rotation result.

Combinational Sine Conversion Implementation

To generate the Sine of a value, we modify the Coordinate Rotation Digital Computer (CORDIC) Algorithm, and like the binary division implementation above, we "unroll" the sequence to generate a sequence of logic cells. The arithmetic of the CORDIC algorithm, much like multiplication and division, consists of operations, shift and repeat.

We begin with the sum-of-angles construction from Euclidean geometry to produce a vector rotation procedure and follow with a calculation sequence.

We proceed as we did with division to construct a Behavioral Verilog model and unroll the time sequence into a digital logic cell sequence. We have the advantage that the algorithm has been around since 1959 and implemented in many forms, including some FPGA implementations. In most implementations, there is a concentration on either a small size, slow approach, or a pipelined fast approach. In this case, we have nearly the entire duration of a PWM cycle at our disposal to produce a result but are armed with the assurance that we may "pipeline" the implementation using higher-speed clocking available from our high-speed timing reference.

Geometrical Derivation of the "Sum of Angles Identity" for the "Coordinate Rotation" Calculation.

Construction: Establish the origin "O" and draw the x-axis horizontal line. Draw a first line, counter-clockwise by an angle α. Draw a second line, counter-clockwise by an additional angle β. The second line is therefore at an angle of (α+β) from the x-axis horizontal line. Place the point P on the second line [defined by the angle of (α+β)] at a unit distance from the origin. Form a "right triangle" OPQ by placing the PQ line perpendicular to the first line defined by the angle α. Form another "right triangle" OQA by placing the QA line perpendicular to the x-axis horizontal line. Form another "right triangle" OPB by placing the PB line perpendicular to the x-axis horizontal line. Form another "right triangle" PQR by placing the RQ line perpendicular to the PB line. Because RQ is parallel to OA, the OQR angle is the angle α, which implies the PQR angle is the angle (π−α), which further implies the RPQ angle is the angle α as shown in the illustration.

Derivations:

Because OP is constructed as unity, the length of PQ is sin(β) and length of OQ is cos(β). The ratio of the lengths of AQ/OQ is the sin(α), therefore AQ=OQ sin(α)=cos(β) sin(α). Likewise, the ratio of the lengths of PR/PQ is the cos(α), therefore PR=PQ cos(α)=sin(β)cos(α). Again, because OP is unity, the length of PB=sin(α+β) and the length of OB=cos(α+β). From lengths, PB=PR+AQ, we have sin(α+β)=sin(β)cos(α)+cos(β)sin(α). From lengths, OB=OA−AB, we have cos(α+β)=OQ cos(α)−PQ sin(α)=cos(β)cos(α)−sin(β) sin(α).

Summary: sin(α+β)=sin(β)cos(α)+cos(β)sin(α)

cos(α+β)=cos(β)cos(α)−sin(β)sin(α)

The CORDIC approach utilizes the Identity above by successively rotating a unit vector with coordinates of the sin and cos through an incremental rotating angle.

CORDIC begins with the definitions of two unit-vectors with an included angle φ as shown. The Cartesian coordinates are also their vector components. The vector with the "zero" subscript is rotated by the angle φ to produce the new vector with the "N" subscript. We can interpret the pair [$X_0$, $Y_0$] as the equivalent to the geometric Identity pair [cos(α), sin(α)], likewise, we can interpret the pair [$X_N$, $Y_N$] as the equivalent to the geometric Identity pair [cosine(α+β), sine(α+β)].

We rewrite the geometric Identity pair:

$$Y_N=\sin(\beta)X_0+\cos(\beta)Y_0=\sin(\varphi)X_0+\cos(\varphi)Y_0$$

$$X_N=\cos(\beta)X_0-\sin(\beta)Y_0=\cos(\varphi)X_0-\sin(\varphi)Y_0$$

Following the CORDIC development from above, we obtain:

$$X_N=X_0\cos(\varphi)-Y_0\sin(\varphi)$$

$$Y_N=Y_0\cos(\varphi)+X_0\sin(\varphi)$$

The CORDIC algorithm is based on the vector rotation of [x, y] through an incremental angle φ in Cartesian coordinates to obtain the new coordinates [x', y'] as follows:

$$x'=x\cos\varphi-y\sin\varphi$$

$$y'=y\cos\varphi+x\sin\varphi$$

Factoring the Representation:

$$x'=\cos\varphi[x-y\tan\varphi]$$

$$y'=\cos\varphi[y+x\tan\varphi]$$

We note that the representation above requires a multiplication by caw for each coordinate, as well as a multiplication by tamp within each summation. If we begin to generate a sine-wave, the first point lies with the unit vector along the x-axis having coordinates [1, 0], but each successive point requires multiplications and summations.

To obtain the benefits of the CORDIC algorithm, we restrict the representation to allow iterative increments of tan(φ) to $+/-2^i$, with the consequence that iterative angles of increment are $\tan^{-1}2^{-i}$ as follows:

$$x'=\cos(\tan^{-1}2^{-i})[x-yd_i2^{-i}]$$

$$y'=\cos(\tan^{-1}2^{-i})[y+xd_i2^{-i}]$$

The angle φ is obtained by sequentially iterating rotations of $\tan^{-1}2^{-i}$ until the desired angle φ is obtained. The first rotation of the angle $\tan^{-1}2^{-0}=\tan^{-1}1$ is obtained and compared to the desired angle φ with the understanding that there is likely to be an error. The first iteration is 0.785398 radians or 45°, it is not likely value of the desired rotation angle φ. If the difference is positive, we set the direction "d" to "+/−1" to add or subtract the next iteration. Note that the angle ratios are in powers of 2 so the succeeding terms are obtained by a decreasing single-bit shift at each iteration to the minimum possible shift that defines the angular resolution. We continue iterating until the angle φ is approximated in powers of 2 rotations.

We refer to the Table below to see that the first rotation indeed is 45°, but each successive rotation reduces the angle until a sequence of 16 rotations (a limitation of the table and finite number representation), shows that we have reduced the rotation (a measure of the approximation) to within 0.000874 degrees. CORDIC defines the sequence of iteration possibilities to approximate any rotation angle. Further, because each value of $\tan^{-1} 2^{-i}$ is a decreasing power of 2 from the previous rotation, it is obtained by a shift rather than a multiply operation, and further, that shift can be obtained by a structural shift of wiring between stages. All that is necessary is to determine if the error direction causes us to add or subtract $\tan^{-1} 2^{-i}$ between stages.

| i | $\tan(\varphi) = 2^{-i}$ | $\varphi = \tan^{-1} 2^{-i}$ | $\varphi$ = Radians |
|---|---|---|---|
| 0 | 1 | 45 | 0.78539816 |
| 1 | 0.5000000 | 26.56505118 | 0.46364761 |
| 2 | 0.2500000 | 14.03624347 | 0.24497866 |
| 3 | 0.1250000 | 7.125016349 | 0.12435499 |
| 4 | 0.0625000 | 3.576334375 | 0.06241881 |
| 5 | 0.0312500 | 1.789910608 | 0.03123983 |
| 6 | 0.0156250 | 0.89517371 | 0.01562373 |
| 7 | 0.0078125 | 0.447614171 | 0.00781234 |
| 8 | 0.0039063 | 0.2238105 | 0.00390623 |
| 9 | 0.0019531 | 0.111905677 | 0.00195312 |
| 10 | 0.0009766 | 0.055952892 | 0.00097656 |
| 11 | 0.0004883 | 0.027976453 | 0.00048828 |
| 12 | 0.0002441 | 0.013988227 | 0.00024414 |
| 13 | 0.0001221 | 0.006994114 | 0.00012207 |
| 14 | 0.0000610 | 0.003497057 | 6.1035E-05 |
| 15 | 0.0000305 | 0.001748528 | 3.0518E-05 |
| 16 | 0.0000153 | 0.000874264 | 1.5259E-05 |

Table of Angles

Because each iteration is scaled by $\cos(\tan^{-1} 2^{-i})$ and $\cos(\varphi) = \cos(-\varphi)$, the scaling factor of each term can be combined into a product of terms that depends only on the number if iterations included and further can be applied as an inverse at the scale of the first iteration instead of assuming a unit length.

We employ the identity:

$$\cos(\varphi) = \frac{1}{\sqrt{1+\tan(\varphi)^2}} = \frac{1}{\sqrt{1+(\pm 2^{-i})^2}} = K_i$$

$$K_i = \frac{1}{\sqrt{1+2^{-2i}}}$$

We notice that the denominator of each $K_i$ is a number greater than 1 and as the index "I" increases, the denominator approaches unity. We now define the denominator $A_n$ as the iterative product of terms from I=0 to I=n as follows:

$$A_n = \prod_0^n \sqrt{1+2^{-2i}}$$

We intend to calculate the sinewave in increments determined by the 12-bit Ratio and provide 9-bit overlap-delay values. For illustration, we use the range of the Ratio from 000 to 7FF in equal increments of $\pi/4096$ (0.00077 rad=0.04395°) armed with the knowledge that the algorithm begins with $\tan^{-1} 2^{-0} = \tan^{-1} 1 = \pi/4 = 45°$ and halves the tangent of the angle at each iteration. Therefore, the Ratio angle for $\varphi$ begins with zero and increments by $\pi/4096$ (0.00077 rad=0.04395°) until $\varphi$ reaches $\pi$ or 180° over the span of values for Ratio from 000 to 7FF in equal increments.

We illustrate the computation for the first increment as follows:

| i | $\tan(\phi) = 2 - i$ | $(\phi) = \text{atan}(2^{\wedge} - i)$ | Zi | Rotation | d | Final Angle |
|---|---|---|---|---|---|---|
| 0 | 1.000000 | 45.0000 | 0.04394534 | 5 | -1 | -44.95605 |
| 1 | 0.500000 | 26.5651 | -44.956 | 26.565051 | 1 | -18.39100 |
| 2 | 0.250000 | 14.0362 | -18.391 | 14.036243 | 1 | -4.35476 |
| 3 | 0.125000 | 7.1250 | -4.355 | 7.1250163 | 1 | 2.77026 |
| 4 | 0.062500 | 3.5763 | 2.770 | 3.5763344 | -1 | -0.80608 |
| 5 | 0.031250 | 1.7899 | -0.806 | 1.7899106 | 1 | 0.98383 |
| 6 | 0.015625 | 0.8952 | 0.984 | 0.8951737 | -1 | 0.08866 |
| 7 | 0.007813 | 0.4476 | 0.089 | 0.4476142 | -1 | -0.35896 |
| 8 | 0.003906 | 0.2238 | -0.359 | 0.2238105 | 1 | -0.13514 |
| 9 | 0.001953 | 0.1119 | -0.135 | 0.1119057 | 1 | -0.02324 |
| 10 | 0.000977 | 0.0560 | -0.023 | 0.0559529 | 1 | 0.03271 |
| 11 | 0.000488 | 0.0280 | 0.033 | 0.0279765 | -1 | 0.00474 |
| 12 | 0.000244 | 0.0140 | 0.005 | 0.0139882 | -1 | -0.00925 |
| 13 | 0.000122 | 0.0070 | -0.009 | 0.0069941 | 1 | -0.00226 |
| 14 | 0.000061 | 0.0035 | -0.002 | 0.0034971 | 1 | 0.00124 |
| 15 | 0.000031 | 0.0017 | 0.001 | 0.0017485 | -1 | -0.00051 |
| 16 | 0.000015 | 0.0009 | -0.001 | 0.0008743 | 1 | 0.00037 |
| 17 | 0.000008 | 0.0004 | 0.000 | 0.0004371 | -1 | -0.00007 |
| 18 | 0.000004 | 0.0002 | 0.000 | 0.0002186 | 1 | 0.00015 |
| 19 | 0.000002 | 0.0001 | 0.000 | 0.0001093 | -1 | 0.00004 |

We have shown the sequence of angles required by the CORDIC algorithm to rotate a vector by the fixed LSB of the Ratio angle. We can construct the x and y calculations need from this sequence.

Again, we construct the vector rotation over the range [000≤R[11:0]≤7FF] wherein each value of R signifies a $\varphi$ angle from 0 to n radians. Because we have formed the normalized ratio $R_i$ we are able to compute the sine of the angle based on uniform rotations of the coordinate system in increments of $\pi/7FF_2 = \pi/4096$, however, we are only able to employ a 9-bit result in the phase-overlap delay using the sine of the angle. Because the coordinate rotation scheme adds only a bit of accuracy per stage, we can calculate the entire 12-bit sine rotation resolution but only apply 9-bits of the rotation result.

We have restricted the representation to allow iterative increments of $\tan(\varphi)$ to $+/-2^i$, with the consequence that iterative angles of increment are $\tan^{-1} 2^{-i}$ as follows:

$$x' = \cos(\tan^{-1} 2^{-i})[x - yd_i 2^{-i}]$$

$$y' = \cos(\tan^{-1} 2^{-i})[y + xd_i 2^{-i}]$$

At each increment in the result, we apply the $2^{-i}$ term as a right shift with the result that any shifts past the LSB are lost an add no accuracy to the result. The consequences are that we can truncate our algorithm to require only the values of I from 0 to 8 (9-bits) and we can truncate out calculation of $A_n$ into a fixed gain value.

Because the increments are small, the sequence of CORDIC rotations is essentially the same getting to a small error range and that the sequence of rotations of values for the angle $\varphi$ is fixed by a single structure of 9 stages.

For illustration, we alter the Period_Obs_TB Verilog Behavioral Code to obtain the difference of Ratio values Ron a period by period basis to show at each increment of the Ratio for selection of angle increments. In the simulation, we show that the angle increments are counts of 1 or 2 bits corresponding to the incremental angle of rotation as either 0.0439453° or 0.0878906° with a 1× or 2× (single-bit shifted) initial starting angle for the Zi value.

Armed with the value of $A_n$, we can re-write the algorithm starting conditions as follows:

$$X_N = A_n(X_0 \cos Z_0 - Y_0 \sin Z_0)$$

$$Y_N = A_n(Y_0 \cos Z_0 + X_0 \sin Z_0)$$

$$Z_n = 0$$

And, with the definition that an initial alignment makes $Y_0=0$, $$X_N = A_n X_0 \cos Z_0$$

$$Y_N = A_n X_0 \sin Z_0$$

Further, with the definition that an initial alignment makes $X_0 = 1/A_n$, $$X_N = \cos Z_0$$

$$Y_N = \sin Z_0$$

Thus, we have adapted the procedure of the CORDIC algorithm to define a means to produce the definitions needed for calculating the trigonometric values for the sin(Ratio) as we needed. There are still practical considerations for the method and apparatus for the adaptation of the CORDIC algorithm. The table of angles above illustrated the iterations required to obtain the trigonometric values associated with the initial Zi value of 0.0439453° as the final value in the sequence of rotations. That value is a floating-point representation of the φ angle=π/4096, and we will require fixed-point calculations for the trigonometry to avail ourselves of the shifting properties of the CORDIC algorithm. Further, the angle rotations are similarly expressed as floating-point representations of the φ angle that require a sign decision to direct the rotation as addition or subtraction of the angles, whereas the Ratio is an unsigned integer that will require inclusion of the sign bit for the φ angle, at least in intermediate results. Also, the CORDIC algorithm is numerically stable for values of the φ angle over the angular range of $-\pi/2 < \varphi < \pi/2$. The range-of angles is addressed in the CORDIC algorithm by defining the φ angle's quadrant and pre-rotating the φ angle by multiples of π/2 to place the calculation in the first quadrant. Because we are interested in values of the sin(Ratio) for $0 < \varphi < \pi$, we must consider angles in the first and second quadrant being rotated to the first quadrant alone.

To adapt the CORDIC algorithm further, we first split the focus to the fixed-point management of the pre-rotation, and incremental rotation of the φ angle over the entire unit circle by $(\phi) = a \tan(2^{-i})$ in an angular representation that expresses the $\tan(2^{-i})$ values in a fixed-point number that fits in the range of $[000 \leq R[11:0] \leq 7FF] <= [0 < \varphi < \pi]$. We build a Verilog behavioral program to illustrate the computations, leaving the computation of the trigonometric values to follow in their own number system representation.

Because the first rotation of the CORDIC algorithm requires a 45°=π/4 increment, the first rotation can be expressed by shifting the representation for 180°=π by two bits to the right. We note that the full-field is required to represent the value for π, but the maximum angle loses two bits. At each entry, the leading bit in the table shifts one bit to the right with the consequence that after nine entries, the angle increment is zero. Because the minimum angle is constrained by the width of the field, the angles are not exact at each iteration but serve the purpose for this implementation. For illustration purposes, we construct the table of rotation angles below, with inclusion of the fixed-point code representing the $(\phi) = a \tan(2^{-i})$ values. Although we use the table for illustration, the implementation does not use the table, rather applying the pre-computed constants at each stage of the implementation as wiring differences.

| i | $\tan(\phi) = 2-i$ | $(\phi) = \operatorname{atan}(2^{\wedge} - i)$ | Rotation | Rotation |
|---|---|---|---|---|
| 0 | 1.000000 | 45.0000 | [0010_0000_0000] | 45 |
| 1 | 0.500000 | 26.5651 | [0001_0010_1110] | 26.54 |
| 2 | 0.250000 | 14.0362 | [0000_1001_1111] | 13.97 |
| 3 | 0.125000 | 7.1250 | [0000_0101_0001] | 7.119 |
| 4 | 0.062500 | 3.5763 | [0000_0010_1000] | 3.516 |
| 5 | 0.031250 | 1.7899 | [0000_0001_0100] | 1.758 |
| 6 | 0.015625 | 0.8952 | [0000_0000_1010] | 0.879 |
| 7 | 0.007813 | 0.4476 | [0000_0000_0101] | 0.439 |
| 8 | 0.003906 | 0.2238 | [0000_0000_0010] | 0.22 |
| 9 | 0.001953 | 0.1119 | [0000_0000_0001] | 0.11 |
| 10 | 0.000977 | 0.0560 | [0000_0000_0000] | 0 |
| 11 | 0.000488 | 0.0280 | [0000_0000_0000] | 0 |
| 12 | 0.000244 | 0.0140 | [0000_0000_0000] | 0 |

We note that the finite precision has introduced small errors into the rotation angles applied. Further, we note that iterations greater than the ninth do not generate any actual changes in the rotation. The 12-bit precision of the Ratio value results in a 10-bit accuracy of the vector rotation. We define the module CELL_Angle and the test-bench CELL_Angle_TB to excite it.

With the result that for the small angles of the Ratio shown, the Z output is reduced to a small value. We also see the intermediate values on the wires z1, z2, z3, z4, z5, z6, z7, z8, and z9 between the conditional add/subtract stages.

If we return to the table above and sum the increments in the "Rotation" column, we find that we can accumulate 99.551° as either a positive or negative rotation. The accumulated value of rotation is what gives rise to the input φ angle convergence range limitation over $-\pi/2 < \varphi < \pi/2$. If angles are constrained to the first quadrant $0 < \varphi < \pi/2$, we have no problem, but we are required to find the trigonometric functions over $0 < \varphi < \pi$ for the sin(Ratio), and must deal with the second quadrant at least. CORDIC can be extended to the second quadrant by pre-rotating the value of the input φ angle by subtracting the angle of π/2 and adjusting the trigonometric inputs accordingly. A similar pre-rotation is used in the fourth quadrant, but not is needed in the third quadrant and neither of those quadrant pre-rotations is implemented in this application of the CORDIC algorithm.

We note that Ratio is bounded $[000 \leq R[11:0] \leq 7FF] <= [0 < \varphi < \pi]$, with the implication that subtracting the angle of π/2 is equivalent to subtracting a value of R[11:0]=3FF and invoking the resulting value as the φ angle to compute the resulting Z value. We construct a behavioral Verilog program to call the module for the iteration of the angles as a test bench.

We simulated the values $[000 \leq \text{Ratio}[11:0] \leq FFF] <= [0 < \varphi < 2\pi]$, and covered all quadrants. We have pre-rotated the values of Ratio to generate the intermediate representation $[000 \leq R[11:0] \leq 7FF]$ as input to the CELL_Angle module. Further, we have pre-rotated the R[11:0] representation in the second quadrant as well as set the value to zero in the third and fourth quadrant instead of a pre-rotation in the quadrants we do not employ for the PFC implementation. We see that the Angle matches the R input at 400 (π/2), and the Z error alternates between 1 and FFE values signifying we have minimized the angular error.

Alternate implementations can substitute a ROM lookup table at the expense of the ROM components as well as the I/O pin requirements to interface with such a component's address and data bus structures. There are a number of alternate approaches available to one skilled in the art, but the CORDIC approach is entirely implementable using digital logic.

Much like the analysis we performed for the Ratio cell, we are aware of the requirement to produce a 10-bit delay field for the PSEL_10 cell to produce the phase-overlap delay for the PWM inputs. We are also aware that the MSB causes a delay greater than the requisite half-cycle of the PWM clock. We maintain the 10-bit delay field, but expect to need only 9-bits for normal operation. The MSB is retained for cases associated with the overflow of the R residue into its R[11] bit. Because of symmetry of the sine-wave near 0 and π radians, the magnitude of the sine delay is near zero at both extremes and slight overshoot implies the sin is near zero and the PWM multiplication is also near zero as a consequence.

We implement a CORDIC structure with the R[11:0] input and the S[9:0] sine-shaped delay magnitude output. CORDIC originated in the need to replace analog control with a digital processor with higher accuracy in the early days of digital control for navigation. One consequence of the origins of CORDIC is that it is highly compact and efficient of digital resources. For applications computing trigonometric quantities, the algorithm computes both the sine and cosine of an angle. As digital processing technology matured, the CORDIC algorithm was applied to many more fields, including communications wherein the availability of quadrature sources is a major advantage. CORDIC has been used for Direct Digital Synthesis (DDS) of source oscillators with high precision due to its bit-accuracy property that each iteration increases the accuracy of the computation. For the digital PWM, the bit-accuracy property supports the prediction of the number of iterations needed to supply the requisite accuracy.

Because we are synthesizing the sine wave over the half-cycle, incrementing by Counter increments that translate to angle increments of π/2048 radians, and always rotating in the same direction from 0 to π radians, we do not require a full-range direction decision, rather a series of successive rotations.

For example, let us start with a very approximate case, i.e., a single bit of the R value. The angle associated with π/2048 radians is the number 0.0015339802 radians. That angle is the value associated with the 11-bit field in the 12-bit range, and a reasonable minimum digital angle is $2^{-1}=2^{-11}=0.00048828125$ radians. Let us start with the smaller rotation, use the small-angle approximations and approximate sin ⊚=⊚, cos ⊚=1, and $\tan^{-1}$ ⊚=⊚, and iterate.

CONCLUSION

In concluding the detailed description, it should be noted that it would be obvious to those skilled in the art that many variations and modifications can be made to the preferred embodiment without substantially departing from the principles of the present invention. Also, such variations and modifications are intended to be included herein within the scope of the present invention as set forth in the appended claims. Further, in the claims hereafter, the structures, materials, acts and equivalents of all means or step-plus function elements are intended to include any structure, materials or acts for performing their cited functions.

It should be emphasized that the above-described embodiments of the present invention, particularly any "preferred embodiments" are merely possible examples of the implementations, merely set forth for a clear understanding of the principles of the invention. Any variations and modifications may be made to the above-described embodiments of the invention without departing substantially from the spirit of the principles of the invention. All such modifications and variations are intended to be included herein within the scope of the disclosure and present invention and protected by the following claims The present invention has been described in sufficient detail with a certain degree of particularity. The utilities thereof are appreciated by those skilled in the art. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the foregoing description of embodiments.

The invention claimed is:

1. A digital power factor correction (DPFC) controller for controlling a poly-phase AC to DC rectifier power converter, said DPFC controller comprising:
   one digital circuit assembly per each phase, each said digital circuit assembly dedicated to each phase, wherein each said phase dedicated digital circuit assemblies is capable of AC to DC conversion;
   one pulse width modulator (PWM) multiplied per phase generating a PWM power product signal;
   wherein for each said phase a PWM power product signal is produced by a full wave rectifier for each phase producing a half sine wave rectified output signal multiplied by each said PWM multiplier with a digitally synthetized sine wave form pulse width control signal; and
   adding each said PWM power product signal for each phase.

2. The DPFC controller of claim 1 wherein;
   each said PWM multiplier per phase can be realized as all digital circuit sub-assemblies within a Field Programmable Gate Array (FPGA).

3. A method of controlling a digital power factor correction (DPFC) controller for controlling a poly-phase AC to DC rectifier power converter, said method comprising:
   providing one digital circuit assembly per each phase, each said digital circuit assembly dedicated to each phase, wherein each said phase dedicated digital circuit assemblies is capable of AC to DC conversion;
   providing one pulse width modulator (PWM) multiplied per phase generating a PWM power product signal;
   wherein for each said phase a PWM power product signal is produced by a full wave rectifier for each phase producing a half sine wave rectified output signal multiplied by each said PWM multiplier with a digitally synthetized sine wave form pulse width control signal; and
   adding each said PWM power product signal for each phase.

4. The method of claim 3 wherein;
   each said PWM multiplier per phase can be realized as all digital circuit sub-assemblies within a Field Programmable Gate Array (FPGA).

* * * * *